(12) United States Patent
Taira et al.

(10) Patent No.: US 7,809,737 B2
(45) Date of Patent: Oct. 5, 2010

(54) PROGRAM, SYSTEM AND METHOD FOR ANALYZING RETRIEVAL KEYWORD

(75) Inventors: Hiroshi Taira, Fuchu (JP); Haruhiko Iida, Kawasaki (JP); Jun Hirai, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2136 days.

(21) Appl. No.: 10/645,623

(22) Filed: Aug. 22, 2003

(65) Prior Publication Data
US 2005/0050045 A1    Mar. 3, 2005

(30) Foreign Application Priority Data

| Aug. 23, 2002 | (JP) | ............................. 2002-243466 |
| Dec. 27, 2002 | (JP) | ............................. 2002-382396 |
| Mar. 14, 2003 | (JP) | ............................. 2003-070281 |

(51) Int. Cl.
*G06F 17/30*    (2006.01)

(52) U.S. Cl. ..................... 707/758; 707/781; 709/226

(58) Field of Classification Search ............... 707/10, 707/100, 9, 708, 781, 758; 709/202, 226
See application file for complete search history.

(56) References Cited

FOREIGN PATENT DOCUMENTS

| JP | 2001-222538 | 8/2001 |
| JP | 2002-123517 | 4/2002 |

OTHER PUBLICATIONS

Takaaki Mizuno, "Web No Usability Koujou Keikaku (Web Usability Improvement Project)", Open Design, CQ Publishing, Co., Ltd., vol. 9, No. 7, Jul. 1, 2002, pp. 100-117.
Noriaki Kawamae, et al., "Search System Utilizing User's Search History", Research Report of Information Processing Society, vol. 2000, No. 69, Jul. 28, 2000, pp. 113-120 (with English Abstract).

*Primary Examiner*—Luke S. Wassum
*Assistant Examiner*—Sherief Badawi
(74) *Attorney, Agent, or Firm*—Oblon, Spivak, McClelland, Maier & Neustadt, L.L.P.

(57) ABSTRACT

A retrieval keyword analyzing system extracts an access sequence indicating a continuous access by a same requester based on a Web access log which relates first identification data indicating an access requester to second identification data indicating contents to be accessed. The Web access log relates second identification data indicating a retrieval system to a retrieval keyword input to the retrieval system by the requester. The analyzing system extracts the retrieval keyword from the Web access log, calculates a qualitative evaluation value of the access sequence and creates relation data between the retrieval keyword and the qualitative evaluation value.

34 Claims, 45 Drawing Sheets

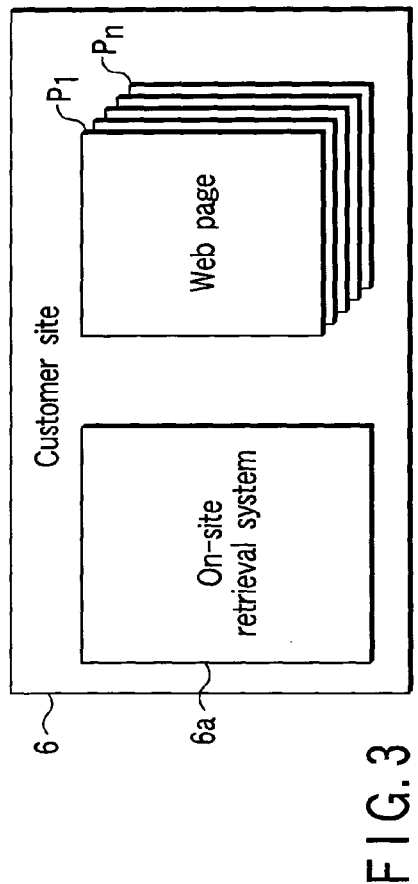

FIG. 3

Information contained in Web access log (customer site browsing person)

| Host name | User ID | Date | Time | Request | End code | Number of transferred bytes | Reference information | User agent |
|---|---|---|---|---|---|---|---|---|
| pc001.○○○.co.jp | — | 2002/2/14 | 18:56:14 | /index.html | 200 | 400 | — | M○○illa/4.0 (compatible:M○IE··· |
| ws20.△△△.co.jp | — | 2002/2/14 | 18:57:30 | /cgi/login.cgi | 200 | 700 | — | M○○illa/4.7 [△△5LLL] (X11··· |
| pc001.○○○.co.jp | — | 2002/2/14 | 18:58:01 | /products/index.html | 200 | 2400 | — | w△m/0.3+m□e-p21-26+m○e-1.5.2 |
| pc001.○○○.co.jp | — | 2002/2/14 | 18:58:40 | products/info/p001.pdf | 200 | 3000 | — | M○○illa/4.7 [△△5LLL] (X11··· |
| ws20.△△△.co.jp | — | 2002/2/14 | 18:59:10 | /cgi/order.cgi | 200 | 700 | — | M○○illa/4.0 (compatible:M○IE··· |

FIG. 4

Pre-processed data

| View ID | Host name | User ID | Date | Time | Request | Reference information | User agent |
|---|---|---|---|---|---|---|---|
| View 1 | pc001.○○○.co.jp | — | 2002/2/14 | 18:56:14 | /index.html | — | M○○illa/4.0 (compatible:M○IE··· |
| View 2 | ws20.△△△.co.jp | — | 2002/2/14 | 18:57:30 | /cgi/login.cgi | — | M○○illa/4.7 [△△5LLL] (X11··· |
| View 3 | pc001.○○○.co.jp | — | 2002/2/14 | 18:58:01 | /products/index.html | — | w△m/0.3+m□e-p21-26+m○e-1.5.2 |
| View 4 | pc001.○○○.co.jp | — | 2002/2/14 | 18:58:40 | products/info/p001.pdf | — | M○○illa/4.7 [△△5LLL] (X11··· |
| View 5 | ws20.△△△.co.jp | — | 2002/2/14 | 18:59:10 | /cgi/order.cgi | — | M○○illa/4.0 (compatible:M○IE··· |

F I G. 5

Access sequence data

| View ID | Visit ID | Visitor ID | Date | Time | Request |
|---|---|---|---|---|---|
| View 1 | Visit 1 | Visitor 1 | 2002/2/14 | 18:56:14 | /AAA.html |
| View 2 | Visit 2 | Visitor 2 | 2002/2/14 | 18:57:30 | /BBB.cgi |
| View 3 | Visit 1 | Visitor 1 | 2002/2/14 | 18:58:01 | /CCC.html |
| View 4 | Visit 2 | Visitor 2 | 2002/2/14 | 18:58:40 | /GGG/DDD.cgi |
| View 5 | Visit 3 | Visitor 1 | 2002/2/14 | 19:42:10 | /EEE.html |

F I G. 6

Request to retrieval system

| Example 1 | http://www.○○○.co.jp/search.cgi?q=xxxx |
|---|---|
| Example 2 | http://www.○○○.co.jp/search.cgi?q=yyyy&page=10 |
| Example 3 | http://www.○○○.co.jp/search.cgi?q=%E3%82%8A%E3%82%93%E3%81%94 |

F I G. 7

Place of retrieval system and query pattern

| Place of retrieval system | Query pattern |
|---|---|
| http://www.○○○.co.jp/search.cgi | q |

FIG. 8

Extracted parameter

| | Query pattern |
|---|---|
| Example 1 | xxxx |
| Example 2 | yyyy |
| Example 3 | %E3%82%8A%E3%82%93%E3%81%94 |

FIG. 9

Keyword data

| View ID | Retrieval keyword |
|---|---|
| View 6 | りんご |
| View 21 | apple |
| View 43 | banana |
| View 56 | 砂糖 |
| View 81 | カレイ |

FIG. 10

After-retrieval browsing time and satisfaction degree

| After-retrieval browsing time | Satisfaction degree |
|---|---|
| No viewing | 0 |
| Browsing only one page | 0 |
| Less than 1 minute | 10 |
| 1 to 2 minutes | 20 |
| 2 to 3 minutes | 30 |
| 3 to 5 minutes | 40 |
| 5 to 7 minutes | 50 |
| 7 to 10 minutes | 60 |
| 10 to 15 minutes | 70 |
| 15 to 20 minutes | 80 |
| 20 to 25 minutes | 90 |
| 30 minutes or more | 100 |

FIG. 11

Access sequence data

| View ID | Visit ID | Satisfaction degree data |
|---|---|---|
| View 1 | Visit 1 | 0 |
| View 2 | Visit 2 | 20 |
| View 3 | Visit 1 | 0 |
| View 4 | Visit 2 | 20 |
| View 5 | Visit 3 | 10 |

FIG. 12

Relation between satisfaction degree data and keyword data

| View ID | Satisfaction degree data | Retrieval keyword |
|---|---|---|
| View 6 | 10 | りんご |
| View 21 | 0 | apple |
| View 83 | 30 | りんご |
| View 121 | 20 | 砂糖 |
| View 137 | 0 | apple |

Relation data

| Retrieval keyword | Satisfaction degree data |
|---|---|
| りんご | 23.4 |
| apple | 17.8 |
| 砂糖 | 2.4 |
| 肉野菜 | 2.4 |
| 蜂蜜 | 11.6 |

Need value data

| Retrieval keyword | Need value |
|---|---|
| りんご | 21.5 |
| apple | 14.6 |
| 砂糖 | 3.6 |
| 肉野菜 | 17.6 |
| 蜂蜜 | 2.7 |

Relation data

| Retrieval keyword | Need value | Satisfaction degree |
|---|---|---|
| りんご | 21.5 | 23.4 |
| apple | 14.6 | 17.8 |
| 砂糖 | 3.6 | 2.4 |
| 肉野菜 | 17.6 | 2.4 |
| 蜂蜜 | 2.7 | 11.6 |

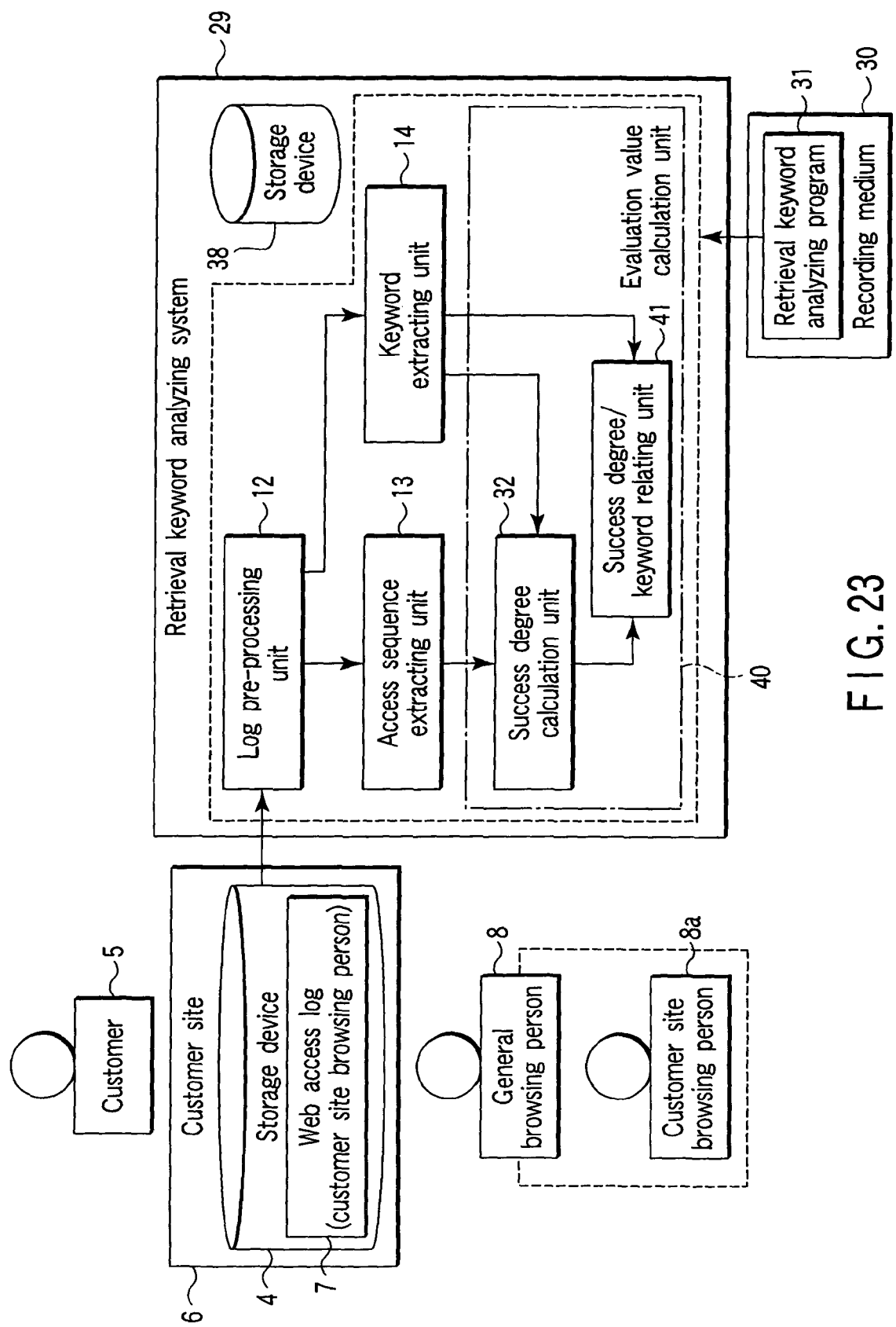
F I G. 23

Intermediate generation data (1)

| View ID | Visit ID | Request | Retrieval keyword |
|---|---|---|---|
| View 20 | Visit 6 | /index.html | |
| View 21 | Visit 6 | /search.cgi | |
| View 22 | Visit 6 | /search.cgi?q=%E3%82%8A%E3%82%93%E3%81%94 | りんご |
| View 26 | Visit 6 | /general/index.html | |
| View 28 | Visit 6 | /apple/index.html | |
| View 37 | Visit 6 | /apple/tsugaru.html | |
| View 45 | Visit 7 | /index.html | |
| View 47 | Visit 7 | /search.cgi | |
| View 48 | Visit 7 | /search.cgi?q=apple | apple |
| ... | | ... | ... |

FIG. 26

Access demand page list

| Retrieval keyword | Access demand page |
|---|---|
| りんご | /apple/index.html |
| apple | /apple/index.html |
| 肉野菜 | /meat/index.html |
| 肉野菜 | /vegetable/index.html |
| ... | |
| (Others) | |

FIG. 24

Success degree weighting rule

| Number of clicks from retrieval result page | Success degree |
|---|---|
| 1 | 100 |
| 2 | 80 |
| 3 | 60 |
| 4 | 40 |
| 5 or more | 20 |
| No arrival | 0 |

FIG. 25

Intermediate generation data (2)
| Visit ID | Retrieval keyword | Success degree |
|---|---|---|
| Visit 6 | りんご | 80 |
| Visit 7 | apple | 100 |
| Visit 21 | 肉野菜 | 0 |
| Visit 23 | スーパー | 60 |
| Visit 30 | りんご | 20 |
F I G. 27
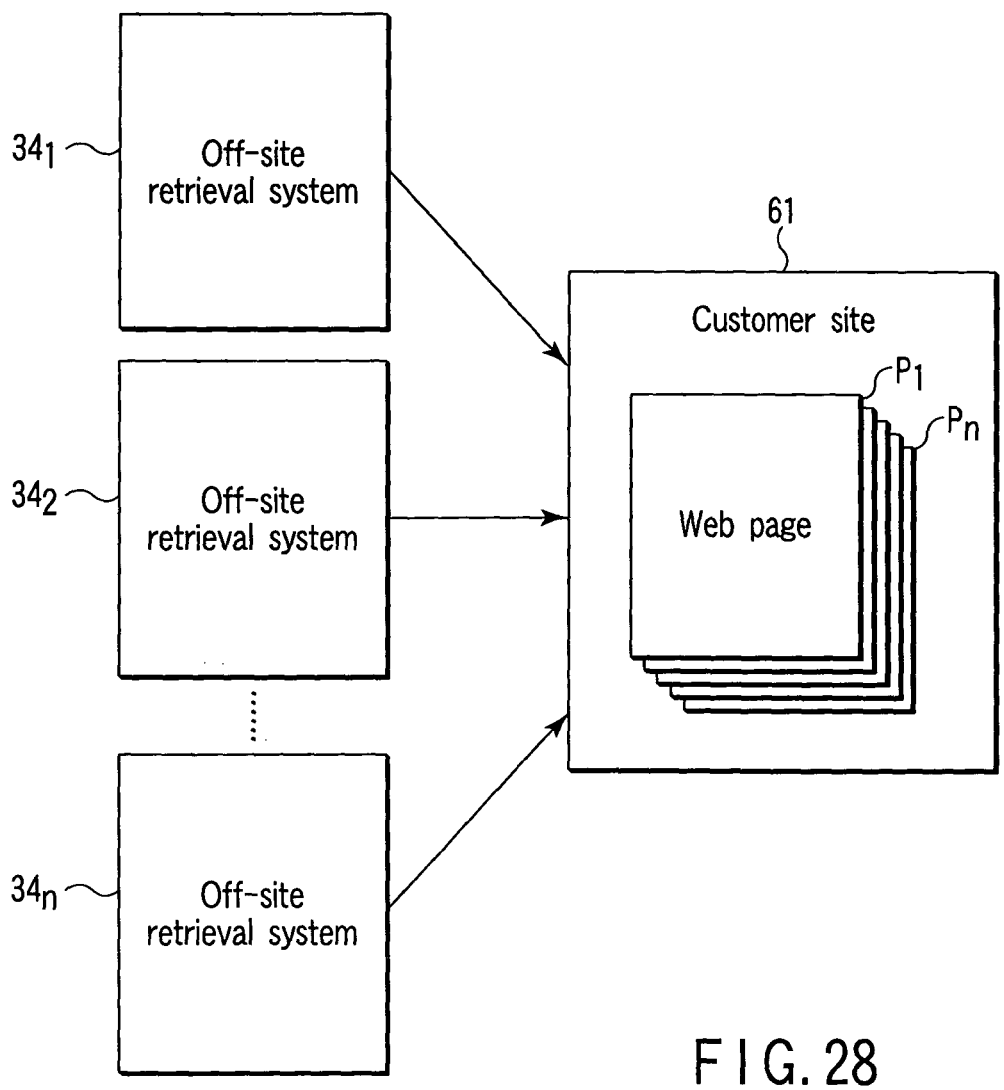
F I G. 28

FIG. 29

Web access log with reference information

| Host name | User ID | Date | Time | Request | End code | Number of transferred bytes | Reference information | User agent |
|---|---|---|---|---|---|---|---|---|
| pc001.○○○.co.jp | — | 2002/2/14 | 18:56:14 | /index.html | 200 | 400 | http://www.○○○.ne.jp/□□□... | M○○illa/4.0 (compatible:M○IE... |
| ws20.△△△.co.jp | — | 2002/2/14 | 18:57:30 | /cgi/login.cgi | 200 | 700 | — | M○○illa/4.7 [△△5LLL] (X11... |
| pc001.○○○.co.jp | — | 2002/2/14 | 18:58:01 | /products/index.html | 200 | 2400 | http://www.XXX.com/△△△... | w△m/0.3+m□e-p21-26+m○e-1.5.2 |
| pc001.○○○.co.jp | — | 2002/2/14 | 18:58:40 | products/info/p001.pdf | 200 | 3000 | http://www.○○○.ne.jp/◎◎◎... | M○○illa/4.7 [△△5LLL] (X11... |
| ws20.△△△.co.jp | — | 2002/2/14 | 18:59:10 | /cgi/order.cgi | 200 | 700 | http://www.○○○.ne.jp/□□□... | M○○illa/4.0 (compatible:M○IE... |

Pattern

| URL of retrieval system | Query pattern |
|---|---|
| http://www.△△△.com/ | keyword |
| http://www.□□□.ne.jp/ | kw |
| http://www.○○○.co.jp/ | query |
| http://www.×××.co.jp/ | word |
| http://www.◎◎◎.com/ | q |

F I G. 31

Access sequence data

| View ID | Visit ID | Visitor ID | Date | Time | Request | Reference flag |
|---|---|---|---|---|---|---|
| View 1 | Visit 1 | Visitor 1 | 2002/2/14 | 18:56:14 | /AAA.html | 1 |
| View 2 | Visit 2 | Visitor 2 | 2002/2/14 | 18:57:30 | /BBB.cgi | 0 |
| View 3 | Visit 1 | Visitor 1 | 2002/2/14 | 18:58:01 | /CCC.html | 0 |
| View 4 | Visit 2 | Visitor 2 | 2002/2/14 | 18:58:40 | /GGG/DDD.cgi | 0 |
| View 5 | Visit 3 | Visitor 1 | 2002/2/14 | 19:42:10 | /EEE.html | 1 |

F I G. 32

Keyword data

| View ID | Keyword contained in reference information |
|---|---|
| View 6 | りんご |
| View 21 | apple |
| View 43 | banana |
| View 56 | 砂糖 |
| View 81 | カレイ |

F I G. 33

Access sequence/keyword data

| View ID | Visit ID | Visitor ID | Date | Time | Retrieval keyword |
|---|---|---|---|---|---|
| View 1 | Visit 1 | Visitor 1 | 2002/2/14 | 18:56:14 | |
| View 2 | Visit 2 | Visitor 2 | 2002/2/14 | 18:57:30 | りんご |
| View 3 | Visit 1 | Visitor 1 | 2002/2/14 | 18:58:01 | |
| View 4 | Visit 2 | Visitor 2 | 2002/2/14 | 18:58:40 | |
| View 5 | Visit 3 | Visitor 1 | 2002/2/14 | 19:42:10 | たまねぎ |

Intermediate generation data

| View ID | Visit ID | Satisfaction degree data | Retrieval keyword |
|---|---|---|---|
| View 1 | Visit 1 | 0 | |
| View 2 | Visit 2 | 20 | りんご |
| View 3 | Visit 1 | 0 | |
| View 4 | Visit 2 | 20 | |
| View 5 | Visit 3 | 10 | たまねぎ |

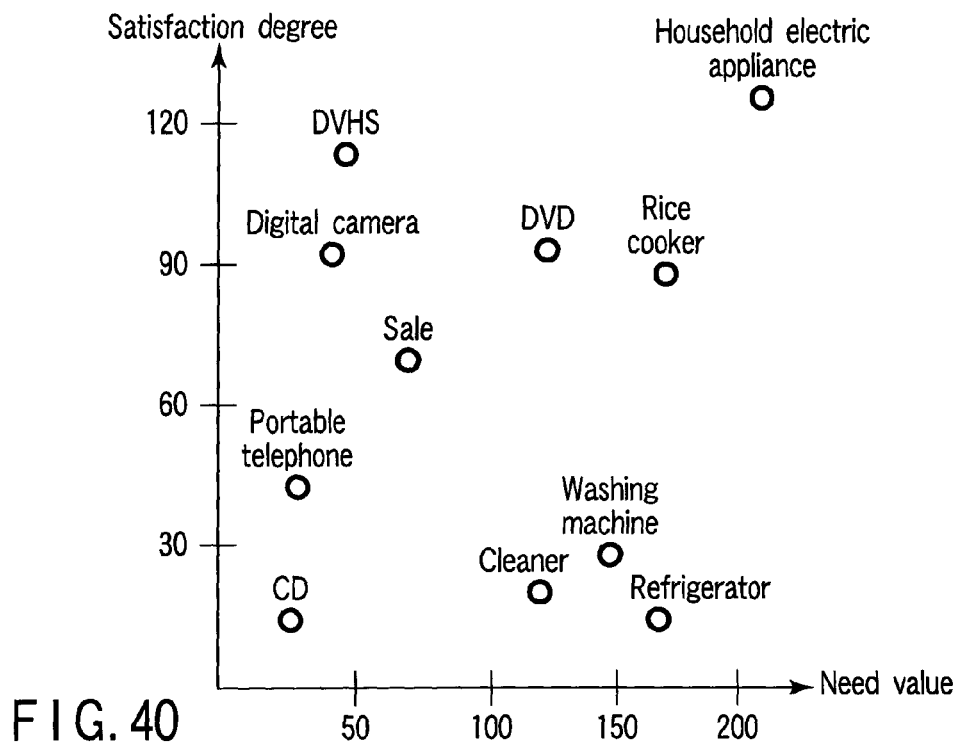
FIG. 40
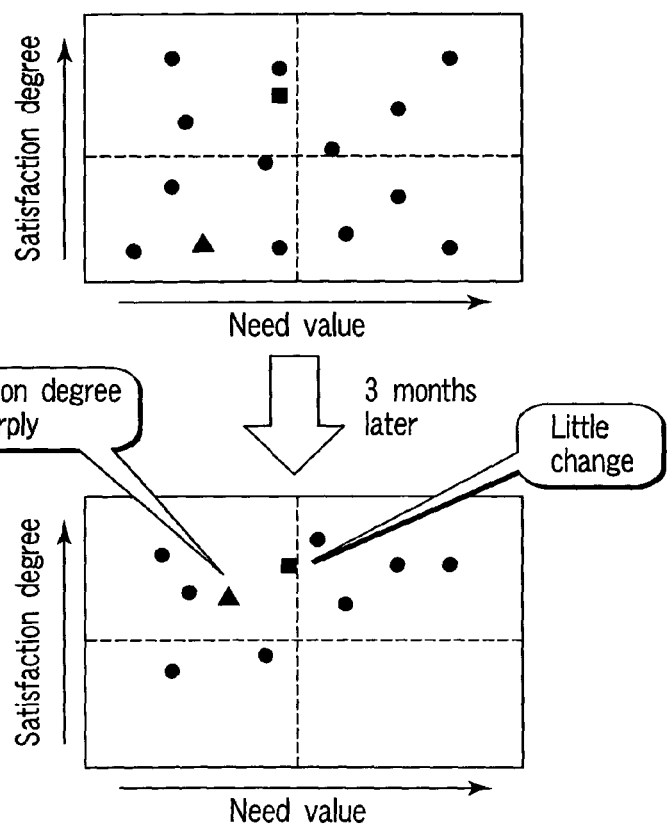
FIG. 42  (Trend of each retrieval keyword)

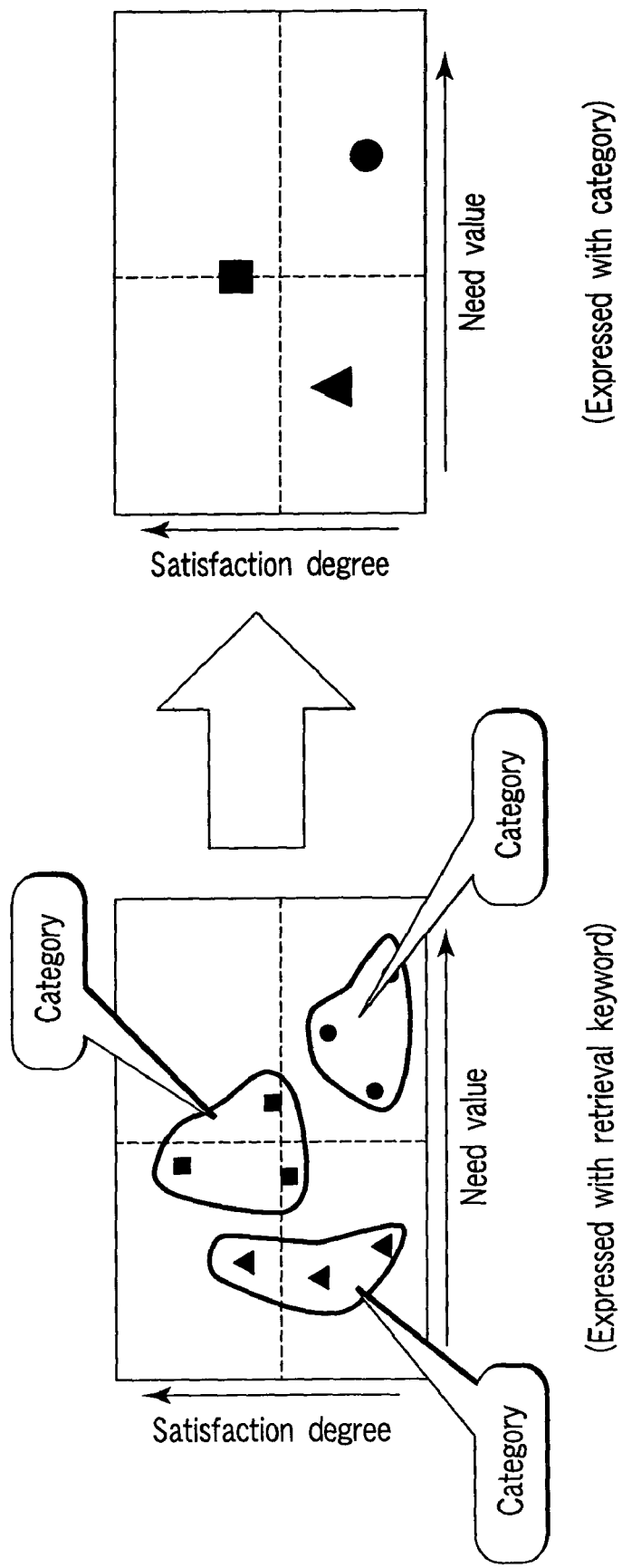
F I G. 41

(In case where moving distance threshold is 120)

| Moving distance D | Action |
|---|---|
| D < 120 | — |
| 120 ≦ D | Calculate moving direction, adding of message |

| Moving direction θ | Message to be added |
|---|---|
| 0° ≦ θ < 30° | Need rises |
| 30° ≦ θ < 60° | Need/satisfaction degree rise |
| 60° ≦ θ < 120° | Satisfaction degree rises |
| 120° ≦ θ < 150° | Need falls while satisfaction degree rises |
| 150° ≦ θ < 210° | Need falls |
| 210° ≦ θ < 240° | Both need and satisfaction degree fall |
| 240° ≦ θ < 300° | Satisfaction degree falls |
| 300° ≦ θ < 330° | Need rise while satisfaction degree falls |
| 330° ≦ θ < 360° | Need rises |

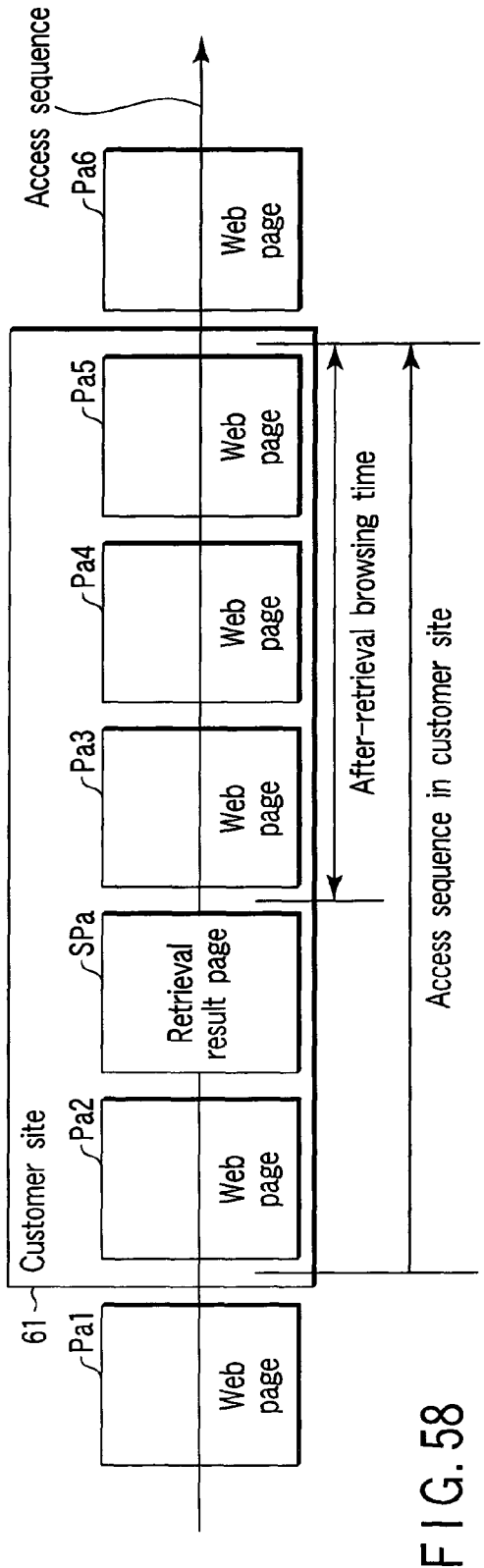
F I G. 58
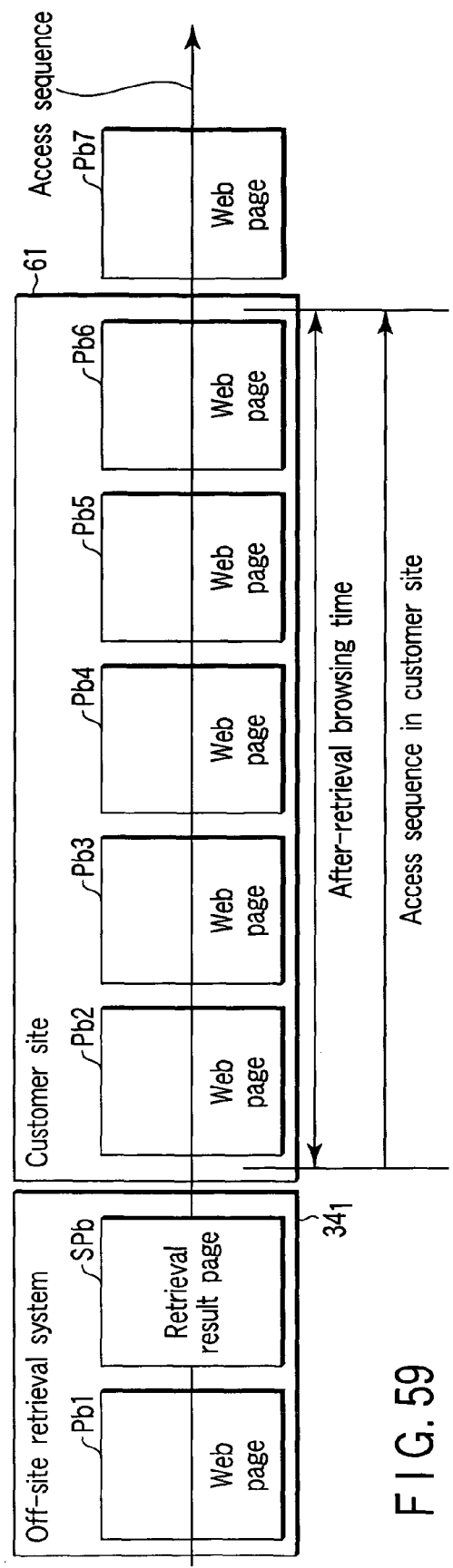
F I G. 59

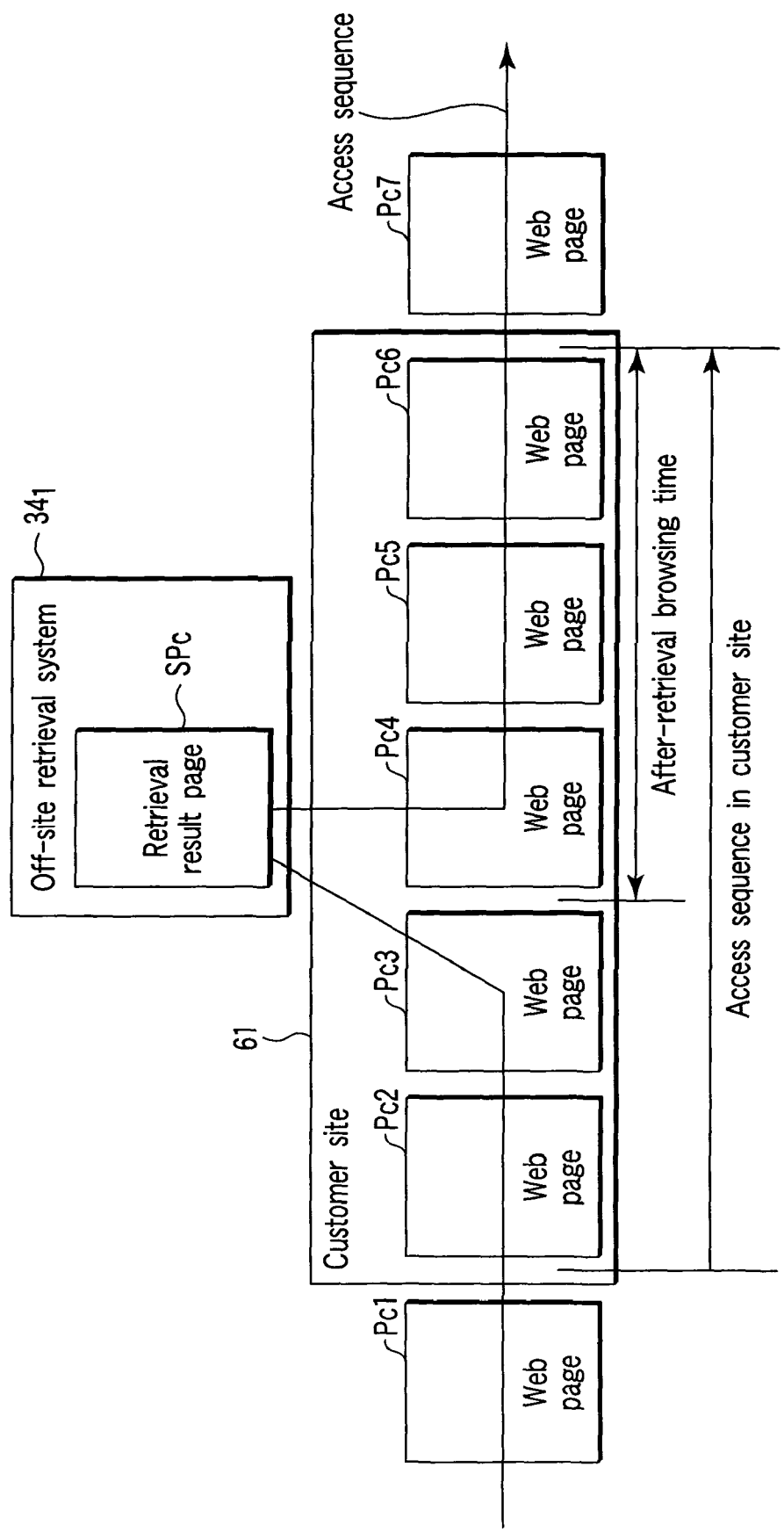
F I G. 60

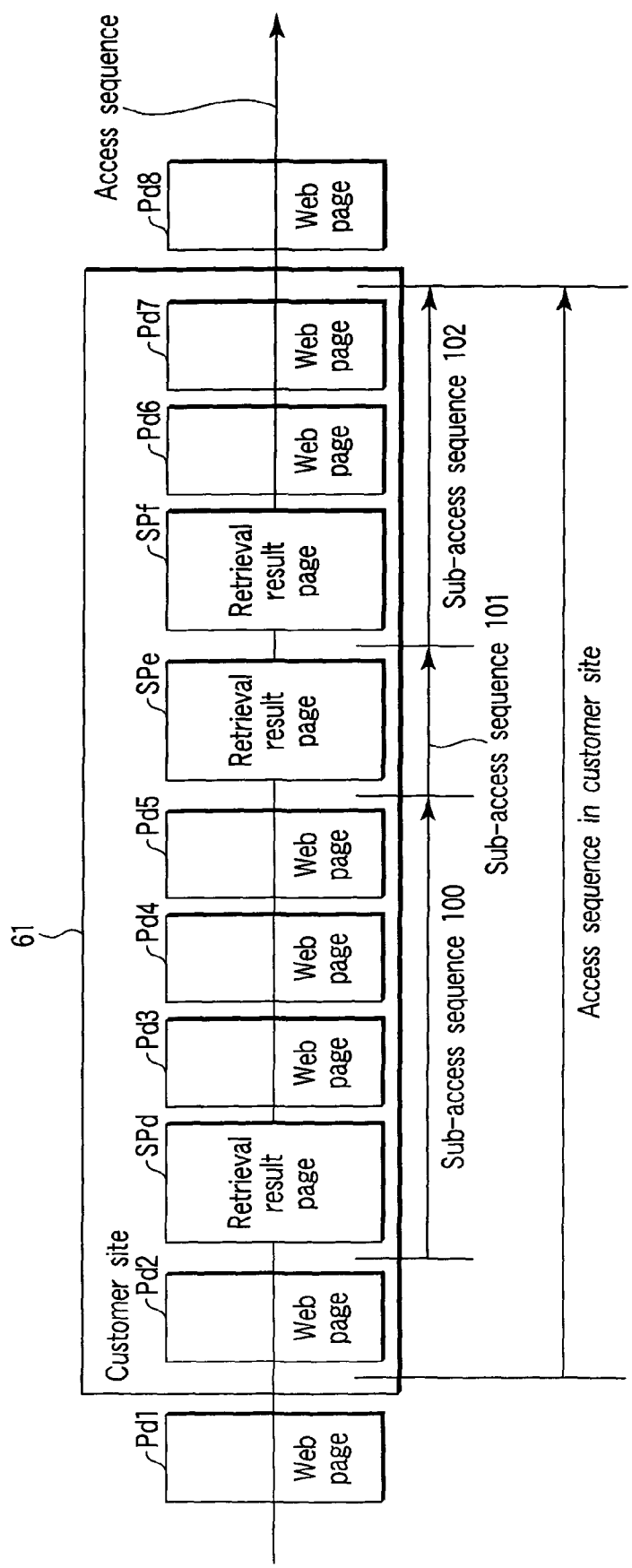
F I G. 61

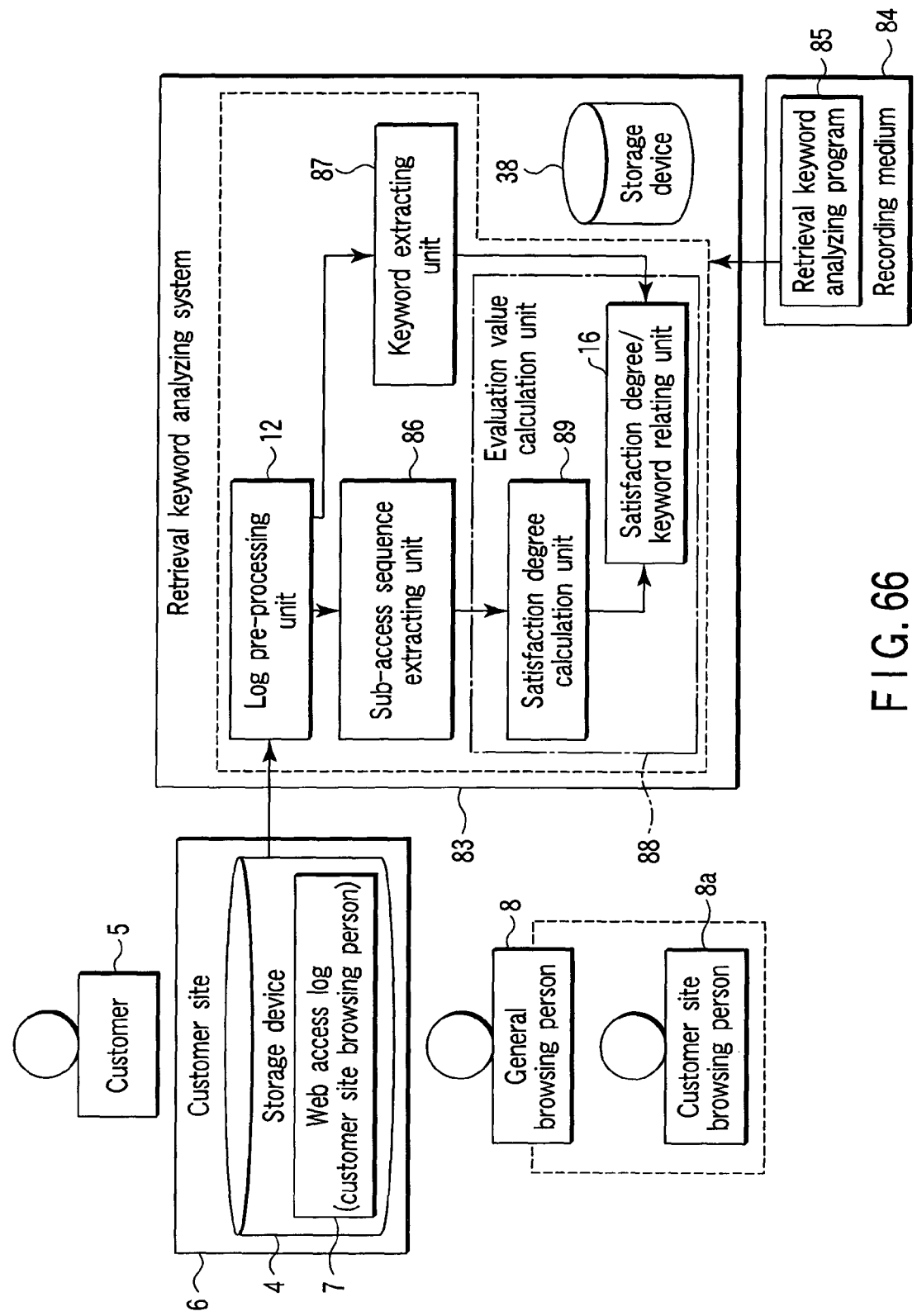
F I G. 66

Access sequence data

| View ID | Visit ID | Visitor ID | Date | Time | Request | Reference information |
|---|---|---|---|---|---|---|
| View 1 | Visit 1 | Visitor 1 | 2002/2/14 | 18:56:14 | /AAA.html | http://www.□□□.ne.jp/search.cgi?kw=vegitable |
| View 2 | Visit 2 | Visitor 2 | 2002/2/14 | 18:57:30 | /BBB.cgi | — |
| View 3 | Visit 1 | Visitor 1 | 2002/2/14 | 18:58:01 | /CCC.html | http://www.○○○.co.jp/AAA.html |
| View 4 | Visit 2 | Visitor 2 | 2002/2/14 | 18:58:40 | /search.cgi?q=food | http://www.○○○.co.jp/BBB.html |
| View 5 | Visit 1 | Visitor 1 | 2002/2/14 | 19:59:10 | /EEE.html | — |
| ... | ... | ... | ... | ... | ... | ... |

F I G. 68

Temporary first table

| View ID | Visit ID | Visitor ID | Date | Time | Request | Reference information |
|---|---|---|---|---|---|---|
| View 1 | Visit 1 | Visitor 1 | 2002/2/14 | 18:56:14 | /AAA.html | http://www.□□□.ne.jp/search.cgi?kw=vegitable |
| View 3 | Visit 1 | Visitor 1 | 2002/2/14 | 18:58:01 | /CCC.html | http://www.○○○.co.jp/AAA.html |
| View 5 | Visit 1 | Visitor 1 | 2002/2/14 | 18:59:10 | /EEE.html | http://www.○○○.co.jp/CCC.html |
| View 6 | Visit 1 | Visitor 1 | 2002/2/14 | 19:00:12 | /search.cgi?q=food | http://www.○○○.co.jp/EEE.html |
| View 8 | Visit 1 | Visitor 1 | 2002/2/14 | 19:01:23 | /FFF.html | http://www.○○○.co.jp/search.cgi?q=food |
| View 13 | Visit 1 | Visitor 1 | 2002/2/14 | 19:02:25 | /GGG.html | http://www.○○○.co.jp/FFF.html |
| View 2 | Visit 2 | Visitor 2 | 2002/2/14 | 18:57:30 | /BBB.html | — |
| View 4 | Visit 2 | Visitor 2 | 2002/2/14 | 18:58:40 | /search.cgi?q=food | http://www.○○○.co.jp/BBB.html |
| ... | ... | ... | ... | ... | ... | ... |

F I G. 70

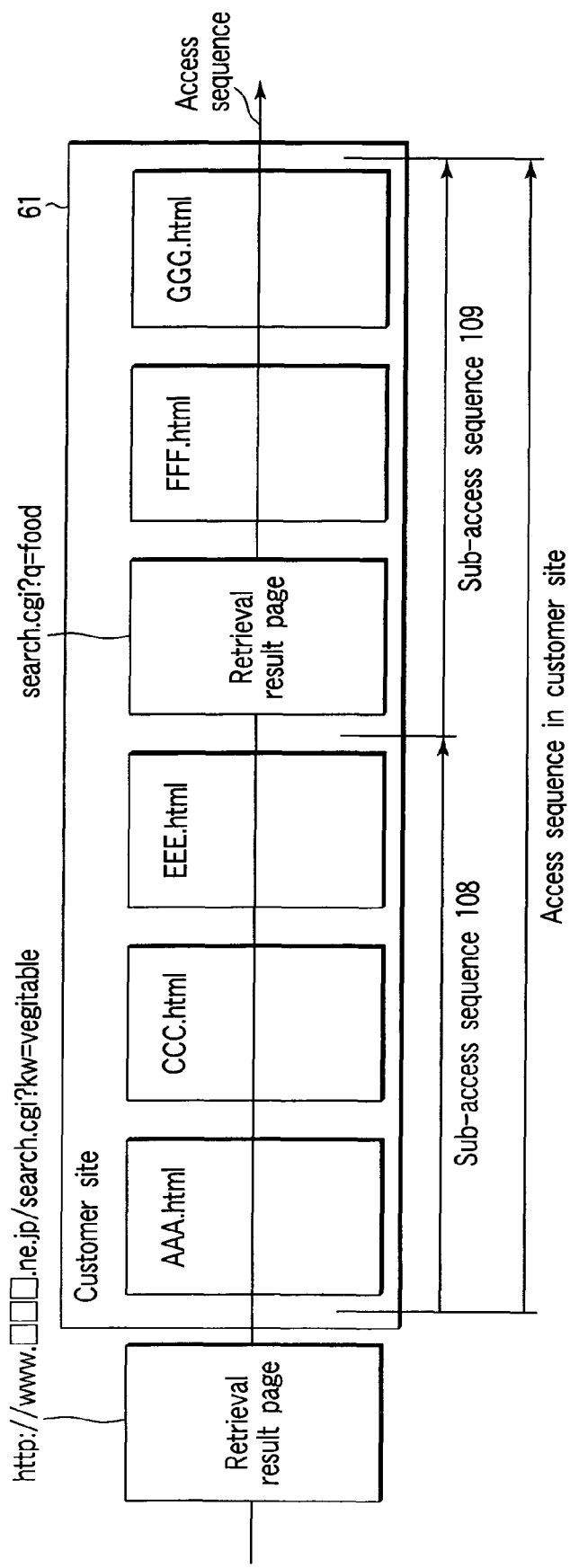
F I G. 71

Temporary second table

| View ID | Visit ID | Visitor ID | Date | Time | Request | Reference information | Starting end flag |
|---|---|---|---|---|---|---|---|
| View 1 | Visit 1 | Visitor 1 | 2002/2/14 | 18:56:14 | /AAA.html | http://www.□□□.ne.jp/search.cgi?kw=vegitable | 1 |
| View 3 | Visit 1 | Visitor 1 | 2002/2/14 | 18:58:01 | /CCC.html | http://www.○○○.co.jp/AAA.html | 0 |
| View 5 | Visit 1 | Visitor 1 | 2002/2/14 | 18:59:10 | /EEE.html | http://www.○○○.co.jp/CCC.html | 0 |
| View 6 | Visit 1 | Visitor 1 | 2002/2/14 | 19:00:12 | /search.cgi?q=banana | http://www.○○○.co.jp/EEE.html | 1 |
| View 8 | Visit 1 | Visitor 1 | 2002/2/14 | 19:01:23 | /FFF.html | http://www.○○○.co.jp/search.cgi?q=banana | 0 |
| View 13 | Visit 1 | Visitor 1 | 2002/2/14 | 19:02:25 | /GGG.html | http://www.○○○.co.jp/FFF.html | 0 |
| View 2 | Visit 2 | Visitor 2 | 2002/2/14 | 18:57:30 | /BBB.html | — | 0 |
| View 4 | Visit 2 | Visitor 2 | 2002/2/14 | 18:58:40 | /search.cgi?q=food | http://www.○○○.co.jp/BBB.html | 1 |
| ... | ... | ... | ... | ... | ... | ... | ... |

F I G. 72

Retrieval system specific information outside customer site

| URL of retrieval system | Query pattern |
|---|---|
| http://www.□□□.ne.jp/ | kw |
| ... | ... |

F I G. 73

Temporary third table

| View ID | Visit ID | Visitor ID | Date | Time | Request | Reference information | Starting end/ terminal end flag |
|---|---|---|---|---|---|---|---|
| View 1 | Visit 1 | Visitor 1 | 2002/2/14 | 18:56:14 | /AAA.html | http://www.☐☐☐.ne.jp/search.cgi?kw=vegitable | 1 |
| View 3 | Visit 1 | Visitor 1 | 2002/2/14 | 18:58:01 | /CCC.html | http://www.OOO.co.jp/AAA.html | 0 |
| View 5 | Visit 1 | Visitor 1 | 2002/2/14 | 18:59:10 | /EEE.html | http://www.OOO.co.jp/CCC.html | 2 |
| View 6 | Visit 1 | Visitor 1 | 2002/2/14 | 19:00:12 | /search.cgi?q=banana | http://www.OOO.co.jp/EEE.html | 1 |
| View 8 | Visit 1 | Visitor 1 | 2002/2/14 | 19:01:23 | /FFF.html | http://www.OOO.co.jp/search.cgi?q=banana | 0 |
| View 13 | Visit 1 | Visitor 1 | 2002/2/14 | 19:02:25 | /GGG.html | http://www.OOO.co.jp/FFF.html | 2 |
| View 2 | Visit 2 | Visitor 2 | 2002/2/14 | 18:57:30 | /BBB.html | — | 0 |
| View 4 | Visit 2 | Visitor 2 | 2002/2/14 | 18:58:40 | /search.cgi?q=food | http://www.OOO.co.jp/BBB.html | 1 |
| ... | ... | ... | ... | ... | ... | ... | ... |

F I G. 74

Sub-access sequence data

| View ID | Visit ID | Visitor ID | SubVisit ID | Date | Time | Request | Reference information | Off-site system flag |
|---|---|---|---|---|---|---|---|---|
| View 1 | Visit 1 | Visitor 1 | SubVisit 1 | 2002/2/14 | 18:56:14 | /AAA.html | http://www.□□□.ne.jp/search.cgi?kw=vegitable | 1 |
| View 2 | Visit 2 | Visitor 2 | ... | 2002/2/14 | 18:57:30 | /BBB.html | — | — |
| View 3 | Visit 1 | Visitor 1 | SubVisit 1 | 2002/2/14 | 18:58:01 | /CCC.html | http://www.○○○.co.jp/AAA.html | — |
| View 4 | Visit 2 | Visitor 2 | SubVisit 3 | 2002/2/14 | 18:58:40 | /search.cgi?q=food | http://www.○○○.co.jp/BBB.html | — |
| View 5 | Visit 1 | Visitor 1 | SubVisit 1 | 2002/2/14 | 18:59:10 | /EEE.html | http://www.○○○.co.jp/CCC.html | — |
| View 6 | Visit 1 | Visitor 1 | SubVisit 2 | 2002/2/14 | 19:00:02 | /search.cgi?q=banana | http://www.○○○.co.jp/EEE.html | 0 |
| ... | ... | ... | ... | ... | ... | ... | ... | ... |
| View 8 | Visit 1 | Visitor 1 | SubVisit 2 | 2002/2/14 | 19:01:23 | /FFF.html | http://www.○○○.co.jp/search.cgi?q=banana | — |
| ... | ... | ... | ... | ... | ... | ... | ... | ... |
| View 13 | Visit 1 | Visitor 1 | SubVisit 2 | 2002/2/14 | 19:02:25 | /GGG.html | http://www.○○○.co.jp/FFF.html | — |
| ... | ... | ... | ... | ... | ... | ... | ... | ... |

F I G. 75

PROGRAM, SYSTEM AND METHOD FOR ANALYZING RETRIEVAL KEYWORD

CROSS-REFERENCE TO RELATED APPLICATIONS

This application is based upon and claims the benefit of priority from the prior Japanese Patent Applications No. 2002-243466, filed Aug. 23, 2002; No. 2002-382396, filed Dec. 27, 2002; and No. 2003-070281, filed Mar. 14, 2003, the entire contents of all of which are incorporated herein by reference.

BACKGROUND OF THE INVENTION

1. Field of the Invention

The present invention relates to a program, system and method for analyzing the features of retrieval keywords input into a WWW (World Wide Web) retrieval system (or WWW search system and hereinafter referred to as "retrieval system") by a Web browsing person (hereinafter referred to as just "browsing person") in order to search for a target Web page or Web site in the WWW.

2. Description of the Related Art

As an example of an access target in the Internet, a Web page and a Web site are available. The Web page and Web site are operated for various kinds of purposes including advertisement, information provision and order reception. To achieve such an object effectively, the Web page and Web site are analyzed and investigated.

For example, an analyzer can determine a strategy about banner advertisement, publication in a directory site and participation in a prize site by knowing through which other Web sites an analyzed object Web site has been accessed. The analyzer can determine a policy for improvement of the content by knowing which retrieval has been executed and whether or not the analyzed object Web site has been accessed through a retrieval engine.

As a method of analyzing and investigating the Web page and Web site, Web access log analysis using Web access log, which stores when, how and which Web page has been accessed is available. There are mainly two kinds of the Web access logs. The first Web access log is a Web access log (Web access log in a narrow sense) recorded in a single or multiple Web servers. The second Web access log is a Web access log which stores accesses on various kinds of Web pages or Web sites by a single or multiple browsing persons. The second Web access log includes, for example, an access log which stores accesses on the Web page or Web site by each panel, which is collected from panels (or monitors) by a WWW audience measurement research company. The Web access log mentioned hereinafter means the first Web access log.

For example, the Web access log analysis investigates how the number of browsing persons (users, visitors) who access the Web page or Web site changes depending on time or day of the week. In the Web access log analysis, the kind of browser or computer OS may be investigated. In the Web access log analysis, how a browsing person acts within a single Web site or among multiple Web sites may be investigated. For example, a path analysis, clarifying that a browsing person has browsed Web page A and next browsed Web page B, and so on, is included in the Web access log analysis.

On the other hand, to support browsing on the Web page or Web site on the Internet, there exists a retrieval system indicating as a retrieval result page a list on information (for example, uniform resource locators (URL), summary information, link information and the list of keyword related pages or keyword related site) of Web pages (hereinafter referred to as "keyword related page") or Web sites (hereinafter referred to as "keyword related site"). Such a retrieval system is widely used.

FIG. 1 shows an example of screen transition of typical Web pages using the retrieval system. If a retrieval keyword is input through a browsing person's browser on a retrieval keyword input screen 1, retrieval start is instructed and then, the retrieval system extracts links 2a to 2c to a keyword related page. Next, a retrieval result page 2, indicating the links 2a to 2c to the extracted keyword related pages, is displayed to the browsing person. If any link on the retrieval result page 2 is clicked, the keyword related page of the clicked link is displayed on a browsing person's browser. For example, a link 2a is clicked, a keyword related page 3 is displayed. If the retrieval system is employed, the keyword and additional information including its input date and time are recorded in the Web access log of the Web server.

Therefore, the analysis on the retrieval keyword (hereinafter referred to as "retrieval keyword analysis") using the Web access log is enabled. In the retrieval keyword analysis, for example, how many times some retrieval keywords have been input is investigated. For example, whether or not the retrieval results on the retrieval result page have been actually clicked is investigated. For example, how many keyword related pages have been extracted corresponding to a certain retrieval keyword is investigated. Japanese Patent Application KOKAI Publication No. 2002-123517 discloses retrieval keyword analysis technology, commercial tool, non-commercial tool and services.

In the Web access log analysis, analysis of Web sites accessed just before an analyzed object Web site and analysis on the number of browsing persons corresponding to each retrieval keyword are carried out using reference information (known as "referrer") and the like.

However, the conventional Web site access log analysis disables an analyzer to understand whether or not a browsing person is satisfied with an analysis object Web site or how much a success (object) in the analysis object Web site is achieved. For example, assume that an analysis object Web site intends to improve sale amount of products. The conventional Web access log analysis enables to obtain the number of browsing persons for each retrieval keyword input to a retrieval engine if an analysis object Web site is accessed based on the retrieval result of the retrieval engine. However, even if there are many browsing persons, no product may be purchased from an analysis object Web site. Even if there are few browsing persons, most of them may purchase the product.

Thus, the analyzer cannot judge whether or not a browsing person who inputs that retrieval keyword is satisfied with an analysis object Web site and which retrieval keyword that browsing person inputs to achieve the object of the Web site. For example, the conventional Web access log analysis enables to investigate how many keyword related pages have been extracted corresponding to a certain retrieval keyword. The analyzer may judge, from viewpoints of preventing some Web pages desired by the browsing person from being neglected from extraction, that the more keyword related pages are extracted, the more the browsing person is satisfied with the retrieval result, and conversely the fewer, the less he is satisfied. However, the number of the extracted keyword related pages does not indicate the degree of satisfaction of the browsing person directly. Actually, in some cases, if the number of the extracted keyword related pages is smaller, the browsing person selects a desired link more easily so that browsing person's desire is satisfied and the degree of satisfaction is higher. That is, if keyword related pages which meet a browsing person's desire are represented to the browsing person as a retrieval result, the browsing person is more satisfied with the retrieval result in the case where a smaller number of extracted keyword related pages is presented than in the case where a redundant retrieval result is presented.

Thus, the analyzer cannot judge whether or not the browsing person is satisfied with a retrieval result from the conventional Web access log analysis. For example, by investigating whether or not a link to the keyword related pages on the retrieval result page is actually clicked and if any link is clicked, which link to keyword related page is clicked, it is possible to know which keyword related page on the retrieval result page has been selected by the browsing person. However, it is extremely difficult for the analyzer to judge whether or not an accessed keyword related page actually contains the contents which the browsing person wants and whether or not the browsing person is satisfied with the result according to the conventional Web access log analysis (evaluate the retrieval result qualitatively).

BRIEF SUMMARY OF THE INVENTION

The present invention is directed to method and apparatus that substantially obviates one or more of the problems due to limitations and disadvantages of the related art.

According to one aspect of the present invention, an article of manufacture comprising a computer usable medium having computer readable program code means embodied therein, the computer readable program code means comprising:

computer readable program code means for causing a computer to extract an access sequence indicating a continuous access by a same requester based on a Web access log which relates first identification data indicating an access requester to second identification data indicating contents to be accessed;

computer readable program code means for causing a computer to extract, when the Web access log relates second identification data indicating a retrieval system to a retrieval keyword which is input to the retrieval system by the requester, the retrieval keyword from the Web access log; and computer readable program code means for causing a computer to calculate a qualitative evaluation value of the access sequence based on a qualitative evaluation rule for defining the qualitative evaluation value of a retrieval result of the retrieval system, and create first relation data indicating a relation between the qualitative evaluation value and a retrieval keyword which is input in the access sequence.

According to another aspect of the invention, an article of manufacture comprising a computer usable medium having computer readable program code means embodied therein, the computer readable program code means comprising:

computer readable program code means for causing a computer to extract an access sequence indicating a continuous access by a same requester based on a Web access log which relates first identification data indicating an access requester to second identification data indicating contents to be accessed;

computer readable program code means for causing a computer to extract, when the Web access log relates second identification data indicating a retrieval system to a retrieval keyword which is input to the retrieval system by the requester and the retrieval keyword is input in the access sequence, the retrieval keyword which is input in the access sequence from the Web access log; and computer readable program code means for causing a computer to calculate a qualitative evaluation value of the access sequence based on a qualitative evaluation rule for defining the qualitative evaluation value of a retrieval result of the retrieval system, and create first relation data indicating a relation between the extracted retrieval keyword and the qualitative evaluation value.

According to still another aspect of the invention, an article of manufacture comprising a computer usable medium having computer readable program code means embodied therein, the computer readable program code means comprising:

computer readable program code means for causing a computer to extract, based on a Web access log which relates first identification data indicating an access requester, second identification data indicating contents to be accessed, and reference information, an access sequence indicating a continuous access including an access to the contents to be accessed indicated by the second identification data by a same requester when the reference information indicates a retrieval system;

computer readable program code means for causing a computer to extract a retrieval keyword included in the reference information when the reference information indicates the retrieval system; and computer readable program code means for causing a computer to calculate a qualitative evaluation value of the access sequence after inputting the extracted retrieval keyword based on a qualitative evaluation rule for defining the qualitative evaluation value of a retrieval result of the retrieval system, and create first relation data indicating a relation between the qualitative evaluation value and the retrieval keyword corresponding to the access sequence.

According to still another aspect of the invention, an article of manufacture comprising a computer usable medium having computer readable program code means embodied therein, the computer readable program code means comprising:

computer readable program code means for causing a computer to extract, based on a Web access log which relates first identification data indicating an access requester to second identification data indicating contents to be accessed, a sub-access sequence indicating a continuous access by a same requester;

computer readable program code means for causing a computer to extract the retrieval keyword when the Web access log relates second identification data indicating a retrieval system to a retrieval keyword input to the retrieval system by the requester; and computer readable program code means for causing a computer to calculate a qualitative evaluation value of the sub-access sequence based on a qualitative evaluation rule for defining the qualitative evaluation value of a retrieval result of the retrieval system, and create relation data indicating a relation between the extracted retrieval keyword and the qualitative evaluation value.

According to still another aspect of the invention, a retrieval keyword analyzing system comprising:

means for extracting an access sequence indicating a continuous access by a same requester based on a Web access log which relates first identification data indicating an access requester to second identification data indicating contents to be accessed;

means for extracting, when the Web access log relates second identification data indicating a retrieval system to a retrieval keyword input to the retrieval system by the requester, the retrieval keyword from the Web access log; and means for calculating a qualitative evaluation value of the access sequence based on a qualitative evaluation rule for defining the qualitative evaluation value of a retrieval result of the retrieval system, and creating first relation data indicating a relation between the qualitative evaluation value and a retrieval keyword which is input in the access sequence.

According to still another aspect of the invention, a retrieval keyword analyzing system comprising:

means for extracting an access sequence indicating a continuous access by a same requester based on a Web access log which relates first identification data indicating an access requester to second identification data indicating contents to be accessed;

means for extracting, when the Web access log relates second identification data indicating a retrieval system to a retrieval keyword which is input to the retrieval system by the requester and the retrieval keyword is input in the access sequence, the retrieval keyword which is input in the access sequence from the Web access log; and means for calculating a qualitative evaluation value of the access sequence based on a qualitative evaluation rule for defining the qualitative evaluation value of a retrieval result of the retrieval system, and creating first relation data indicating a relation between the extracted retrieval keyword and the qualitative evaluation value.

According to still another aspect of the invention, a retrieval keyword analyzing system comprising:

means for extracting, based on a Web access log which relates first identification data indicating an access requester, second identification data indicating contents to be accessed, and reference information, an access sequence indicating a continuous access including an access to the contents to be accessed indicated by the second identification data by a same requester when the reference information indicates a retrieval system;

means for extracting a retrieval keyword included in the reference information when the reference information indicates the retrieval system; and means for calculating a qualitative evaluation value of the access sequence after inputting the extracted retrieval keyword based on a qualitative evaluation rule for defining the qualitative evaluation value of a retrieval result of the retrieval system, and creating first relation data indicating a relation between the qualitative evaluation value and the retrieval keyword corresponding to the access sequence.

According to still another aspect of the invention, a retrieval keyword analyzing system comprising:

means for extracting, based on a Web access log which relates first identification data indicating an access requester to second identification data indicating contents to be accessed, a sub-access sequence indicating a continuous access by a same requester and having a starting end at which retrieval result contents are accessed and a terminal end at which a next continuous access starts;

means for extracting the retrieval keyword when the Web access log relates second identification data indicating a retrieval system to a retrieval keyword input to the retrieval system by the requester; and means for calculating a qualitative evaluation value of the sub-access sequence based on a qualitative evaluation rule for defining the qualitative evaluation value of a retrieval result of the retrieval system, and creating relation data indicating a relation between the extracted retrieval keyword and the qualitative evaluation value.

According to still another aspect of the invention, a retrieval keyword analyzing method comprising the steps of:

extracting an access sequence indicating a continuous access by a same requester based on a Web access log which relates first identification data indicating an access requester to second identification data indicating contents to be accessed;

extracting, when the Web access log relates second identification data indicating a retrieval system to a retrieval keyword which is input to the retrieval system by the requester, the retrieval keyword from the Web access log; and calculating a qualitative evaluation value of the access sequence based on a qualitative evaluation rule for defining the qualitative evaluation value of a retrieval result of the retrieval system, and creating first relation data indicating a relation between the qualitative evaluation value and a retrieval keyword which is input in the access sequence.

According to still another aspect of the invention, a retrieval keyword analyzing method comprising the steps of:

extracting an access sequence indicating a continuous access by a same requester based on a Web access log which relates first identification data indicating an access requester to second identification data indicating contents to be accessed;

extracting, when the Web access log relates second identification data indicating a retrieval system to a retrieval keyword which is input to the retrieval system by the requester and the retrieval keyword is input in the access sequence, the retrieval keyword which is input in the access sequence from the Web access log; and calculating a qualitative evaluation value of the access sequence based on a qualitative evaluation rule for defining the qualitative evaluation value of a retrieval result of the retrieval system, and creating first relation data indicating a relation between the extracted retrieval keyword and the qualitative evaluation value.

According to still another aspect of the invention, a retrieval keyword analyzing method comprising the steps of:

extracting, based on a Web access log which relates first identification data indicating an access requester, second identification data indicating contents to be accessed, and reference information, an access sequence indicating a continuous access including an access to the contents to be accessed indicated by the second identification data by a same requester when the reference information indicates a retrieval system;

extracting a retrieval keyword included in the reference information when the reference information indicates the retrieval system; and calculating a qualitative evaluation value of the access sequence after inputting the extracted retrieval keyword based on a qualitative evaluation rule for defining the qualitative evaluation value of a retrieval result of the retrieval system, and creating first relation data indicating a relation between the qualitative evaluation value and the retrieval keyword corresponding to the access sequence.

According to still another aspect of the invention, a retrieval keyword analyzing method comprising the steps of:

extracting, based on a Web access log which relates first identification data indicating an access requester to second identification data indicating contents to be accessed, a sub-access sequence indicating a continuous access by a same requester and having a starting end at which retrieval result contents are accessed and a terminal end at which a next continuous access starts;

extracting the retrieval keyword when the Web access log relates second identification data indicating a retrieval system to a retrieval keyword input to the retrieval system by the requester; and calculating a qualitative evaluation value of the sub-access sequence based on a qualitative evaluation rule for defining the qualitative evaluation value of a retrieval result of the retrieval system, and creating relation data indicating a relation between the extracted retrieval keyword and the qualitative evaluation value.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 3 is a block diagram showing an example of the configuration of a customer site according to the first embodiment;

FIG. 4 is a diagram showing an example of information contained in a Web access log 7;

FIG. 5 is a diagram showing an example of pre-processed data generated by a log pre-processing unit 12;

FIG. 6 is a diagram showing an example of access sequence data;

FIG. 7 is a diagram showing an example of a request to a retrieval system in the Web access log 7;

FIG. 8 is a diagram showing an example of information about the location of the retrieval system and query pattern;

FIG. 9 is a diagram showing an example of a parameter extracted by a keyword extracting unit 14 based on FIGS. 7 and 8;

FIG. 10 is a diagram showing an example of keyword data;

FIG. 11 is a diagram showing an example which relates the after-retrieval browsing time with the satisfaction degree;

FIG. 12 is a diagram showing an example of satisfaction degree data generated by a satisfaction degree calculation unit 15;

FIG. 23 is a block diagram showing an example of the configuration of a retrieval keyword analyzing system according to a fourth embodiment of the present invention;

FIG. 24 is a diagram showing an example of an access demand page list employed for the qualitative evaluation rule;

FIG. 25 is a diagram showing an example of a success degree weighting table for reducing the success degree as the number of link clicks from a retrieval result page up to an access demand page increases;

FIG. 26 is a diagram showing first intermediate generation data;

FIG. 27 is a diagram showing second intermediate generation data;

FIG. 28 is a diagram showing an example of the configuration of a customer site according to a fifth embodiment of the present invention;

FIG. 29 is a diagram showing an example of Web access log in a customer site 61;

FIG. 31 is a diagram showing data which relates a URL pattern expressing the off-site retrieval system and query pattern for extracting the retrieval keyword;

FIG. 32 is a diagram showing an example of access sequence data;

FIG. 33 is a diagram showing an example of keyword data generated by the keyword extracting unit 14;

FIG. 40 is a diagram showing an example of a calculation result on a need value of a retrieval keyword input to access an analyzing object Web site and the satisfaction degree;

FIG. 41 is a diagram showing an example of the relation between the need value/satisfaction degree of each retrieval keyword and the need value/satisfaction degree of each category;

FIG. 42 is a diagram showing an example of a state in which a message is attached to a transition condition of the retrieval keyword;

FIG. 58 is a diagram showing an example of a state of an access sequence in case where a customer site is provided with a retrieval system;

FIG. 59 is a diagram showing an example of a state of an access sequence in case where the retrieval system exists out of the customer site;

FIG. 60 is a diagram showing an example of a state of an access sequence in case where the retrieval system exists out of the customer site while a retrieval result page exists halfway of the access sequence within the customer site;

FIG. 61 is a diagram showing an example of a state in which multiple retrievals are carried out in an access sequence in case where the retrieval system exists within the customer site;

FIG. 66 is a block diagram showing an example of the configuration of a retrieval keyword analyzing system according to a ninth embodiment of the present invention;

FIG. 68 is a diagram showing access sequence data created by an access sequence extracting unit 90;

FIG. 70 is a temporary first table generated as a result of processing;

FIG. 71 is a diagram showing an example of a screen transition of an access sequence;

FIG. 72 is a temporary second table generated as a result of processing;

FIG. 73 is an example of specific information 95 for specifying the retrieval system out of the customer site;

FIG. 74 is a temporary third table generated as a result of processing;

FIG. 75 is an extracted example of sub-access sequence data;

DETAILED DESCRIPTION OF THE INVENTION

Figure 1:
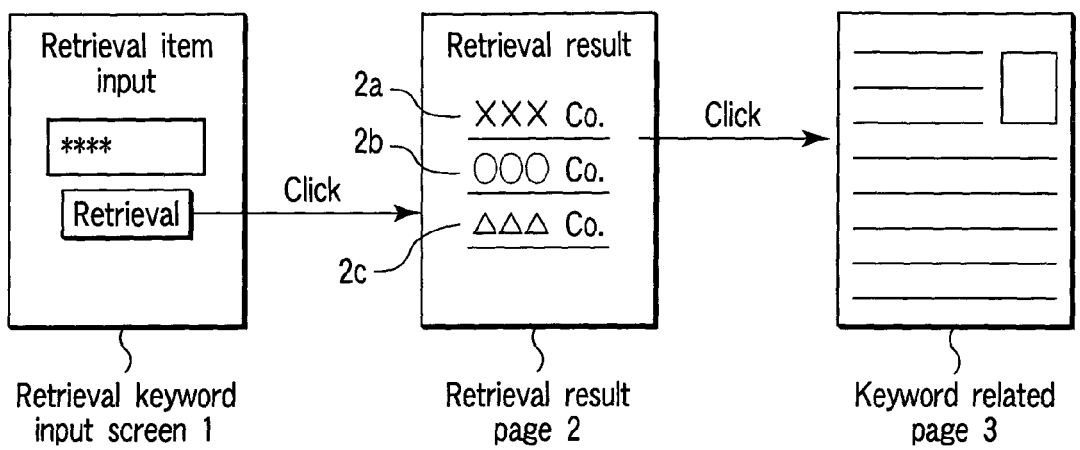
FIG. 1 is a diagram showing a typical example of screen transition of a Web page using a retrieval system.

An embodiment of a retrieval keyword analyzing system and method according to the present invention will now be described with reference to the accompanying drawings. The Web site mentioned here refers to a group of Web page including at least one Web page.

First Embodiment

This embodiment relates to a retrieval keyword analyzing system for obtaining a qualitative evaluation value to a retrieval result based on a retrieval keyword input by a browsing person with a high degree of accuracy by analyzing a browsing action (including screen transitions over two or more pages) of the browsing person, from a retrieval result page indicating a retrieval result by the retrieval system.

As described above, the retrieval system extracts information about the keyword related pages determined to be related to the retrieval keyword, corresponding to a retrieval keyword input by the browsing person and makes a list thereof so as to present to the browsing person. The browsing person inputs a retrieval keyword freely to the retrieval system based on his or her intention. Thus, input frequencies of various kinds of retrieval keywords do not reach a specific rate among those various kinds of the retrieval keywords, so that a certain amount of differential occurs. Therefore, there occurs a difference in qualitative evaluation value which evaluates a retrieval result by a retrieval keyword input to access a customer site quantitatively depending upon each retrieval keyword. The quantitative evaluation value includes a need value expressing the amount, number and multiplicity of needs on the retrieval result for each retrieval keyword, and for example, the number of inputs of the retrieval keyword is adopted as the need value. Additionally, examples of the quantitative evaluation value include the number of keyword related pages extracted based on the aforementioned retrieval keyword and the number of clicks on the retrieval result page.

On the other hand, the keyword related page retrieved based on the retrieval keyword is not always contents desired by the browsing person. Thus, the meaning of obtaining the qualitative evaluation value which evaluates the retrieval result qualitatively on a basis of the retrieval keyword input to access the customer site is large.

As an example of the qualitative evaluation value, the degree of effect which is a degree indicating how effectively the retrieval result based on the retrieval keyword functions is available. Further, as a specific example of the degree of effect, the degree of satisfaction indicating how a browsing person using the retrieval system is satisfied with information service provided by the retrieval system to the retrieval keyword is available. As another example of the degree of effect, the degree of success indicating how many browsing persons in its own site access a Web page which a Web site operator wants to be accessed is available. Other examples of the qualitative evaluation value include the degree of importance indicating how important the browsing person considers a retrieval result by the retrieval keyword is available. There occurs a difference in the qualitative evaluation value among the retrieval keywords depending on the performance of the retrieval system, the quality of listed keyword related pages, the contents and the like.

For a manager of the Web page or Web site, investigating the qualitative evaluation value is effective for grasping how much the Web page, Web site and the retrieval system managed by himself satisfy the browsing persons and effective for improvement of the design and contents of the Web page, Web site and the retrieval system.

Although in this embodiment, a case for obtaining the degree of satisfaction as a qualitative evaluation value will be described, the same thing is said about a case of obtaining other qualitative evaluation value instead of the degree of satisfaction.

Figure 2:
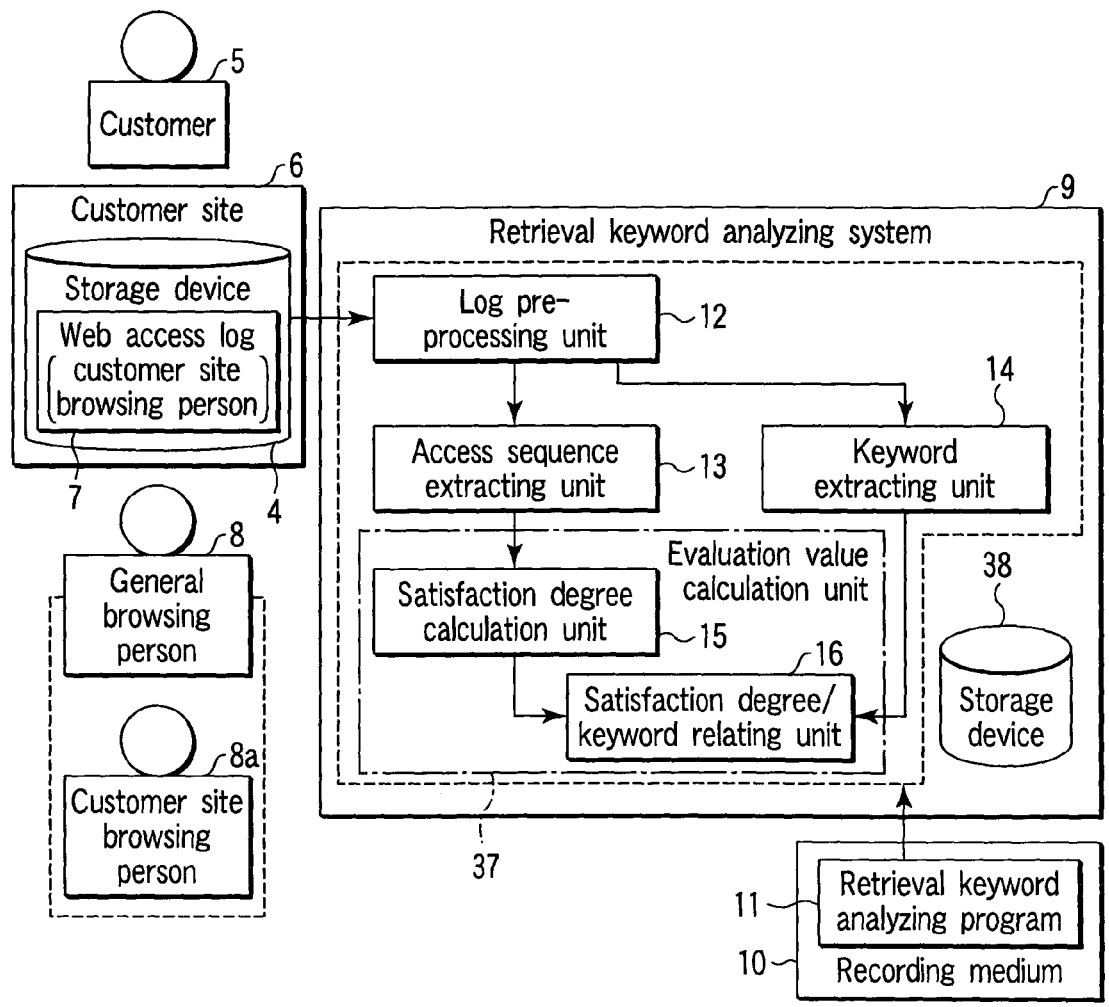
FIG. 2 is a block diagram showing an example of the configuration of a retrieval keyword analysis system according to a first embodiment of the present invention.

FIG. 2 is a block diagram showing an example of the configuration of the retrieval keyword analyzing system. A storage device 4 stores a Web access log 7 of a customer site 6 which is managed by a customer 5 who is a manager of an investigation object Web site.

FIG. 3 is a block diagram showing an example of the configuration of the customer site 6. The customer site 6 corresponds to an analysis object site and includes an on-site retrieval system 6a within the customer site 6 and one or more Web pages $P_1$ to $P_n$. The on-site retrieval system 6a retrieves the Web page within a specific site. Referring to FIG. 3, the on-site retrieval system 6a retrieves the Web pages $P_1$ to $P_n$ of the customer site 6.

Of general browsing persons 8, a browsing person who accesses the customer site 6 is called customer site browsing person 8a.

FIG. 4 shows an example of the Web access log 7. The Web access log 7 contains a record comprising a host name or IP address, information about date and time when the customer site browsing person 8a accesses the customer site 6, a request (URL) issued by the customer site browsing person 8a, reference information (known as referrer), ID (user ID) of the customer site browsing person 8a who accesses and the like, which are recorded each time when the customer site browsing person 8a accesses the customer site 6.

The reference information refers to information indicating through which Web page or pages (link) the accessed Web page is accessed. In FIG. 4, description of specific values is omitted about user ID of the customer site browsing person 8a and reference information.

A retrieval keyword analyzing system 9 reads out a retrieval keyword analyzing program 11 recorded in a recording medium 10 and executes it.

When the retrieval keyword analyzing program 11 is read by the system 9 and executed, a log pre-processing unit 12, an access sequence extracting unit 13, a keyword extracting unit 14, and an evaluation value calculation unit 37 are realized.

The evaluation value calculation unit 37 includes a satisfaction degree calculation unit 15 and a satisfaction degree/keyword relating unit 16.

Data created by the respective units 12 to 16 are recorded in a storage device 38. The respective units 12 to 16 are capable of reading data stored in the storage device 38. As the storage device 38, for example, an internal memory and the like are employed. Exchange of various kinds of data among the respective units 12 to 16 may be carried out through the storage device 38. In this case, a data sender stores data to be sent in the storage device 38 and a data receiver reads out data from the storage device 38.

The log pre-processing unit 12 inputs information necessary for the retrieval keyword analyzing system 9 based on the Web access log 7 stored in the storage device 4.

The log pre-processing unit 12 provides each page access with an access identifier (view ID) which has no duplicate based on the input information. FIG. 5 shows an example of the pre-processed data generated by the log pre-processing unit 12.

The access sequence extracting unit 13 extracts a sequence of sequential Web pages (hereinafter referred to as "access sequence") accessed by the customer site browsing person 8a and provides each access sequence with an access sequence identifier which has no duplicate so as to generate access sequence extraction data. The access sequence mentioned here refers to a continuous access by the same browsing person or browsing persons regarded as the same person, that is, the same access person.

If combinations of the host name or IP address and a user agent coincides with each other, the access sequence extracting unit 13 handles that the access sequence is accessed by the same access person and assigns a combination of the host name or IP address and the user agent with an access requesting person identifier (referred to access person identifier) and then extracts one or more Web pages accessed by the same access person continuously as an access sequence.

The access sequence extracting unit 13 extracts an access sequence out of a sequential page access according to a predetermined access sequence extraction rule and creates an access sequence data indicating an extraction result of the access sequence. For example, a rule for extracting a session used for a general Web access log analysis is employed as an access sequence extracting rule. More specifically, if it takes more than 30 minutes from an access to a Web page by a browsing person to an access to a next Web page (including a case where screen transition to a next Web page does not occur), an interval between those accesses is regarded as a session border (or a session terminal end) and then, an interval between session borders is extracted as a session. The session is used as an access sequence.

A time period for determining the border between one access sequence and another access sequence is not limited to the above-mentioned 30 minutes but is set up freely. That is, if multiple accesses are made by the same access person within a predetermined time interval, it may be possible to adopt a rule which determines that the multiple accesses are included in the same access sequence.

When the access sequence is extracted, it may be possible to determine the identity of the access person based on browsing person's ID (user ID) or Cookie information recorded in the Web access log 7.

FIG. 6 shows an example of access sequence data. The access sequence data shown in FIG. 6 includes a record comprising an access sequence identifier (visit ID) for identifying each access sequence, an access person identifier (visitor ID) for identifying a combination of the host name and user agent, and the like.

The keyword extracting unit 14 extracts a retrieval keyword input by the customer site browsing person 8a in the on-site retrieval system 6a from the pre-processed data generated by the log pre-processing unit 12 and creates keyword data indicating a retrieval keyword extraction result.

FIG. 7 shows examples of a request to the retrieval system included in the Web access log 7. An example 1 indicates a request to a basic retrieval system including a retrieval keyword "xxxx." In an example 2, a retrieval keyword "yyyy" and the 10th page of its retrieval result are requested. In an example 3, a code indicating a retrieval keyword "りんご (apple)" is contained in the request.

To extract a retrieval keyword from the Web access log 7, information about a query pattern expressing parameters indicating the location of a retrieval system and a retrieval keyword is used.

FIG. 8 shows an example of information about the location of the retrieval system and query pattern. That is, the keyword extracting unit 14 extracts an access through the retrieval system from the pre-processed data on a basis of information about the location of the retrieval system.

The keyword extracting unit 14 extracts a retrieval keyword based on the information about query pattern. FIG. 9 shows examples 1 to 3 of parameters extracted by the keyword extracting unit 14 based on the examples shown in FIGS. 7 and 8.

The extracted parameters include parameters encoded as shown in an example 3 in FIG. 9.

The keyword extracting unit 14 decodes an encoded parameter to a readable character string so as to generate keyword data.

FIG. 10 shows an example of keyword data. The keyword data of FIG. 10 includes a record comprising an access identifier and a retrieval keyword input upon an access corresponding to the access identifier.

The satisfaction degree calculation unit 15 calculates the degree of satisfaction of a browsing person based on access sequence data generated by the access sequence extracting unit 13.

To calculate the satisfaction degree, a qualitative evaluation rule indicating how to calculate the satisfaction degree is defined.

For example, as the qualitative evaluation rule, it is defined a rule that the longer a browsing retrieval time (hereinafter referred to as "after-retrieval browsing time") in the customer site 6 by the customer site browsing person 8a after a retrieval keyword is input to the on-site retrieval system 6a is, the higher the satisfaction degree is.

FIG. 11 shows an example of the relation between the after-retrieval browsing time and the satisfaction degree. The after-retrieval browsing time is a time interval obtained by subtracting a time of access on a first keyword related page from a last access time in an access sequence for obtaining the satisfaction degree. However, if the access sequence ends without any screen transition from the retrieval result page to the keyword related page, the after-retrieval browsing time is defined as "no browsing." If a screen transition occurs from the retrieval result page to the keyword related page and its access sequence ends without browsing any Web page in another site, the after-retrieval browsing time is defined as "browsing only one page."

That is, the satisfaction degree calculation unit 15 reads access sequence data and calculates the after-retrieval browsing time of each access sequence.

The satisfaction degree calculation unit 15 reads correspondence data between the after-retrieval browsing time and the satisfaction degree shown in FIG. 11, and calculates the satisfaction degree of each access sequence.

FIG. 12 shows an example of satisfaction degree data calculated by the satisfaction degree calculation unit 15.

The satisfaction degree data of FIG. 12 contains a record comprising an access identifier and a satisfaction degree corresponding to an access sequence identifier which the access belongs to.

The satisfaction degree/keyword relating unit 16 relates the satisfaction degree data calculated by the satisfaction degree calculation unit 15 to keyword data generated by the keyword extracting unit 14, calculates the satisfaction degree of each retrieval keyword, relates the satisfaction degree to the retrieval keyword and creates relation data.

The satisfaction degree/keyword relating unit 16 reads satisfaction degree data and keyword data.

The satisfaction degree/keyword relating unit 16 relates the satisfaction degree data to the keyword data based on the access identifier.

Figures 13, 14, 15:
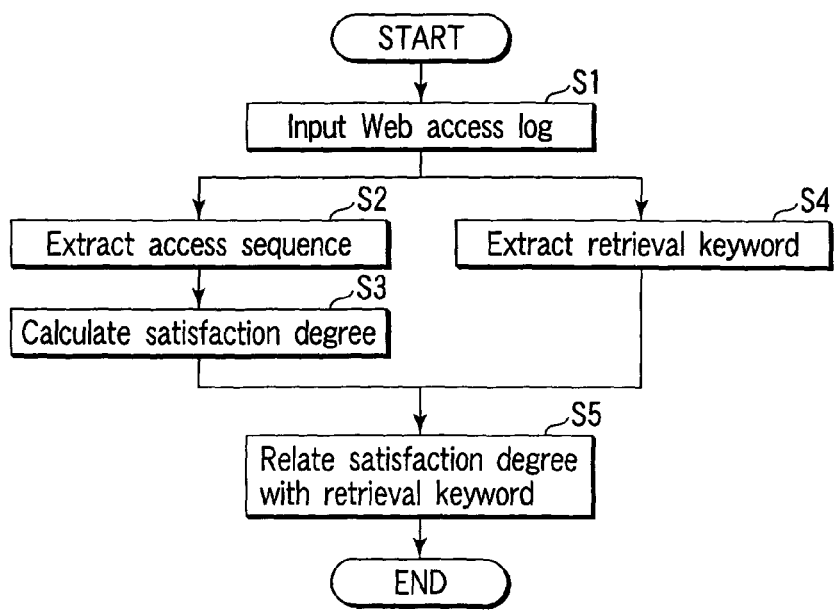
FIG. 13 is a diagram showing a result of relation of the satisfaction degree data and keyword data.
FIG. 14 is a diagram showing an example of relation data between the retrieval keyword and satisfaction degree.
FIG. 15 is a flow chart showing an example of the operation of the retrieval keyword analyzing system according to the first embodiment.

FIG. 13 shows a relation between the satisfaction degree data and the keyword data. The satisfaction degree/keyword relating unit 16 obtains an average of the satisfaction degree of each retrieval keyword to create relation data.

FIG. 14 shows an example of the relation data.

FIG. 15 is a flow chart showing an example of an operation of the retrieval keyword analyzing system 9.

In step S1, the log pre-processing unit 12 inputs necessary information from the information contained in the Web access log 7 to create pre-processed data.

In step S2, the access sequence extracting unit 13 extracts an access sequence based on the pre-processed data and access sequence extracting rule to create access sequence data.

In step S3, the satisfaction degree calculation unit 15 calculates the satisfaction degree of each access sequence based on the access sequence data and the satisfaction degree calculation rule to create satisfaction degree data.

In step S4, the keyword extracting unit 14 extracts the retrieval keyword input to the on-site retrieval system 6a based on the pre-processed data to create keyword data.

In step S5, the satisfaction degree/keyword relating unit 16 calculates the satisfaction degree of each retrieval keyword based on the satisfaction degree data and keyword data to create relation data.

Step S4 may be executed prior to step S2 and step S3, after those steps or in parallel.

Figure 16:
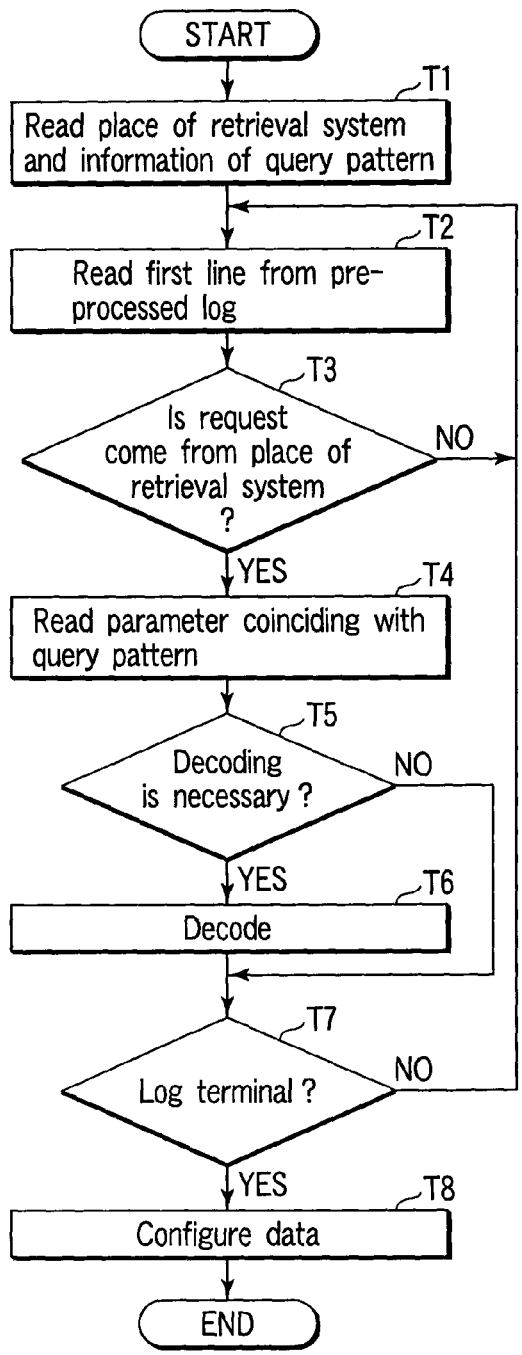
FIG. 16 is a flow chart showing an example of the operation of the keyword extracting unit according to the first embodiment.

FIG. 16 is a flow chart showing an example of the operation of the keyword extracting unit 14.

In step T1, the keyword extracting unit 14 reads information about the location of retrieval system and query pattern.

In step T2, the keyword extracting unit 14 reads a record from one Web access log 7 preliminarily processed by the log pre-processing unit 12.

In step T3, the keyword extracting unit 14 determines whether or not a request included in the read record contains the location of the retrieval system.

When it is determined that the request includes the location of the retrieval system, in step T4, the keyword extracting unit 14 extracts a parameter from the request based on a query pattern corresponding to the location of the retrieval system.

When it is not determined that the request includes the location of the retrieval system, the keyword extracting unit 14 repeats processing from step T2.

In step T5, the keyword extracting unit 14 determines whether or not decoding is necessary for the extracted parameter.

When decoding is necessary, in step T6, the keyword extracting unit 14 decodes the extracted parameter.

In step T7, the keyword extracting unit 14 determines whether or not a record at an end is read from the Web access log 7 which is preliminarily processed by the log pre-processing unit 12.

If it is determined that the record at the end is not read, the keyword extracting unit 14 repeats processing from step T2.

When it is determined that the record at the end is read, in step T8, the keyword extracting unit 14 creates keyword data with the extracted parameter as a retrieval keyword.

Figure 17:
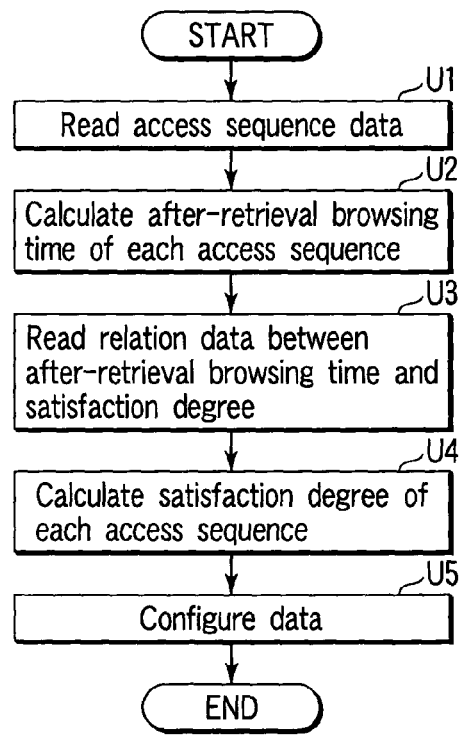
FIG. 17 is a flow chart showing an example of the operation of the satisfaction degree calculation unit according to the first embodiment.

FIG. 17 is a flow chart showing an example of the operation of the satisfaction degree calculation unit 15.

In step U1, the satisfaction degree calculation unit 15 reads access sequence data generated by the access sequence extracting unit 13.

In step U2, the satisfaction degree calculation unit 15 calculates after-retrieval browsing time of each access sequence.

In step U3, the satisfaction degree calculation unit 15 reads data about the relation between the after-retrieval browsing time and the satisfaction degree.

In step U4, the satisfaction degree calculation unit 15 obtains a satisfaction degree corresponding to the after-retrieval browsing time of each access sequence.

In step U5, the satisfaction degree calculation unit 15 creates satisfaction degree data indicating the satisfaction degree of each access sequence.

Step U3 may be executed before step U1 and step U2 or in parallel.

In this embodiment described above, as an analysis result about the retrieval keyword, how the customer site browsing person 8a is satisfied with a retrieval result by its retrieval keyword is investigated and not only a quantitative evaluation value but also a high precision qualitative evaluation value upon the retrieval keyword is analyzed.

According to this embodiment, for example, the customer 5 knows how the customer site browsing person 8a is satisfied with the retrieval result quantitatively. For example, as evident from FIG. 14, while the satisfaction degree of the customer site browsing person 8a on a retrieval result of a retrieval keyword "りんご (apple)" is high, the retrieval result by a retrieval keyword "砂糖 (sugar)" or a retrieval keyword "肉野菜 (meat and vegetable)" provides a low satisfaction degree of the customer site browsing person 8a.

As the qualitative evaluation value, in addition to the degree of effect represented by the satisfaction degree or the like, for example, the degree of importance or the degree of convenience is considered.

The degree of importance refers to an index indicating how important the Web site browsing person takes matters relating to the retrieval keyword as.

The degree of convenience refers to an index indicating how easily the Web site browsing person browses matter or writes the matter to the Web site and the like relating to the retrieval keyword.

The degree of importance and the degree of convenience is obtained according to the after-retrieval browsing time like the degree of satisfaction.

Which of the satisfaction degree, the degree of importance and the degree of convenience the after-retrieval browsing time will be used to calculate is selected appropriately depending on a Web site which is an analyzing object, the character of a browsing person or viewpoint of an analyzer.

For example, it is considered that in case where there exist a number of competitive similar sites in an electric commerce (EC) site which sells products, if the contents relating to a retrieval keyword do not coincide with a customer's desire, the customer gives up his browsing in a relatively short time and leaves the site to search for another site. In this case, it is appropriate to use the after-retrieval browsing time as the satisfaction degree. For example, if an analysis result that "the degree of satisfaction to 蜂蜜 (honey) is low" is obtained because the after-retrieval browsing time to the keyword "蜂蜜 (honey)" is short, this result is effective as a reason for determining that the necessity of taking measures for raising the satisfaction degree by improving the content relating to "蜂蜜 (honey)" is high.

On the other hand, if there exist few other similar competitive sites or if provided contents are browsed due to the rational necessity rather than a fact that the contents satisfy a browsing person's desire or if there exist a number of browsing persons who want to obtain information about the retrieval keyword from that Web site, it is considered that the browsing person stays in the site for a long time and browses its information depending on how important he takes the content relating to the retrieval keyword. Therefore, it may be sometimes appropriate to use the after-retrieval browsing time to calculate the degree of importance. In this case, if an analysis result that the degree of importance to a certain retrieval keyword is low because the after-retrieval browsing time to that retrieval keyword is short is obtained, this result is effective as a reason for determining that the contents have a low necessity for taking a measure for its improvement.

Further, the degree of convenience is effective as an index for evaluating how easily the browsing person understands provided contents or how easily the information is input.

For example, in a Web site in which the contents of questionnaire are changed depending on the retrieval keyword, if the after-retrieval browsing time is long, it is considered that it takes labor and time to input an answer to the questionnaire and that its degree of convenience is low.

If there are contents having a low degree of convenience, this is effective as a reason for determining that the necessity of taking measure for improving that degree of convenience is high.

Second Embodiment

In this embodiment, a modification of the retrieval keyword analyzing system according to the first embodiment will be described. Although in this embodiment, a case where the degree of satisfaction is obtained as the qualitative evaluation value while the need value is obtained as the quantitative evaluation value will be described, the same thing is said if it is intended to obtain other qualitative evaluation value and quantitative evaluation value.

Figure 18:
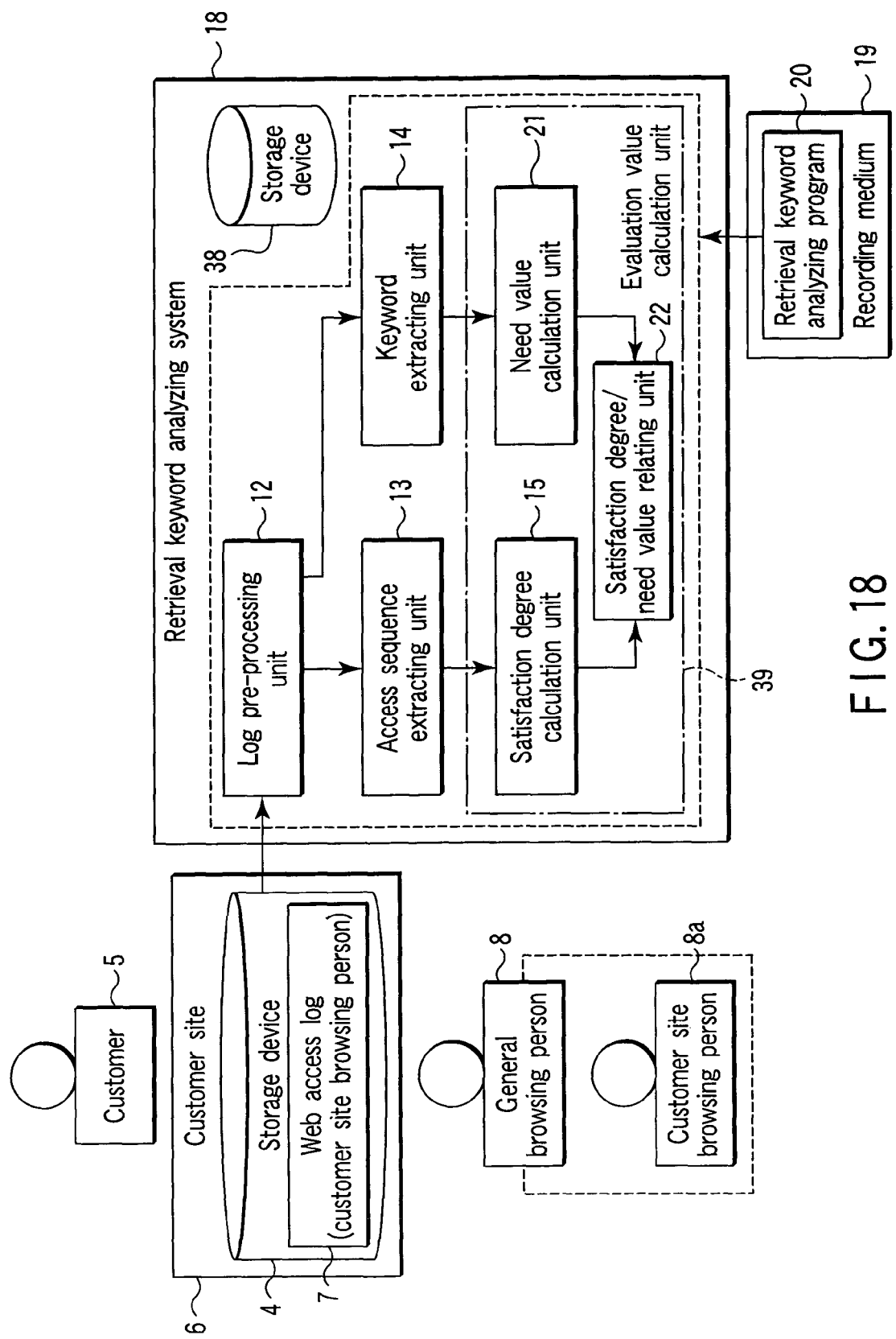
FIG. 18 is a block diagram showing an example of the configuration of a retrieval keyword analyzing system according to a second embodiment of the present invention.

FIG. 18 is a block diagram showing an example of the configuration of the retrieval keyword analyzing system according to the second embodiment.

A retrieval keyword analyzing system 18 reads out a retrieval keyword analyzing program 20 recorded in a recording medium 19 and executes it.

When the retrieval keyword analyzing program 20 is read in the system 18 and executed, the log pre-processing unit 12, the access sequence extracting unit 13, the keyword extracting unit 14 and an evaluation value calculation unit 39 are realized.

The evaluation value calculation unit 39 includes the satisfaction degree calculation unit 15, a need value calculation unit 21 and a satisfaction degree/need value relating unit 22.

Data obtained by the need value calculation unit 21 and the satisfaction degree/need value relating unit 22 are stored in the storage device 38. The need value calculation unit 21 and the satisfaction degree/need value relating unit 22 are capable of reading data stored in the storage device 38.

The need value calculation unit 21 calculates a need value for each retrieval keyword based on keyword data generated by the keyword extracting unit 14.

To calculate the need value, a quantitative evaluation rule expressing how the need value is calculated is defined.

For example, as the quantitative evaluation rule, the value expressing a ratio with a percentage of each retrieval keyword to a total number of the retrieval keywords is defined as the need value.

The need value calculation unit 21 reads keyword data generated by the keyword extracting unit 14 and counts the input number of each retrieval keyword.

The need value calculation unit 21 calculates a total input number of all the retrieval keywords from the input numbers of respective retrieval keywords.

The need value calculation unit 21 expresses a ratio with a percentage of each retrieval keyword to the retrieval keywords based on the input number of the all retrieval keywords and the input number of the respective retrieval keywords.

The need value calculation unit 21 outputs need value data indicating the need value of each retrieval keyword.

Figures 19, 20, 22:
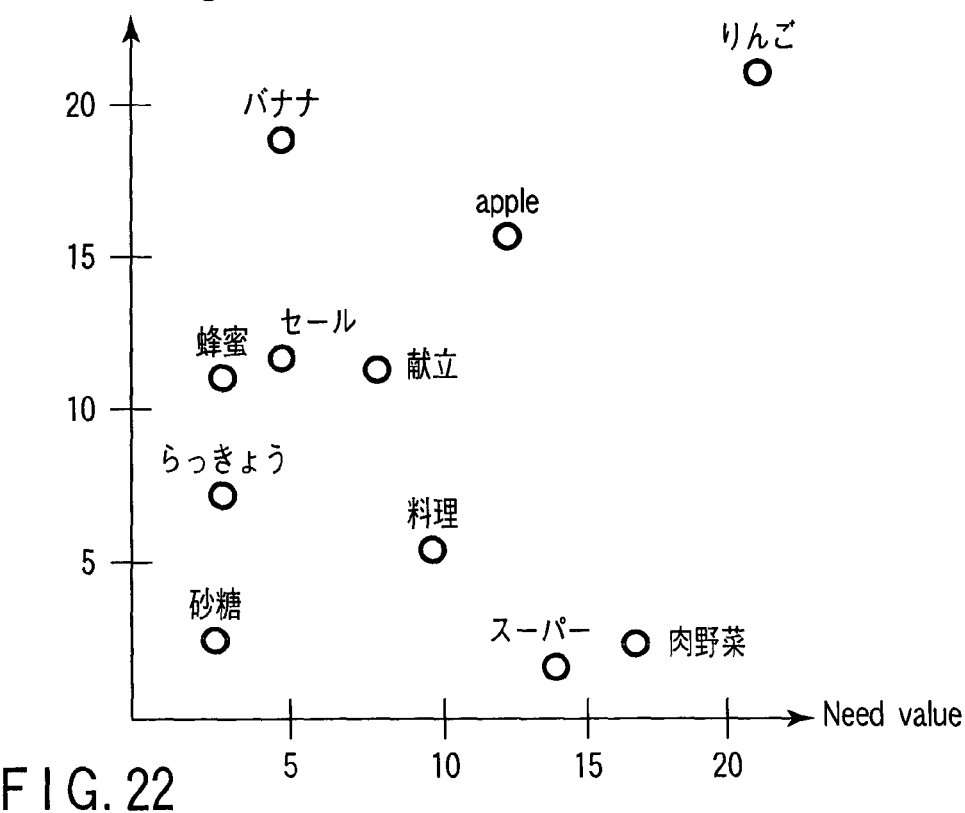
FIG. 19 is a diagram showing an example of need value data.
FIG. 20 is a diagram showing an example of relation data.
FIG. 22 is a diagram showing an example of a graph displayed according to the third embodiment.

FIG. 19 shows an example of need value data. The satisfaction degree/need value relating unit 22 reads satisfaction degree data generated by the satisfaction degree calculation unit 15 and need value data generated by the need value calculation unit 21.

The satisfaction degree/need value relating unit 22 relates the satisfaction degree data to the need value data for each retrieval keyword and outputs relation data expressing the need value and satisfaction degree of each retrieval keyword.

FIG. 20 shows an example of the relation data.

According to the second embodiment, the customer 5 knows a retrieval keyword which needs to be taken measures quickly by referring to the qualitative evaluation value (for example, satisfaction degree) and quantitative evaluation value (for example, need value).

For example, referring to the example shown in FIG. 20, it is interpreted that for the customer 5, retrieval keywords "砂糖 (sugar)" and "肉野菜 (meat and vegetable)" indicate similar degrees of satisfaction, which are lower than the satisfaction degree of other retrieval keywords, the "肉野菜 (meat and vegetable)" has a higher need value than "砂糖 (sugar)."

As a result, for the customer 5, although the satisfaction degree for the retrieval keyword "砂糖 (sugar)" is low, its retrieval need is low (in the case of this embodiment, the number of browsing persons on a retrieval result page by the retrieval keyword "砂糖 (sugar)" is small) and therefore, it is considered that its influence is relatively low.

Contrary to this, for the customer 5, although the retrieval keyword "肉野菜 (meat and vegetable)" has a satisfaction degree about as low as the "砂糖 (sugar)," it has retrieval needs (in case of this embodiment, the number of browsing persons on a retrieval result page by the retrieval keyword "肉野菜 (meat and vegetable)" is large), it is considered that its influence is high.

Thus, the customer 5 determines it necessary to take measures such as increasing contents relating to the "肉野菜 (meat and vegetable)" and change the on-site retrieval system 6a and Web pages $P_1$ to $P_n$ to meet a desire of the browsing person quickly and accurately.

The need value calculating method is changed freely by changing setting of the keyword extracting unit 14 and the need value calculation unit 21. For example, the need value may be calculated based on the number of customer site browsing persons 8a who access keyword related pages obtained by inputting a retrieval keyword or the number of accesses made on the keyword related pages. For example, the need value may be calculated based on the number of browsing persons who access according to an access sequence or the frequency (number of browses) of the access made according to the access sequence.

As the quantitative evaluation value, a chance value as well as the need value is available. The chance value is an index indicating how many business chances are gained in viewpoints of the retrieval keyword when a Web site achieves its object. For example, for an EC site which sells foods, if there exist a number of browsing persons who visit through the retrieval keyword "砂糖 (sugar)," it comes that the site obtains corresponding many business chances for selling sugar.

It may be possible to calculate the chance value based on the quantity used for calculating the need value like the input number of each retrieval keyword.

Which is adopted as the input number of each retrieval keyword the need value or the chance value depends on the characteristic of the browsing person of the Web site or viewpoint of the analyzer.

For example, for a Web site operated to provide with information about commodity to know its reaction rather than sell just the commodity, it is appropriate to handle the input number of each retrieval keyword as the need value.

On the other hand, for a Web site mainly aiming at selling the commodity itself on line, it is appropriate to handle the input number of each retrieval keyword as the chance value and employ this chance value as an index indicating the amount of chances for selling products relating to each retrieval keyword.

Third Embodiment

In this embodiment, a modification of the retrieval keyword analyzing system according to the second embodiment will be described.

Figure 21:
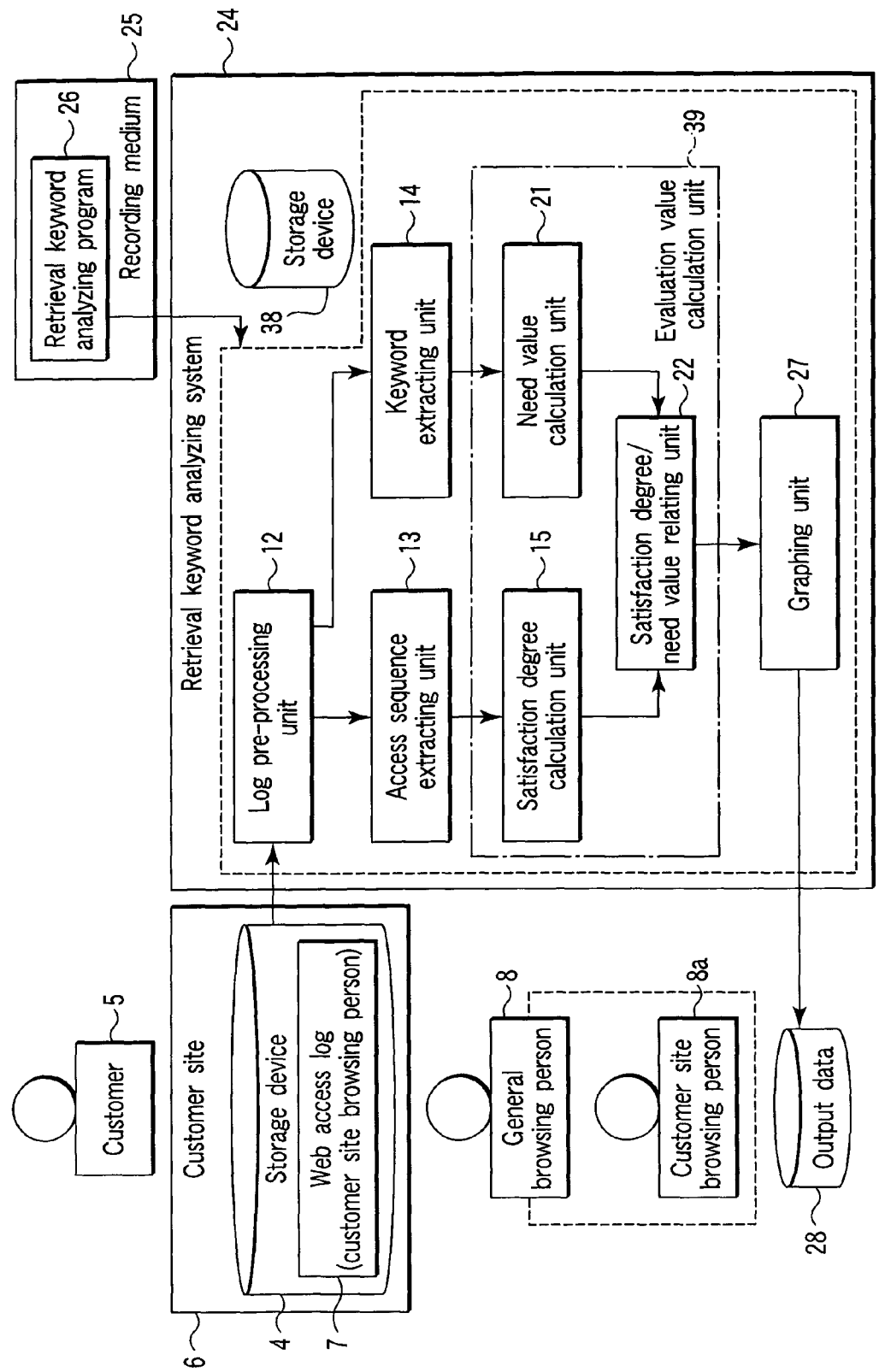
FIG. 21 is a block diagram showing an example of the configuration of a retrieval keyword analyzing system according to a third embodiment of the present invention.

FIG. 21 is a block diagram showing an example of the configuration of the retrieval keyword analyzing system.

A retrieval keyword analyzing system 24 reads out a retrieval keyword analyzing program 26 recorded in a recording medium 25 and executes it.

When the retrieval keyword analyzing program 26 is read into the system 24 and executed, a graphing unit 27 is realized in addition to the log pre-processing unit 12, the access sequence extracting unit 13, the keyword extracting unit 14 and the evaluation value calculation unit 39.

The graphing unit 27 reads relation data generated by the satisfaction degree/need value relating unit 22.

The graphing unit 27 creates output data 28 expressing the need value/satisfaction degree of each retrieval keyword with a graph.

The graphing unit 27 graphs relation data in which the satisfaction degree of each retrieval keyword is related to the need value according to a specified graphing rule and a parameter employed for the graphing procedure.

For example, the graphing unit 27 creates a scattering plot. In this case, with the satisfaction degree and the need value as parameters, by setting one axis (X-axis) of the scattering plot to the need value and the other axis (Y-axis) to the satisfaction degree, points indicating respective retrieval keywords are plotted based on the need value/satisfaction degree value in the relation data.

FIG. 22 is an example of a graph indicating the satisfaction degree and the need value of each retrieval keyword.

Because in this embodiment, the satisfaction degree and the need value of each retrieval keyword are graphed, a visual analysis result is provided for the customer 5.

Therefore, the customer 5 obtains an analysis result which the human being interprets and judges instinctively.

For example, because according to the graph shown in FIG. 22, a retrieval keyword "りんご (apple)" indicates a high need value and a high satisfaction degree while retrieval keywords "スーパー (super market)" and "肉野菜 (meat and vegetable)" indicate high need values but low satisfaction degree, it is interpreted that the customer 5 needs to change the on-site retrieval system 6a and the Web pages $P_1$ to $P_n$ quickly to take appropriate measures.

By changing the setting of the graphing unit 27 of this embodiment, the values of the graph axes is converted to improve a graph indication effect. For example, the graphing unit 27 may normalize the need value and satisfaction degree between 0 and 1. The need value and satisfaction degree may be subjected to logarithmic treatment and expressed with a graph. Further, the graphing unit 27 may express the need value and satisfaction degree with a bar graph. Further, the graphing unit 27 may add an appropriate auxiliary line to the graph.

Fourth Embodiment

In this embodiment, a modification of the retrieval keyword analyzing system according to the first to third embodiments will be described. Although hereinafter, the modification of the first embodiment will be described, the same modification is applied to the second and third embodiments.

Although in this embodiment, a case for obtaining the degree of success in the qualitative evaluation values will be described, the same thing is said about other cases for obtaining other qualitative evaluation value instead of the degree of success.

FIG. 23 is a block diagram showing an example of the retrieval keyword analyzing system.

A retrieval keyword analyzing system 29 reads out a retrieval keyword analyzing program 31 recorded in a recording medium 30 and executes it.

When the retrieval keyword analyzing program 31 is read in the system 29 and executed, the log pre-processing unit 12, the access sequence extracting unit 12, the keyword extracting unit 14 and an evaluation value calculation unit 40 are realized.

The evaluation value calculation unit 40 includes a success degree calculation unit 32 and a success degree/keyword relating unit 41.

The success degree calculation unit 32 calculates the degree of success based on the access sequence data obtained by the access sequence extracting unit 13 and keyword data obtained by the keyword extracting unit 14.

As the qualitative evaluation rule, a rule having following contents is defined.

The customer 5 creates a list (hereinafter referred to as "access demand page list") in which identification information about the Web pages desired to be accessed by the browsing person (hereinafter referred to as "access desired page") is related to typical retrieval keywords (retrieval keywords of analysis candidates).

If the customer site browsing person 8a accesses an access desired page through a link on the retrieval result page, the success degree is counted up.

However, as the number of clicks from the retrieval result page to the access desired page increases, the success degree is reduced.

A retrieval keyword which is not specified by the customer 5 is classified as "others" and provide with no success degree and taken out of evaluation.

FIG. 24 shows an example of an access demand page list which is used in the above-described qualitative evaluation rule.

Multiple access desired pages may correspond to a single retrieval keyword and multiple retrieval keywords may correspond to a single access desired page.

FIG. 25 shows an example of a success degree weighting table for reducing the success degree as the number of clicks from a retrieval result page to an access desired page increases.

The success degree calculation unit 32 extracts access sequence data generated by the access sequence extracting unit 13, keyword data generated by the keyword extracting unit 14, an access demand page list and a success degree weighting table.

The success degree calculation unit 32 may extract only a combination of the retrieval keyword and the access identifier in the keyword data instead of extracting all keyword data.

The success degree calculation unit 32 extracts a retrieval keyword and its access identifier (view ID) contained in the retrieval keyword in the access demand page list from the keyword data.

The success degree calculation unit 32 extracts an access sequence identifier related to the access identifier extracted by the aforementioned work in the access sequence data.

The success degree calculation unit 32 extracts access identifier and request which are related to the extracted access sequence identifier from the access sequence data so as to extract a retrieval keyword contained in the request.

FIG. 26 shows a first intermediate generation data at this stage.

The success degree calculation unit 32 investigates whether an access desired page to each retrieval keyword is accessed in an access sequence in which the retrieval keyword is input.

If any access desired page is accessed, the success degree calculation unit 32 investigates at how many clicks after the retrieval keyword is input the access desired page is accessed.

Even if the access desired page is accessed before the retrieval keyword is input, that access is not considered upon calculation of the success degree.

In an example of FIG. 26, an access desired page identifier to a retrieval keyword "りんご (apple)" relating to an access identifier "view22" is "/apple/index.html." The access desired page identifier "/apple/index.html" corresponds to an access identifier "view28" relating to the same access sequence identifier "visit6" as the access identifier "view22."

The access desired page identifier "/apple/index.html" is input two clicks after the retrieval keyword "りんご (apple)" is input.

The success degree calculation unit 32 calculates a success degree based on the relation between the success degree and the number of clicks from the retrieval result page.

If examples of FIGS. 26 and 25 are applied, a success degree "80" is provided for the retrieval keyword "りんご (apple)" in an access sequence expressed by the access sequence identifier "visit6."

FIG. 27 shows a second intermediate generation data at this stage.

The success degree calculation unit 32 creates success degree calculating data in which an average of the success degree is obtained for each retrieval keyword.

The success degree/keyword relating unit 41 relates success degree calculating data generated by the success degree calculation unit 32 to keyword data generated by the keyword extracting unit 14 so as to calculate the success degree of each retrieval keyword, and relates the success degree to the retrieval keyword to create relation data.

The relation data take the same style as FIG. 14 except that the item "satisfaction degree" is replaced with the item "success degree."

Using the success degree calculating method of this embodiment described above makes it possible to know whether an appropriate guidance is made to a Web page which is desired to be accessed by the customers corresponding to a certain retrieval keyword.

Fifth Embodiment

In this embodiment, a modification of the retrieval keyword analyzing system according to the first to fourth embodiment will be described.

In this embodiment, a retrieval keyword analyzing system in a case where the retrieval system is located out of the customer site 6 will be explained.

Although hereinafter a modification of the first embodiment will be described, the same modification is made for the second to fourth embodiments also.

FIG. 28 is a diagram showing an example of the configuration of the customer site.

A customer site 61 has one or more Web pages $P_1$ to $P_n$. Some Web pages in the customer site 61 are retrieval objects of multiple off-site retrieval systems $34_1$ to $34_n$ (which are out of the customer site 61) operated by third management parties other than the customer 5.

If a retrieval keyword is input, the off-site retrieval systems $34_1$ to $34_n$ display a retrieval result page including a link to the keyword related page.

Because according to this embodiment, the operating body of the customer site 61 is different from that of the retrieval systems $34_1$ to $34_n$, it is difficult to acquire the Web access logs of the retrieval systems $34_1$ to $34_n$ unlike the first to fourth embodiments.

Thus, according to this embodiment, the retrieval keyword is analyzed using not the Web access log of the retrieval systems $34_1$ to $34_n$ but reference information included in the Web access log of the customer site 61.

FIG. 29 shows an example of the Web access log of the customer site 61.

Figure 30:
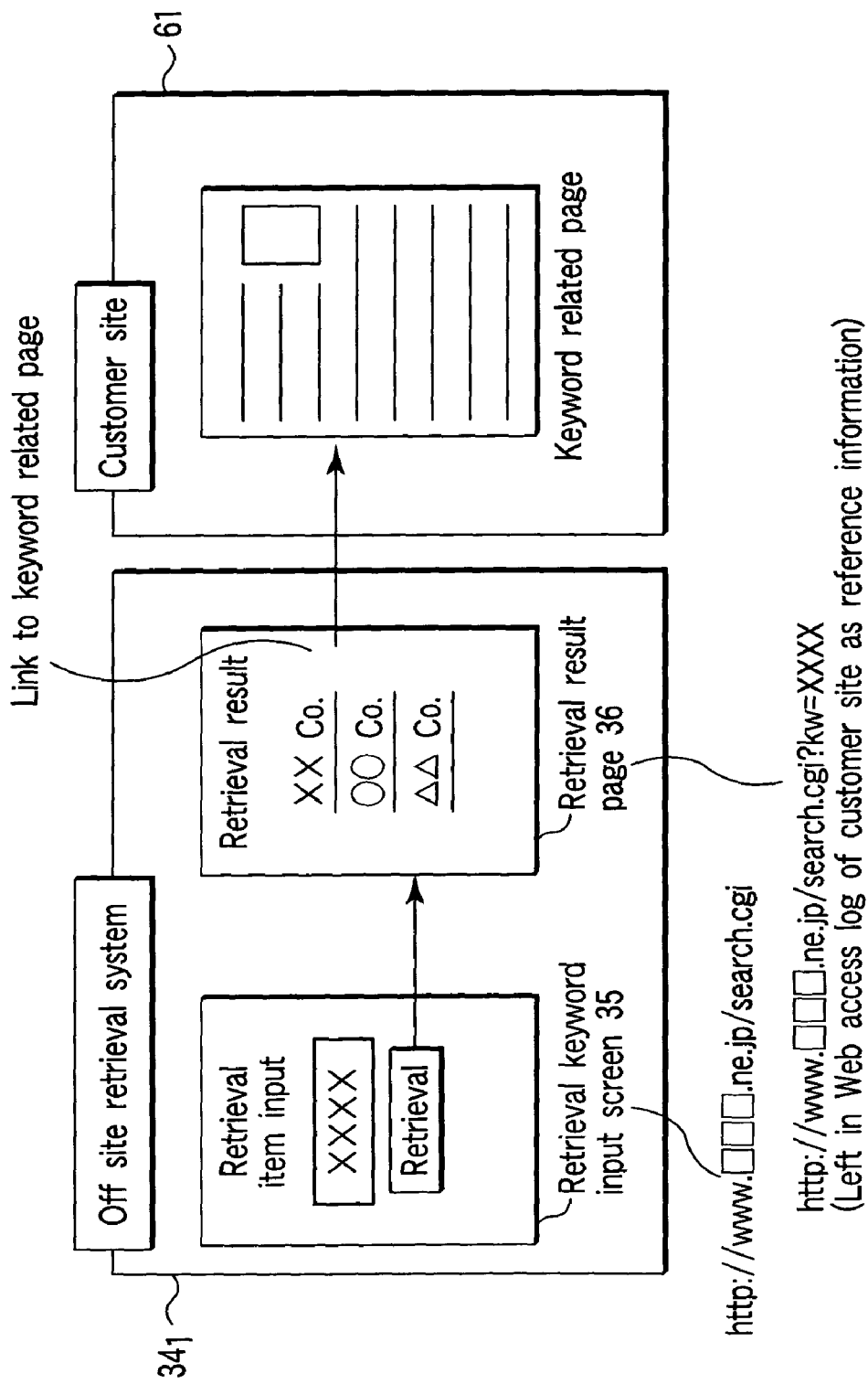
FIG. 30 is a block diagram showing an example of a screen transition from an off-site retrieval system to the customer site.

FIG. 30 is a block diagram showing an example in which a browsing person moves from the off-site retrieval system $34_1$ to the customer site 61 for browsing.

If a retrieval keyword is input to a retrieval keyword input screen 35 by a browsing person, a retrieval result page 36 is created. The URL presenting the retrieval result page 36 may contain the retrieval keyword input to the retrieval keyword input screen 35.

When a link of the retrieval result page 36 is clicked by the browsing person, if a keyword related page in the customer site 61 is browsed, reference information which is URL of the retrieval result page containing the retrieval keyword is related to a request which is URL of the keyword related page in the accessed customer site 61 and recorded in the Web access log of the customer site 61.

Because the retrieval keyword analyzing system has the same configuration as that of FIG. 2, main portions of this embodiment will be described with reference to FIG. 2.

The Web access log of the customer site 61 contains reference information.

In the retrieval keyword analyzing system, the operations of the access sequence extracting unit 13, the keyword extracting unit 14 and the satisfaction degree extracting unit 15 are different from those in the retrieval keyword analyzing system 9 of the first embodiment.

The access sequence extracting unit 13 executes the same processing in application of access sequence identifier, determination of division of the access sequence and the like as the access sequence extracting unit 13 of the first embodiment.

The access sequence extracting unit 13 determines whether or not reference information indicates an off-site retrieval system based on the reference information about each access.

FIG. 31 shows data in which the URL pattern expressing the off-site retrieval system is related to a query pattern for extracting the retrieval keyword.

When the access sequence extracting unit 13 determines whether or not some access is an access from the off-site retrieval system, it investigates whether or not the reference information of each access contains any URL pattern of the retrieval system.

The access sequence extracting unit 13 creates access sequence data supplied with a reference flag to an access in which the reference information indicates the off-site retrieval system.

FIG. 32 shows an example of access sequence data.

Reference flag "0" in FIG. 32 indicates that it is not an access from the off-site retrieval system.

On the other hand, the reference flag "1" indicates that it is an access from the off-site retrieval system.

As described above, the reference flag is recorded so that an access condition after the retrieval is investigated and the satisfaction degree is calculated even if retrieval is carried out in an access sequence.

The keyword extracting unit 14 searches for an access in which the reference information contains a URL pattern of the retrieval system based on pre-processed data generated by the log pre-processing unit 12.

The keyword extracting unit 14 extracts a retrieval keyword input by the browsing person in the off-site retrieval system from the reference information containing the URL pattern, based on a query pattern corresponding to the URL pattern in the retrieval system.

FIG. 33 shows an example of keyword data generated by the keyword extracting unit 14.

The satisfaction degree calculation unit 15 calculates a satisfaction degree from access sequence data generated by the access sequence extracting unit 13.

As a method for calculating the satisfaction degree, for example, the rule explained in the first embodiment will be applied. That is, the satisfaction degree calculation unit 15, after extracting access sequence data generated by the access sequence extracting unit 13, calculates an after-retrieval browsing time of each access of the Web page.

The after-retrieval browsing time is calculated by obtaining a differential in time from an access (access having a flag "1" in FIG. 32) having the reference information using the retrieval system up to a finally browsed access in accesses indicated by the same access sequence identifier.

In an access sequence without an access having the retrieval system as the reference information, the after-retrieval browsing time is not recorded.

The satisfaction degree calculation unit 15 extracts data in which the after-retrieval browsing time is related to the satisfaction degree as shown in FIG. 11 and calculates the satisfaction degree of each access.

Unless there is any record about the after-retrieval browsing time, the satisfaction degree is not recorded.

The satisfaction degree calculation unit 15 relates the access sequence identifier to the satisfaction degree for each access identifier and creates the same satisfaction degree data as in FIG. 12.

According to this embodiment, even if the customer site 61 is not provided with any retrieval system, the satisfaction degree of the retrieval keyword is calculated.

Therefore, customer sites from which the retrieval keyword analyzing result is acquired is increased largely.

Although this embodiment has been described about a case where the retrieval keyword input screen 35 exists in the off-site retrieval system $34_1$ the retrieval keyword input screen may exist in the customer site 61. A case where the customer entrusts an application service provider (ASP) service engaged in retrieval service with a system for retrieving in the customer site 61 is included in such a case.

Figure 34:
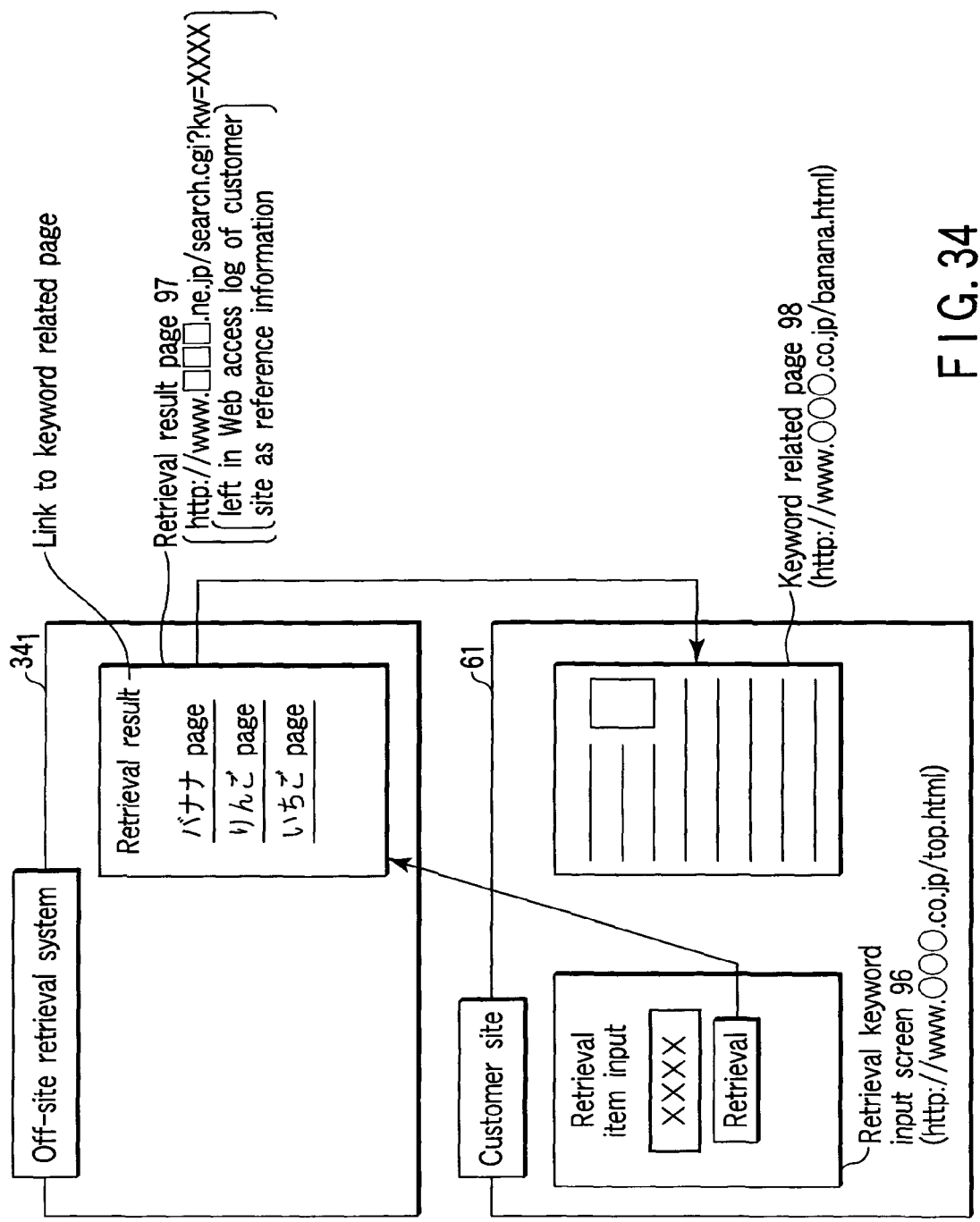
FIG. 34 is a block diagram showing an example of a screen transition from a retrieval keyword input screen within the customer site to a retrieval result page of the off-site retrieval system and then from the retrieval result page to the keyword related page within the customer site.

FIG. 34 is a block diagram showing an example in which a retrieval keyword input screen 96 in the customer site 61 is changed to a retrieval result page 97 in the off-site retrieval system $34_1$ and further to a keyword related page 98 in the customer site 61.

When a retrieval keyword is input to the retrieval keyword input screen 96 by a browsing person in FIG. 34, the retrieval result page 97 is created by the off-site retrieval system $34_1$. The URL indicating the retrieval result page 97 may sometimes contain a retrieval keyword input to the retrieval keyword input screen 96 in the customer site 61.

When a link of the retrieval result page 97 of the off-site retrieval system $34_1$ is clicked by the browsing person, and the keyword related page 98 in the customer site 61 is browsed, reference information which is URL of the retrieval result page 97 containing the retrieval keyword is related to a request which is URL of the keyword related page 98 in the accessed customer site 61 and recorded in the Web access log of the customer site 61.

Sixth Embodiment

In this embodiment, a modification of the retrieval keyword analyzing system according to the first embodiment will be described.

In the first to fifth embodiments, extraction of an access sequence or calculation of a qualitative evaluation value and extraction of a retrieval keyword are executed in parallel to each other and those results are finally related to each other through the relating unit.

Contrary to this, this embodiment executes extraction of the retrieval keyword and calculation of the qualitative evaluation value in series.

Although this embodiment describes a case where retrieval within the site is analyzed, the present invention is applied to analysis on retrieval out of the site by combining this embodiment with the fifth embodiment.

Figure 35:
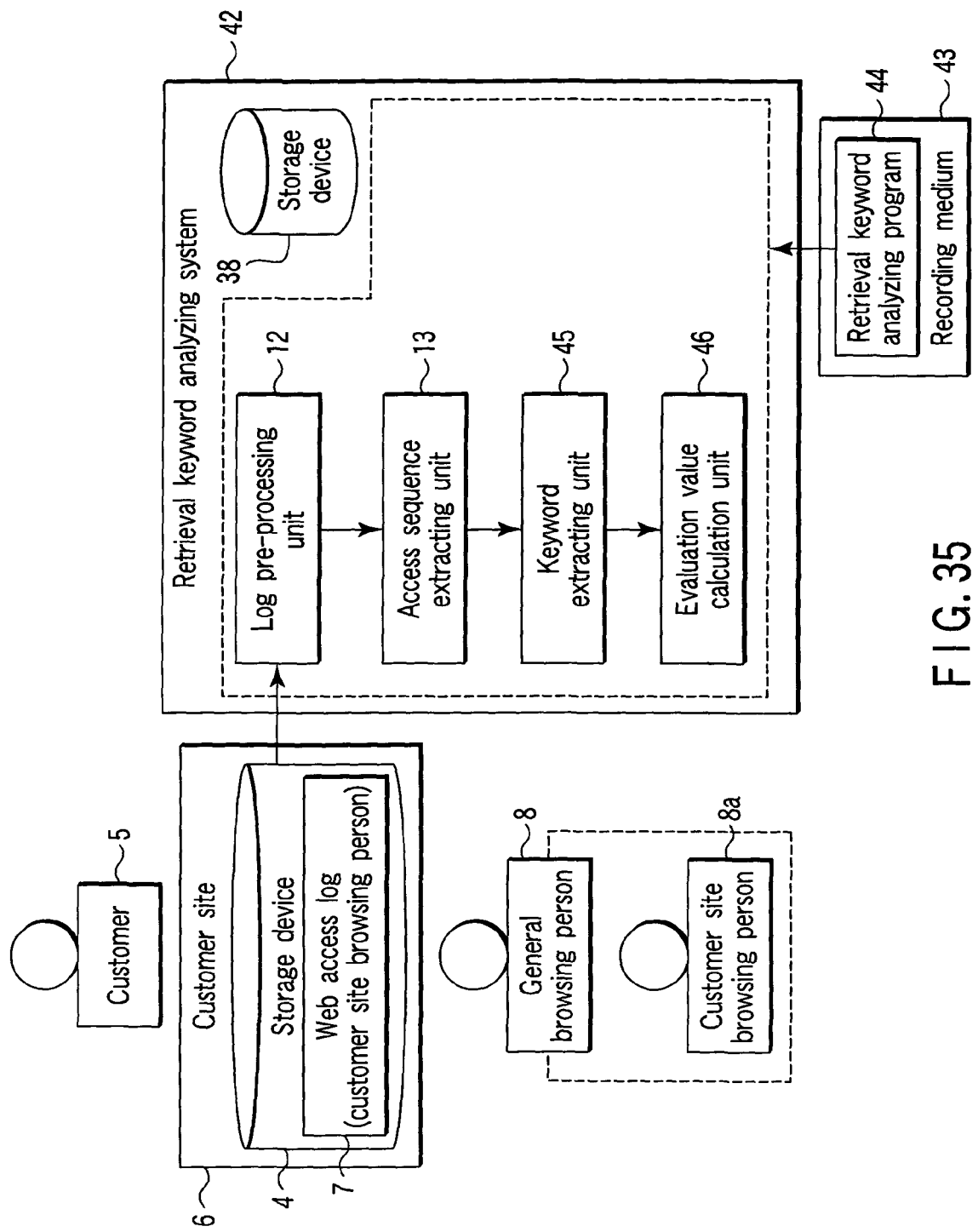
FIG. 35 is a diagram showing an example of the configuration of a customer site according to a sixth embodiment of the present invention.

FIG. 35 is a block diagram showing an example of the configuration of the retrieval keyword analyzing system.

A retrieval keyword analyzing system 42 reads out a retrieval keyword analyzing program 44 recorded in a recording medium 43 and executes it.

When the retrieval keyword analyzing program 44 is read into the system 42 and executed, the log pre-processing unit 12, the access sequence extracting unit 13, a keyword extracting unit 45 and an evaluation value calculation unit 46 are realized.

Data created by the keyword extracting unit 45 and the evaluation value calculation unit 46 are stored in the storage device 38. The keyword extracting unit 45 and the evaluation value calculation unit 46 are capable of reading data stored in the storage device 38.

The keyword extracting unit 45 extracts the retrieval keyword input by the customer site browsing person 8a within the on-site retrieval system 6a from data generated by the access sequence extracting unit 13. To extract the retrieval keyword, the same method as the first embodiment is applied.

That is, the keyword extracting unit 45 extracts an access to the retrieval system based on information about the location of the retrieval system from pre-processed data.

The keyword extracting unit 45 extracts the retrieval keyword based on information about the query pattern. Encoded parameter is decoded to a readable character string.

The keyword extracting unit 45 generates access sequence/keyword data. About an access using no retrieval system, nothing is recorded in its keyword item.

Figures 36, 37, 39:
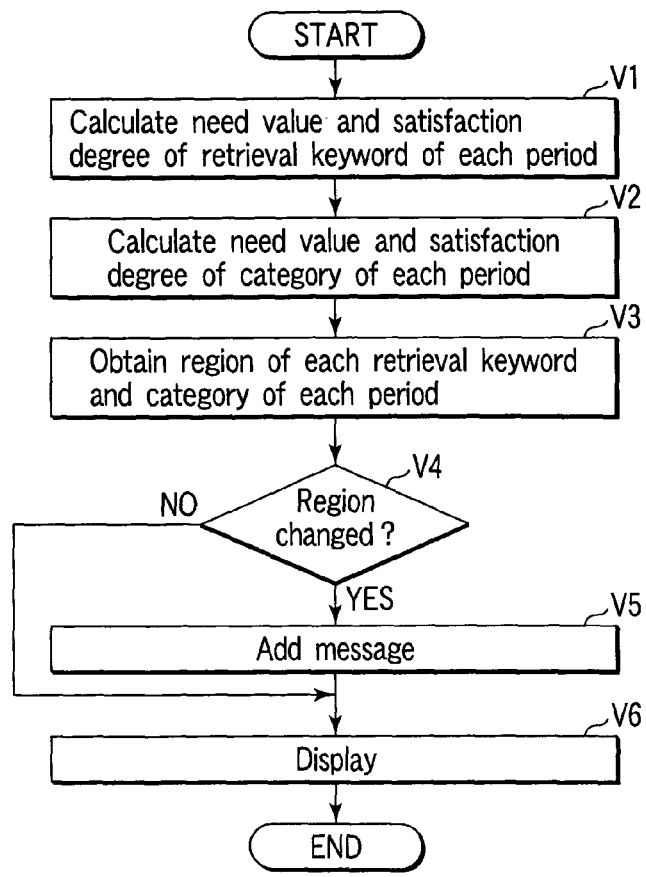
FIG. 36 is a diagram showing a specific example of access sequence/keyword data.
FIG. 37 is a diagram showing intermediate generation data at this stage.
FIG. 39 is a flow chart showing an example of the operation of the retrieval keyword analyzing system according to the seventh embodiment.

FIG. 36 shows a specific example of the access sequence/keyword data.

The evaluation value calculation unit 46 calculates the qualitative evaluation value, for example, the satisfaction degree, based on the access sequence/keyword data. The qualitative evaluation rule utilizes the same rule as the first embodiment.

That is, the evaluation value calculation unit 46 reads the access sequence/keyword data to calculate the after-retrieval browsing time of each access sequence. The after-retrieval browsing time is calculated from a difference between a time of an access to the keyword related page and the newest access time in the access based on the same access sequence identifier.

The evaluation value calculation unit 46 reads correspondence data between the after-retrieval browsing time and the satisfaction degree and calculates the satisfaction degree of each access sequence.

FIG. 37 shows intermediate generation data at this stage.

The evaluation value calculation unit 46 acquires the satisfaction degree and retrieval keyword of the access sequence. An access sequence whose retrieval keyword is not recorded is out of processing object.

The evaluation value calculation unit 46 acquires an average of the satisfaction degree of each retrieval keyword and generates its relation data.

The specific contents of the relation data are the same as FIG. 14.

The evaluation value calculation unit 46 may calculate the quantitative evaluation value, for example, the need value. As a method for calculating the need value, the method described in the second embodiment is applied. If the qualitative evaluation value and quantitative evaluation value are calculated with the evaluation value calculation unit 46, a graph based on the relation data may be displayed by the graphing unit 27 in the same manner as in the third embodiment.

In the above-described respective embodiments, the respective processings about extraction of the access sequence, extraction of the retrieval keyword calculation of the qualitative evaluation value and calculation of the quantitative evaluation value are carried out not in parallel but in series and consequently, the same effect as the respective embodiments is obtained. This embodiment allows logs to be processed not by batch but for in each access sequence.

Although in each of the above-described embodiments, it is assumed that a single retrieval keyword is input for a single access sequence, even if the retrieval keyword is input multiple times for a single access sequence, the qualitative evaluation value and quantitative evaluation value of the retrieval keyword is acquired.

For example, if the retrieval keyword is input to a single access sequence multiple times, it may be possible to extract multiple access sequences with that access sequence as a boundary of retrieval keyword input and obtain the qualitative evaluation value and quantitative evaluation value using the extracted access sequence.

In this case, the processing method of the above-described respective embodiments in which the retrieval keyword is input to a single access sequence once is applied to an access sequence after the division.

Seventh Embodiment

According to this embodiment, a retrieval keyword analyzing system for analyzing the trend that a Web site of analyzing object is browsed from outside contents existing in another Web site which is not an analyzing object by executing Web access log analysis of the analyzing object Web site will be described.

According to this embodiment, the outside contents include a retrieval system and the trend of browsing is investigated based on a retrieval keyword input to the retrieval system.

Figure 38:
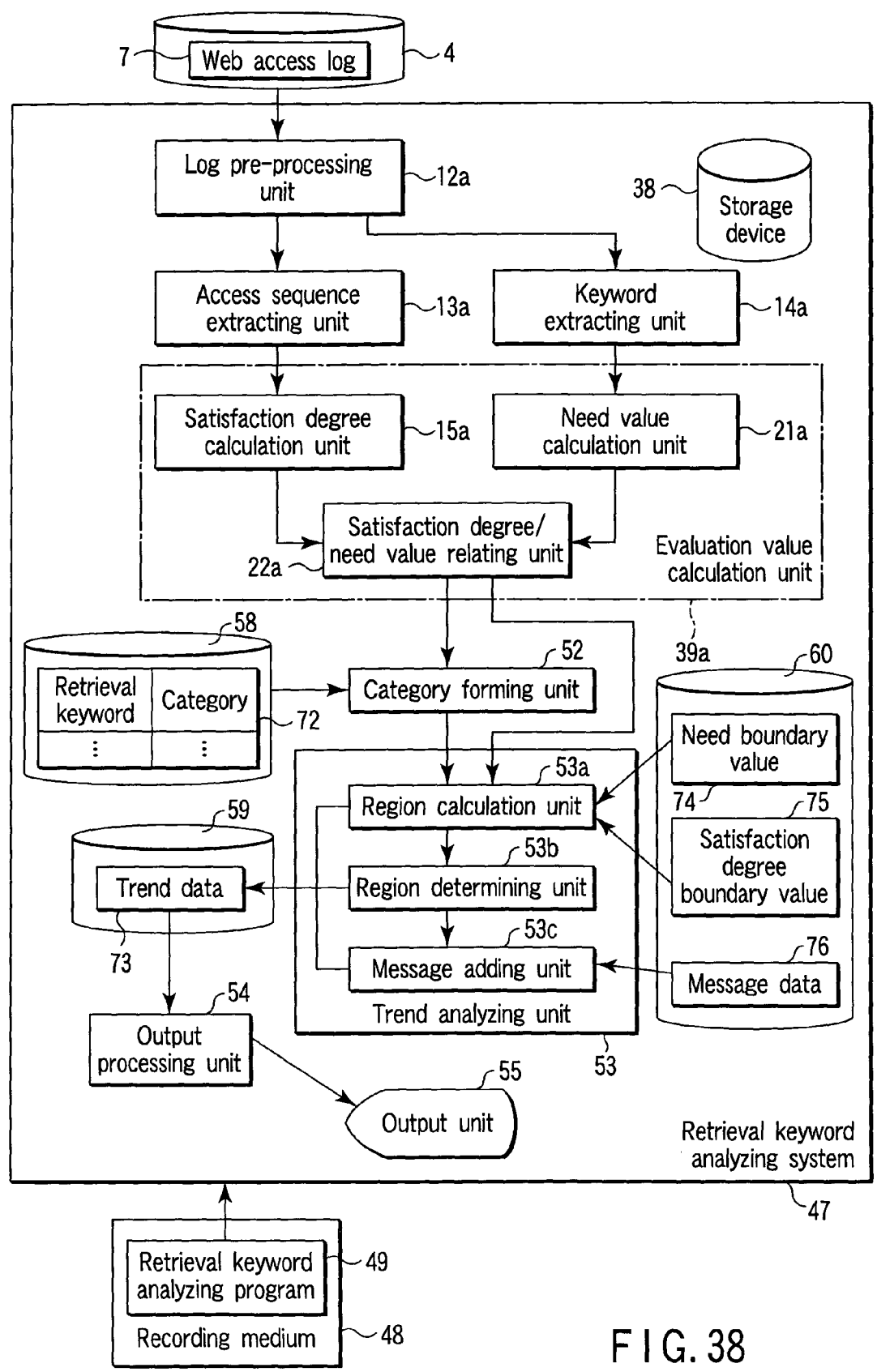
FIG. 38 is a block diagram showing an example of the configuration of a retrieval keyword analyzing system according to a seventh embodiment of the present invention.

FIG. 38 is a block diagram showing an example of the configuration of the retrieval keyword analyzing system.

A retrieval keyword analyzing system 47 reads a retrieval keyword analyzing program 49 recorded in a recording medium 48 and executes it so as to realize a log pre-processing unit 12a, an access sequence extracting unit 13a, a keyword extracting unit 14a, an evaluation value calculation unit 39a, a category forming unit 52, a trend analyzing unit 53 and an output processing unit 54. The retrieval keyword analyzing system 47 includes an output unit 55 and storage devices 38, and 58 to 60.

The log pre-processing unit 12a, the access sequence extracting unit 13a, the keyword extracting unit 14a, the evaluation value calculation unit 39a, the category forming unit 52, the trend analyzing unit 53 and the output processing unit 54 may be realized with hardware.

Providing and acceptance of data may be carried out among respective units 12a to 14a, 39a, and 52 to 54 through recording/reading the data to/from the storage device 38.

As the storage devices 38, and 58 to 60, for example, an internal memory and hard disc are available. The respective storage devices 38, and 58 to 60 are elements which constitute a data base and each item of data may be controlled by the data base. The respective storage devices 38, and 58 to 60 is combined freely.

The Web access log 7 stored in the storage device 4 contains access destination identification data indicating a unit accessed by a browsing person, time data (for example, date and time) indicating an access time and data related to a retrieval keyword when the browsing person makes access based on a retrieval result by the retrieval system.

The log pre-processing unit 12a, the access sequence extracting unit 13a, the keyword extracting unit 14a and the evaluation value calculation unit 39a execute the same processing as the log pre-processing unit 12, the access sequence extracting unit 13, the keyword extracting unit 14 and the evaluation value calculation unit 39. However, this embodiment is different in that data of every predetermined time period is executed based on time log of the Web access log 7 and for each predetermined time period, relation data which makes correspondence between each retrieval keyword input to access an analyzing object Web site and the satisfaction degree which is a qualitative evaluation value and the need value which is a quantitative evaluation value for each predetermined time period.

Execution of processing of acquiring relation data in every predetermined time period with the respective units 12a to 14a, and 39a is not enabled until for example, the log pre-processing unit 12a accepts data of every predetermined time period in the Web access log 7.

The evaluation value calculation unit 39a acquires the satisfaction degree and the need value of each retrieval keyword input to access an analyzing object Web site every predetermined time period and provides it to the category forming unit 52 and the trend forming unit 53. For example, if multiple qualitative evaluation values or quantitative evaluation values of the same retrieval keyword are calculated in the same time period, the evaluation value calculation unit 39a may acquire an average of the qualitative evaluation values or the quantitative evaluation values of the same retrieval keyword about that time period.

The category forming unit 52 acquires, based on category data 72 stored in the storage device 58 and the satisfaction degree and the need value of each retrieval keyword in every predetermined time period, the satisfaction degree and need value of each category to which each retrieval keyword belongs and provides the acquired satisfaction degree and need value of each category to the trend analyzing unit 53.

The category data 72 is, for example, data in which the retrieval keyword is related to the category to which the retrieval keyword belongs.

The category forming unit 52 acquires, for example, a total sum or an average of the need values of the retrieval keyword belonging to the category in every time period to adopt the need value of the category of every time period.

The category forming unit 52 obtains, for example, a value by dividing the total sum of weighted satisfaction degree that each retrieval keyword belonging to the category is weighted by the need value by a total sum of the need values of respective retrieval keywords belonging to the category in every time period and adopts it as the satisfaction degree of the category of every time period.

The trend analyzing unit 53 acquires trend data 73 indicating transitions of need value and satisfaction degree of each retrieval keyword and each category and stores in the storage device 59.

The trend analyzing unit 53 has a region calculation unit 53a, a region determining unit 53b and a message adding unit 53c.

The region calculation unit 53a determines in every time period at which region determined by a need boundary value 74 and a satisfaction degree boundary value 75 the retrieval keyword and category are located based on the need boundary value 74 and the satisfaction degree boundary value 75 which are stored in the storage device 60, the satisfaction degree and need value of every time period obtained by the evaluation value calculation unit 39a and the satisfaction degree and need value of every time period obtained by the category forming unit 52.

The need boundary value 74 and the satisfaction degree boundary value 75 are values indicating the boundary in which the meaning of each of the need value and satisfaction degree is switched. The need boundary value 74 and the satisfaction degree boundary value 75 determine the regions in which a retrieval keyword and a category input to access an analyzing object Web site are located.

The region determining unit 53b determines whether the retrieval keyword is moved in the region or whether the category is moved in the region with the lapse of the time period.

The message adding unit 53c adds a message (for example, comment statement, note and the like) corresponding to a region to the retrieval keyword or the category which is moved in the region with the lapse of the time period based on message data 76 stored in the storage device 60.

The message data 76 comprises data which relates the regions before and after the retrieval keyword is moved, the retrieval keyword being input to access an analyzing object Web site with the message. The message data 76 is sufficient to be defined with a rule for adding a message meaning that if the region changes, the retrieval keyword is moved to the region after a lapse of time period.

The trend analyzing unit 53 stores the trend data 73 including the need value and satisfaction degree of the retrieval keyword and category of each time period, regions in which the retrieval keyword and category of each time period are located, a result of determination about whether or not the region changes, a message added to the retrieval keyword moved across the region and a message added to the category moved across the region.

The output processing unit 54 executes processing for outputting the trend data 73 stored in the storage device 59 through the output unit 55. The output processing unit 54 outputs the trend data 73 in the form of for example, a table, graph, various kinds of diagrams or the like.

FIG. 39 is a flow chart showing an example of the operation of the retrieval keyword analyzing system 47.

In step V1, the log pre-processing unit 12a, the access sequence extracting unit 13a, the keyword extracting unit 14a, and the evaluation value calculation unit 39a create relation data which relates each retrieval keyword input to access an analyzing object Web site to its satisfaction degree and its need value at every predetermined time period based on time data of the Web access log 7.

In step V2, the category forming unit 52 acquires the need value and satisfaction degree of a category which each retrieval keyword belongs to at every time period.

In step V3, the region calculation unit 53a of the trend analyzing unit 53 acquires a region in which the retrieval keyword and category are located at every time period based on the need value 74 and the satisfaction degree 75, and the need value and satisfaction degree of the retrieval keyword and category and the region in which the retrieval keyword and category are located, are included in the trend data 73.

In step V4, the region determining unit 53b of the trend analyzing unit 53 determines whether the region in which the retrieval keyword is located is changed or the region in which the category is located is changed with the lapse of the time period. Its judgment result is included in the trend data 73.

When it is determined that the region in which the retrieval keyword or the category is located is changed, in step V5, the message adding unit 53c of the trend analyzing unit 53 adds a message corresponding to a conversion of the region to the retrieval keyword whose region is changed or the category whose region is changed based on the message data 76, and its result is included in the trend data 73.

In step V6, the output processing unit 54 displays a transition of the need value and satisfaction degree of the retrieval keyword and category and a message based on the trend data 73 corresponding to an operation of an analyzer.

Hereinafter, relation data obtained by the evaluation value calculation unit 39a will be described.

The evaluation value calculation unit 39a provides the relation data indicating a result of calculation on the need value and satisfaction degree of a retrieval keyword input to access an analyzing object Web site as shown in FIG. 40 to the region calculation unit 53a and the category forming unit 52 of the trend analyzing unit 53 at every time period.

The category forming unit 52 obtains the need value and satisfaction degree of each category from the need value and satisfaction degree of each retrieval keyword based on the category data 72 and the need value and satisfaction degree of the retrieval keyword as shown in FIG. 41 at every time period and provides the need value and satisfaction degree of the category to the region calculation unit 53a of the trend analyzing unit 53.

Figure 43:
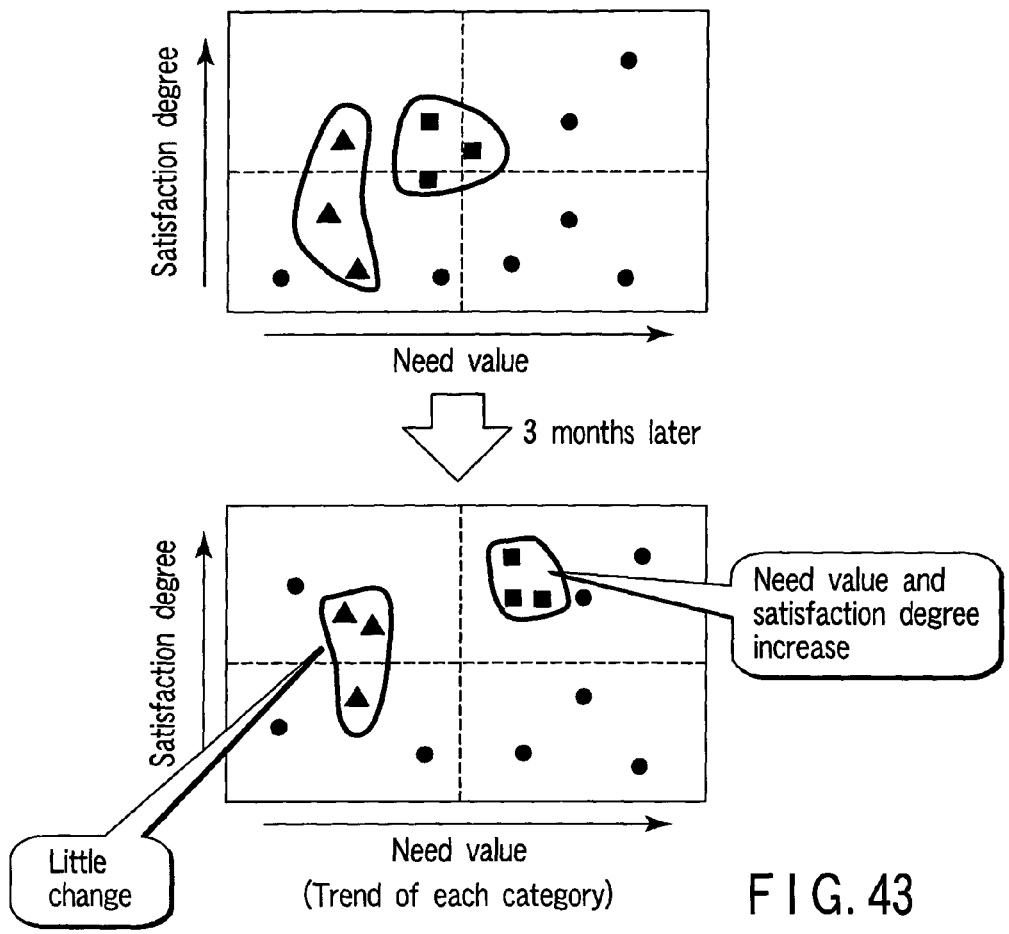
FIG. 43 is a diagram showing an example of a state in which a message is attached to a transition condition of the category.

Data in which a message is added to the transition of the retrieval keyword as shown in FIG. 42 and data in which a message is added to the transition of the category as shown in FIG. 43 are included in the trend data 73 by the trend analyzing unit 53, and the trend data 73 is stored in the storage device 59.

Hereinafter, the category forming unit 52 will be described in detail.

Figure 44:
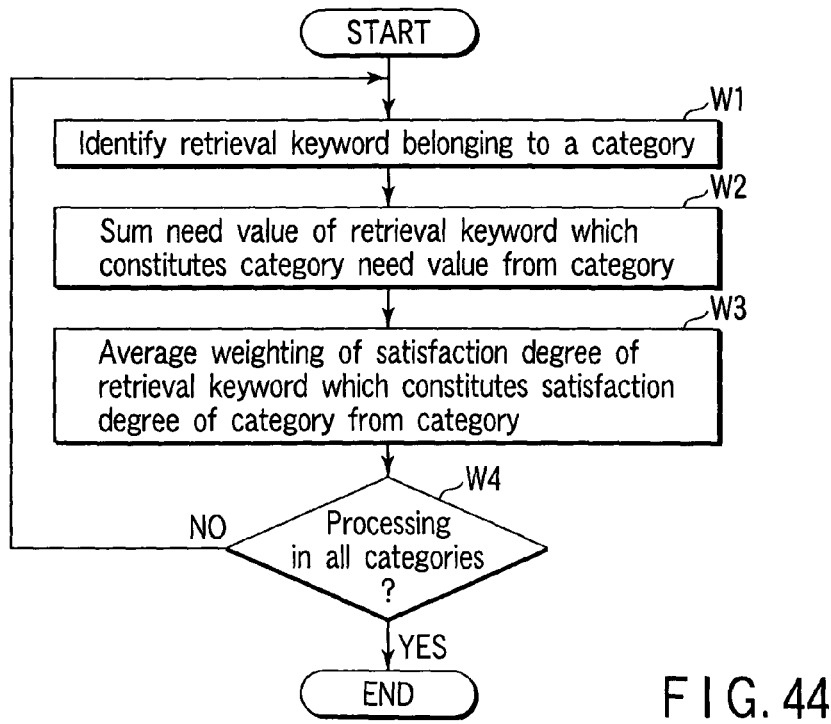
FIG. 44 is a diagram showing an example of a data conversion result by a category forming unit.

FIG. 44 is a flow chart showing an example of the operation of the category forming unit 52.

In step W1, the category forming unit 52 identifies a retrieval keyword belonging to a category based on the category data 72 at every time period.

In step W2, the category forming unit 52 acquires a total sum of the need values of each retrieval keyword belonging to the category as indicated by Equation 1 and adopts it as the need value of the category at every time period.

$$\text{Need value of category} = \Sigma(\text{need value of } i\text{-th retrieval keyword of category}) \qquad (1)$$

In step W3, the category forming unit 52 obtains weighted average of the satisfaction degree of each retrieval keyword belonging to the category as indicated by Equation 2 and adopts it as the satisfaction degree of the category at every time period.

$$\text{Satisfaction degree of category} = \\ \sum \{(\text{need value of } i\text{-th retrieval keyword of category}) \times \\ (\text{satisfaction degree of } i\text{-th retrieval keyword of category})\} / \\ \sum (\text{need value of } i\text{-th retrieval keyword of category}) \qquad (2)$$

According to Equation 2, the satisfaction degree of the category is obtained by dividing the total sum of product between the satisfaction degree and need value of each retrieval keyword belonging to the category by the total sum of the need values of the retrieval keyword belonging to the category.

In step W4, the category forming unit 52 determines whether or not the need value and satisfaction degree have been acquired for all the categories at every time period and if the need values and satisfaction degrees of all the categories are not obtained, a processing in and after step W1 is repeated.

Hereinafter, there will be described the reason why the satisfaction degree of the category is obtained by dividing the total sum of the satisfaction degree of each retrieval keyword belonging to the category weighted by each need value by the total sum of the need value of each retrieval keyword belonging to the category.

For example, assume that in a category C, although the need value of a retrieval keyword $C_1$ is extremely small, the satisfaction degree of the retrieval keyword $C_1$ is extremely large. In this case, it is determined that although the number of browsing persons accessing an analyzing object Web site using the retrieval keyword $C_1$ is extremely small, only a few browsing persons are satisfied.

On the other hand, assume that in the same category C, although the need value of a retrieval keyword $C_2$ is extremely large, the satisfaction degree of the retrieval keyword $C_2$ is extremely small.

In this case, it is determined that although the number of browsing persons accessing the analyzing object Web site using the retrieval keyword $C_2$ is extremely large, many browsing persons are not satisfied.

In such a case, assuming that the satisfaction degree of the category C is an average of the satisfaction degrees of the retrieval keywords $C_1$, $C_2$ belonging to the category C, the satisfaction degree of the retrieval keyword $C_1$ having a few browsing persons and the satisfaction degree of the retrieval keyword $C_2$ having many browsing persons are handled on the same level. Therefore, although there are many browsing persons who are not satisfied, it is determined that the category has an intermediate satisfaction degree.

However, the satisfaction degree of the category C should be more affected by the satisfaction degree of the retrieval keyword $C_2$ having many browsing persons than the satisfaction degree of the retrieval keyword $C_1$ having a few browsing persons.

Then, the satisfaction degrees of the respective retrieval keywords $C_1$, $C_2$ belonging to the category C are weighted with the need value and the total sum of them is obtained.

To evaluate the satisfaction degrees of the category C and other categories with an equal standard regardless of the number of browsing persons, the total sum of the weighted satisfaction degrees in the category C is divided by the number of all browsing persons in the category C or the need value of the retrieval keyword belonging to the category C.

Figure 45:
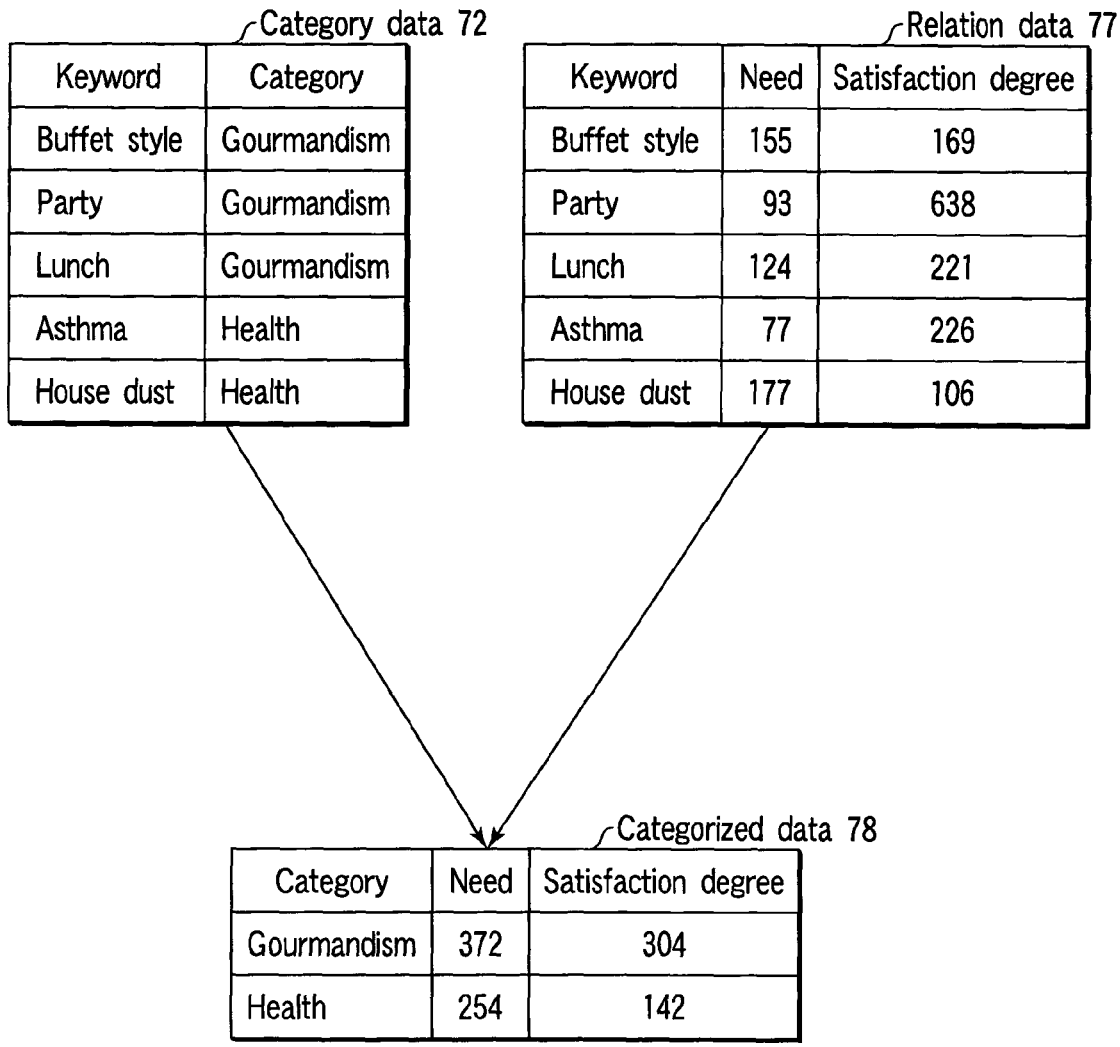
FIG. 45 is a diagram showing an example of the data conversion result by the category forming unit.

FIG. 45 is a diagram showing an example of the data conversion result by the category forming unit 52.

The category forming unit 52 accepts category data 72 which relates the retrieval keyword to a category to which the retrieval keyword belongs and relation data 77 indicating the need value and the satisfaction degree of the retrieval keyword at every time period.

The category forming unit 52 acquires categorize data 78 including the need value and satisfaction degree of the category at every time period. In an example of FIG. 45, five kinds of the retrieval keywords are summarized into two kinds of categories. Each category undergoes the same analysis as the analysis on individual retrieval keywords.

Hereinafter, the trend analyzing unit 53 will be described in detail.

Figure 46:
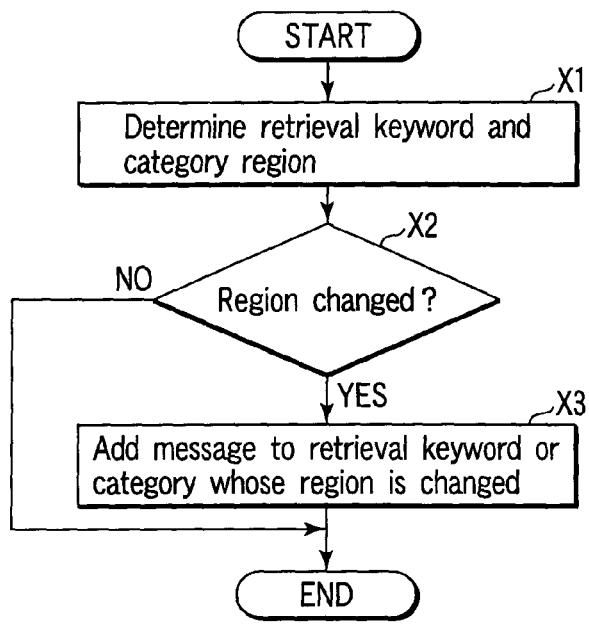
FIG. 46 is a flow chart showing an example of the operation of a trend analyzing unit according to the seventh embodiment.

FIG. 46 is a flow chart showing an example of the operation of the trend analyzing unit 53.

In step X1, the region calculation unit 53a of the trend analyzing unit 53 acquires a region in which all retrieval keywords and categories are located of each time period, based on the need value and satisfaction degree of each of all the retrieval keywords and categories of each time period and the need boundary value 74 and the satisfaction boundary value 75. The region calculation unit 53a incorporates the need value and the satisfaction degree of the retrieval keyword and category and region of the retrieval keyword and category in the trend data 73.

In step X2, the region determining unit 53b of the trend analyzing unit 53 determines whether or not the region of the retrieval keyword and category changes by comparing the regions in which the retrieval keyword and the category are located before and after the time period, acquires a retrieval keyword or category whose region is changed and incorporate its result in the trend data 73.

When the region in which the retrieval keyword or the category is located is changed, in step X3, the message adding unit 53c of the trend analyzing unit 53 relates messages corresponding to regions before and after the lapse of the time period with the retrieval keyword or category whose region is changed based on the message data 76 and incorporate those messages in the trend data 73.

Figure 47:
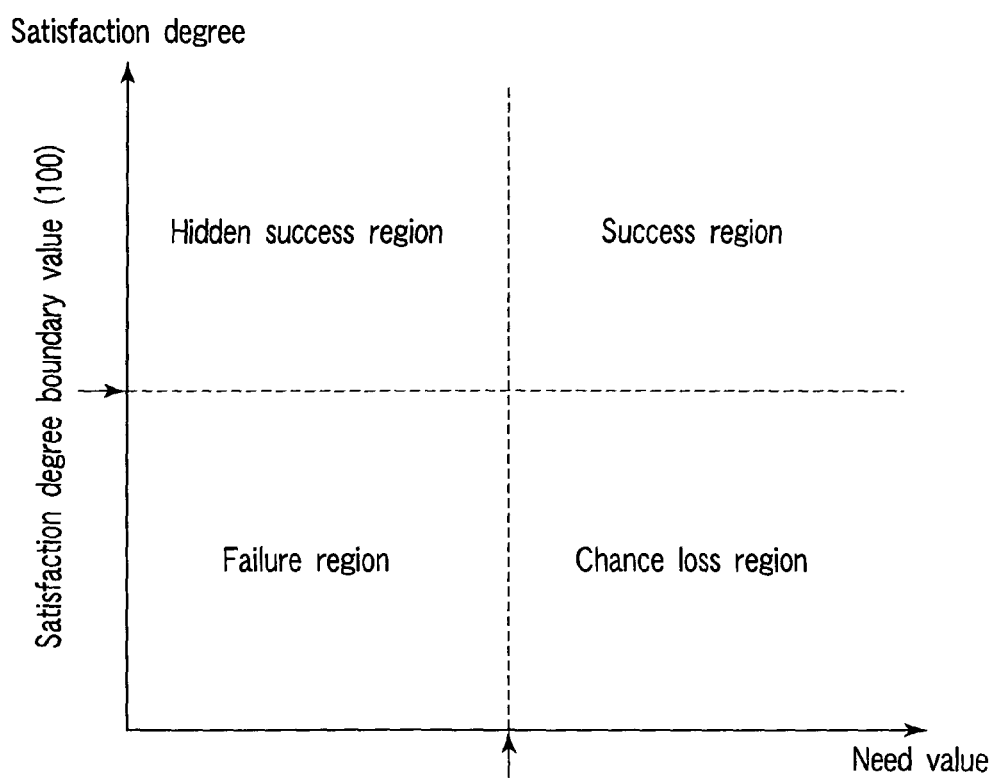
FIG. 47 is a diagram showing an example of designation of regions determined by the need boundary value and satisfaction degree boundary value.

FIG. 47 is a diagram showing an example of designations of regions determined by the need boundary value 74 and the satisfaction degree boundary value 75.

The need boundary value 74 is set up for the need value while the satisfaction degree boundary value 75 is set up for the satisfaction degree. A plane is divided to four sections and those four sections are supplied with designations.

Both the need boundary value 74 and the satisfaction degree boundary value 75 are set to 100. A region in which the need value and the satisfaction degree are small is designated "failure region." A region in which the need value is small while the satisfaction degree is large is designated "hidden success region." A region in which the need value is large while the satisfaction degree is small is designated "chance loss region." A region in which the need value and the satisfaction degree are large is designated "success region."

Figure 48:
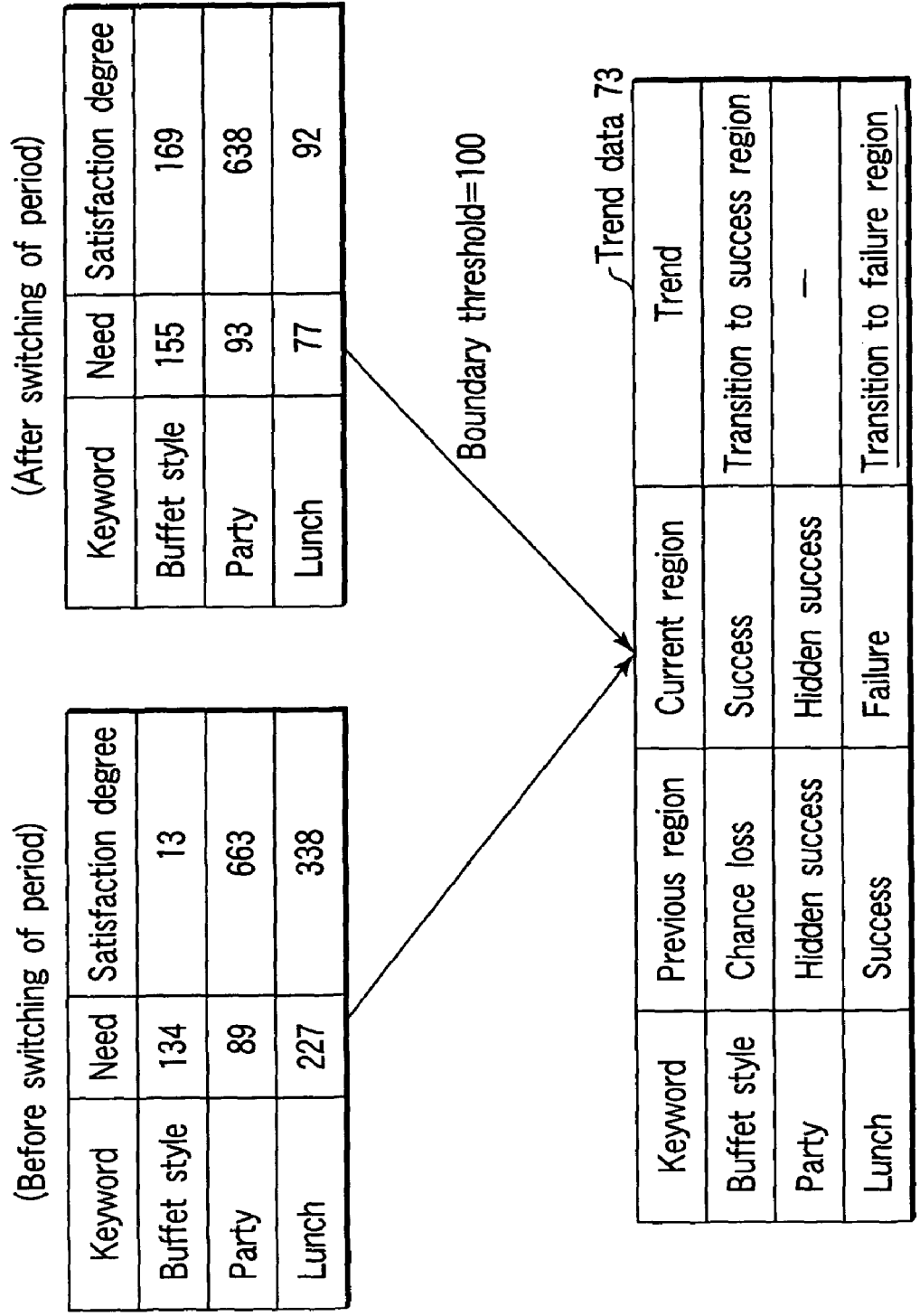
FIG. 48 is a diagram showing an example of trend data created by the trend analyzing unit according to the seventh embodiment.

FIG. 48 is a diagram showing an example of the trend data 73 created by the trend analyzing unit 53.

For example, a retrieval keyword or category whose region is changed before and after switching of the time period is supplied with a message meaning that it is moved to its destination region. As for the trend data 73, retrieval keywords "Buffet style" and "Lunch," whose region is changed, are supplied with messages "transition to success region" and "transition to failure region" each.

As for supplying with the message, the message data 76 in which a region after the lapse of the time period is related to its corresponding region is prepared and a retrieval keyword or category whose region is changed with the lapse of the time period is detected by the region determining unit 53b of the trend analyzing unit 53. Further, it is possible to supply a retrieval keyword or category whose region is changed with a message corresponding to a region in which it is scheduled to be located after the lapse of the time period by means of the message adding unit 53c of the trend analyzing unit 53 base on the massage data 76.

Figure 49:
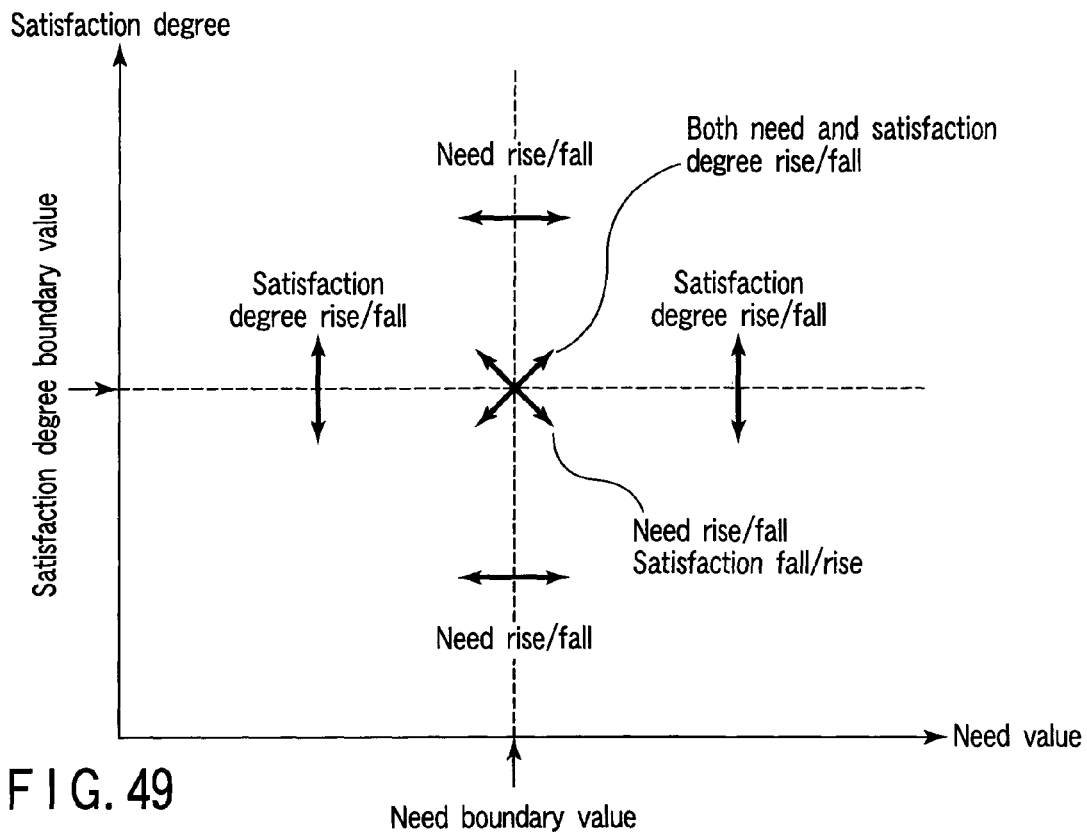
FIG. 49 is a diagram showing another example of the message to be attached when the region is shifted according to the seventh embodiment.

FIG. 49 is a diagram showing another example of a message to be added when the region is moved.

A retrieval keyword or category which is changed across its boundary when the time period elapses is supplied with a message indicating in which direction it crosses the boundary. For example, a retrieval keyword or category which is moved from "hidden success region" to "success region" is supplied with a message "need rise." The same thing is said about other cases.

As for the supplying with the message, the message data 76 which relates a region before the time period elapses, a region after the time period elapses and a message is prepared and a retrieval keyword or category whose region is changed when the time period elapses is detected by means of the region determining unit 53b of the trend analyzing unit 53. Further, a message which relates a region of a retrieval keyword or category whose region is changed before the time period elapses to a region in which it is scheduled to be located after the time period elapses is acquired by the message adding unit 53 of the trend analyzing unit 53 based on the message data 76.

Hereinafter, the output processing unit 54 will be described in detail.

Figure 50:
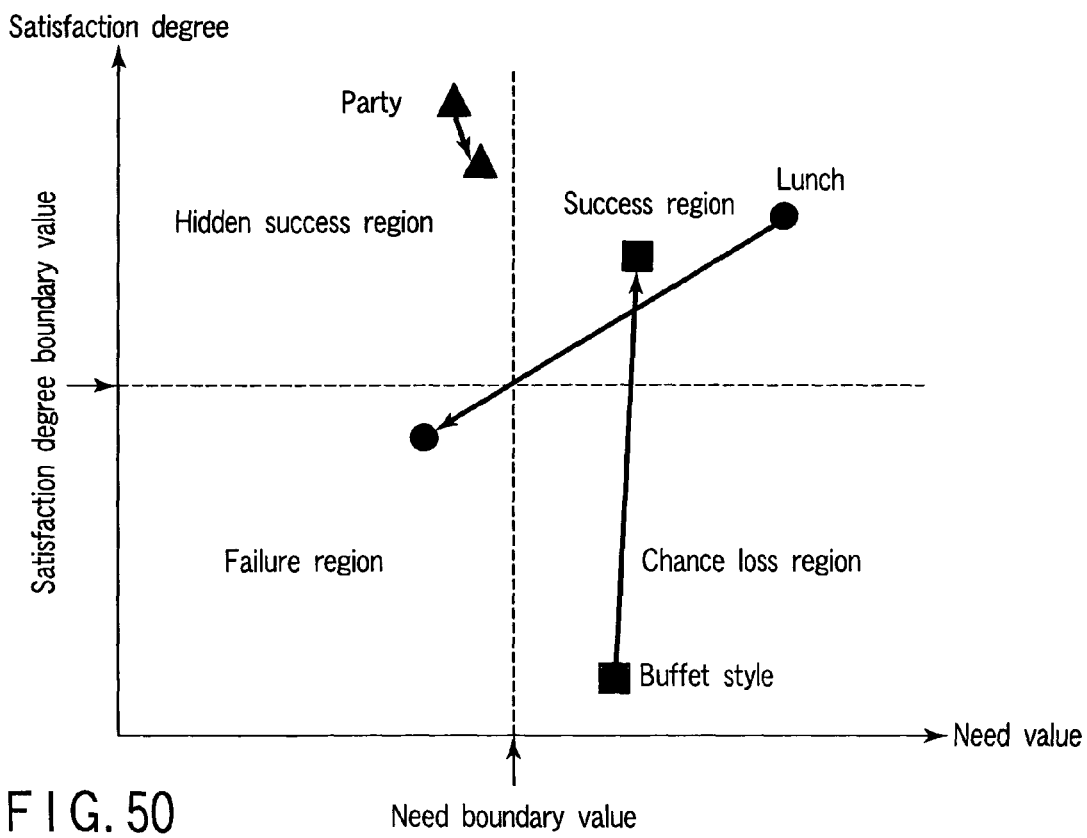
FIG. 50 is a diagram showing an example of a graph displayed by an output processing unit according to the seventh embodiment.

The output processing unit 54 displays a graph indicated by FIG. 50, for example.

The graph has coordinates indicating the need value and the satisfaction degree and indicates the need boundary value and satisfaction degree boundary value. Respective regions are supplied with designations and an index expressing a retrieval keyword or category of each time period is plotted based on the need value and satisfaction degree and the plotted indexes are connected with a line. FIG. 50 shows a trajectory indicating a transition each time when the time period elapses with an arrow.

Additionally, the output processing unit 54 displays a graph of the retrieval keyword or category at each time period based on the need value and satisfaction degree as shown in FIGS. 42 and 43, categorize data 78 at each time period as shown in FIG. 45 and trend data 73 of table type expressing a transition of the retrieval keyword and its message as shown in FIG. 48 on the output unit 55.

According to this embodiment, the analyzer acquires customer collection strategy of an analyzing object Web site and a policy for improvement of the content.

For example, the analyzer acquirers following effects.

First, the analyzer searches for a retrieval keyword and category which relate to a large number of browsing persons but in which the browsing persons terminate browsing of an analyzing object Web site soon. Therefore, the analyzer determines whether or not the analyzing object Web site retrieved based on the retrieval keyword and the category satisfies a browsing person request. The analyzer detects and investigates a kind of chance loss state which cannot satisfy a request of the browsing person. Thus, the analyzer improves the quality of the analyzing object Web site by improving the chance loss in the analyzing object Web site.

Second, the analyzer determines whether or not there exists an excellent retrieval keyword and category which increases the number of browsing persons who accesses the analyzing object Web site and satisfies the browsing person who makes access. Further, the analyzer determines whether or not the excellent condition of the retrieval keyword and category is temporary or declining and additionally determines whether or not a new retrieval keyword and category should be considered.

Third, the analyzer executes static or dynamic analysis not only in the unit of individual retrieval keyword but also in the unit of category to which each retrieval keyword belongs. Therefore, the analyzer acquires an analysis result corresponding to the contents which the analyzer wants to consider and the matter which the analyzer wants to consider, and grasp a viewing trend of the analyzing object Web site appropriately and easily so as to improve the accuracy of analysis.

Fourth, the analyzer acquires a change with the lapse of time of an analysis result on the retrieval keyword and category through a graph and grasps a change with the lapse of time period of viewing trend easily thereby making his analyzing work effective.

Fifth, the analyzer acquires effective data from a large volume of data quickly using a result of trend analysis on the retrieval keyword and category, so as to improve the accuracy of analysis and reduce labor necessary for the analysis.

Sixth, the analyzer searches for browsing person's trend easily at a high precision instead of a simple collection by a conventional Web access log.

Seventh, the analyzer grasps the trend of an entire category which is not grasped even when the retrieval keyword is analyzed individually.

Eighth, the analyzer acquires an analysis result about the retrieval keyword input according to various styles under a browsing person's intention easily and appropriately along an intention of the analyzer. Hereinafter, the eighth effect will be described with reference to its specific example.

Because the retrieval keyword is input according to various styles under an intention of a browsing person, even if the retrieval keyword is analyzed based on the Web access log analysis, the analyzer may not be able to acquire an analysis result along his intention.

For example, assume that the analyzer wants to investigate how the analyzing object Web site is accessed currently after a retrieval keyword concerning cooking is input. In this case, the conventional Web access log analysis acquires the number of browsing persons concerning the retrieval keyword "cooking" as an analysis result, however does not include the numbers of browsing persons about other retrieval keywords concerning cooking, for example, "gourmet" and "fast food" in the analysis result.

However, by analyzing in the unit of category as mentioned in this embodiment, the analyzer acquires an analysis result which the analyzer wants appropriately.

Eighth Embodiment

In this embodiment, a modification of the seventh embodiment will be described. Its retrieval keyword analyzing system is different from the seventh embodiment mainly in the trend analyzing unit and the other units are the same.

The trend analyzing unit acquires a moving distance and direction of the retrieval keyword and category when the time period elapses on a plane in which the need value and satisfaction degree are set up as coordinates, without using the need boundary value and satisfaction degree boundary value.

Figures 51, 52:
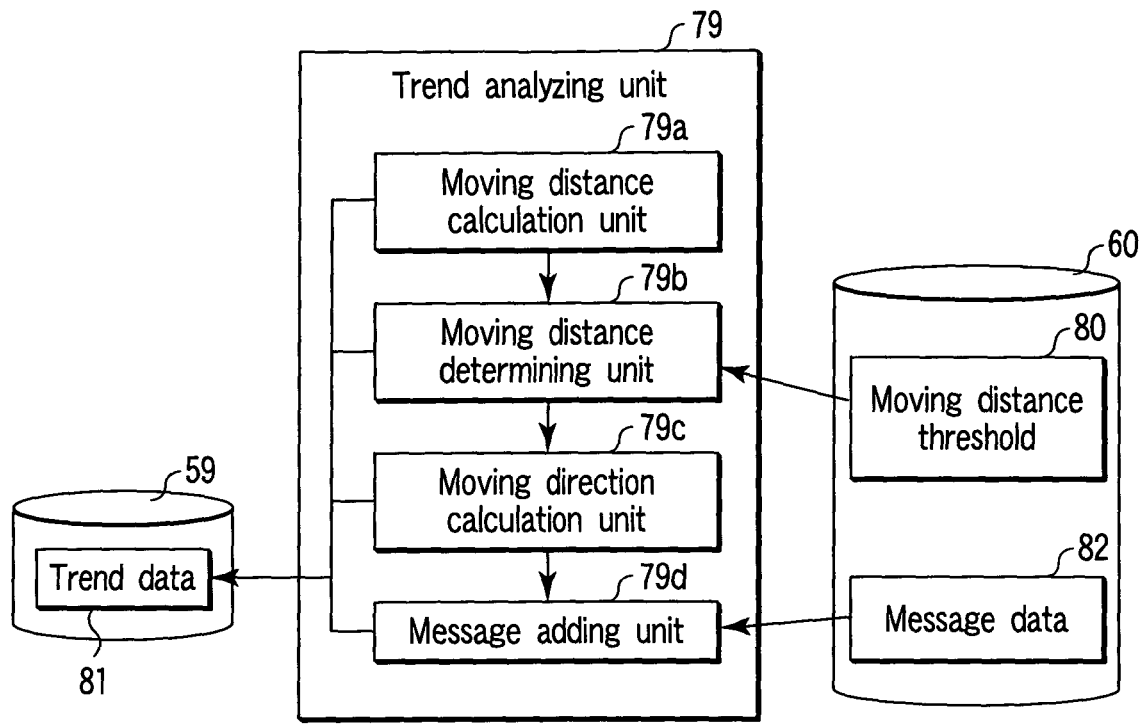
FIG. 51 is a block diagram showing an example of the configuration of a trend analyzing unit according to an eighth embodiment of the present invention.
FIG. 52 is a diagram showing the relation between a specific example of a moving distance threshold and the operation of a trend analyzing unit 79.

FIG. 51 is a block diagram showing an example of the configuration of the trend analyzing unit 79.

The trend analyzing unit 79 adopts the need value and satisfaction degree of the retrieval keyword and category of each time period as coordinate values and acquires a moving distance of each of all the retrieval keywords and categories located before and after the time period and supplies a retrieval keyword and category having a large moving distance with a message corresponding to its moving direction.

The trend analyzing unit 79 contains a moving distance calculation unit 79a, a moving distance determining unit 79b, a moving direction calculation unit 79c and a message adding unit 79d. The trend analyzing unit 79 includes the same function as the trend analyzing unit 53 described in the seventh embodiment.

The moving distance calculation unit 79a acquires a moving distance of each of all the retrieval keywords and categories located before and after the time period based on the retrieval keyword of each time period acquired by the evaluation value calculation unit 39a, and the need value and satisfaction degree of a category of each time period acquired by the category forming unit 52 according to Equation 3, provides its result to the moving distance determining unit 79b and incorporates it in the trend data 81.

$$\text{Moving distance} = \sqrt{((\text{succeeding need value}) - (\text{previous need value}))^2 + ((\text{succeeding satisfaction degree}) - (\text{previous satisfaction degree}))^2} \quad (3)$$

The moving distance determining unit 79b determines whether or not the retrieval keyword or category of each time period moves beyond a moving distance threshold 80 stored in the storage device 60 and incorporates its result in the trend data 81.

FIG. 52 shows the relation between a specific example of the moving distance threshold and an operation of the trend analyzing unit 79. In the example of FIG. 52, the moving distance threshold is set to 120 and thus, if a moving distance is 120 or more, calculation of the moving direction and supplying of a message are executed.

The moving direction calculation unit 79c calculates a moving direction with the lapse of a time period according to Equation 4 based on the need value and satisfaction degree of a retrieval keyword or category whose moving distance exceeds a moving distance threshold, provides its result to the message adding unit 79d and incorporates it in the trend data 81.

$$\text{Moving direction} = \tan^{-1} \frac{(\text{succeeding satisfaction degree}) - (\text{previous satisfaction degree})}{(\text{succeeding need value}) - (\text{previous need value})} \quad (4)$$

The message adding unit 79d supplies a retrieval keyword or category which exceeds its moving distance threshold based on the message data 82 stored in the storage device 60 corresponding to its moving direction.

Figures 53, 54:
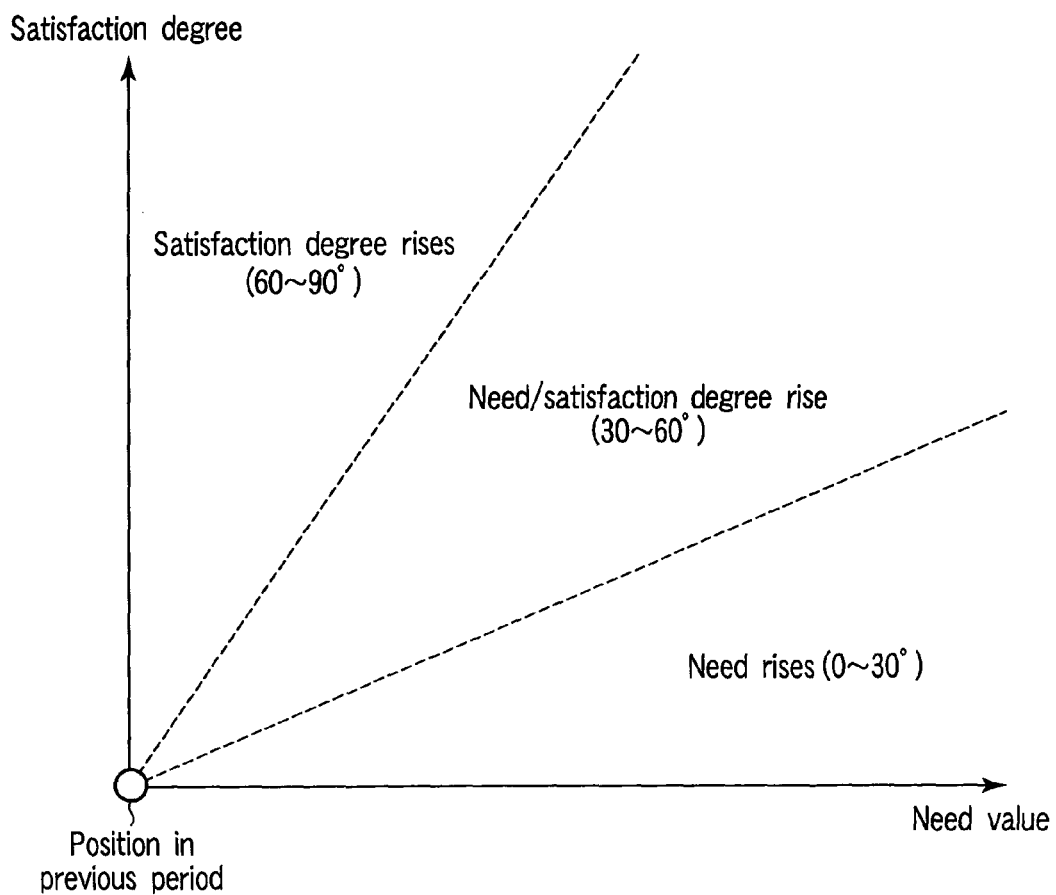
FIG. 53 is a diagram showing an example of message data 82.
FIG. 54 is a diagram showing a specific example of the relation between a message and the moving direction.

FIG. 53 shows an example of the message data 82. An angle indicating the moving distance has a correspondence with a message meaning a rise and fall of the need and satisfaction.

FIG. 54 shows a specific example of the relation between a message and a moving direction. In FIG. 54, if the moving direction is 0° or more to less than 30°, it is defined to display a message "need rises," if the moving direction is 30° or more to less than 60°, it is defined that a message "both need and satisfaction degree rise" is displayed, and if the moving direction is 60° or more to less than 90°, it is defined that a message "satisfaction degree rises" is displayed.

Not only a message when the moving direction is 0° or more to less than 90° in which both the need value and satisfaction degree increase, but also a message when the moving direction is 90° or more to less than 360° in which at least one of the need value and satisfaction degree decreases is defined.

Figure 55:
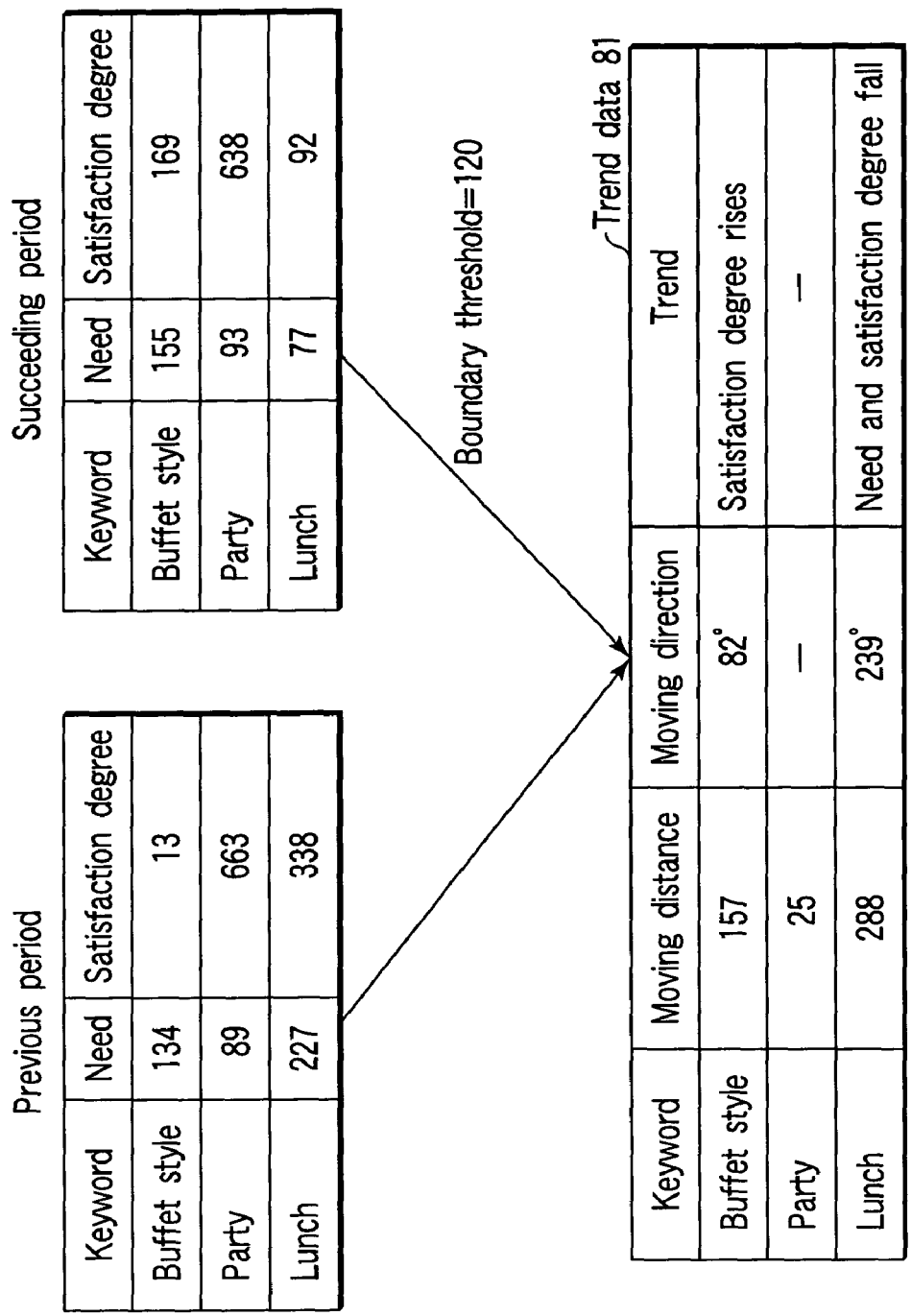
FIG. 55 is a diagram showing an example of trend data created by the trend analyzing unit according to the eighth embodiment.

FIG. 55 is a diagram showing an example of the trend data 81 created by the trend analyzing unit 79.

Retrieval keywords "Buffet style," "Lunch" whose moving distance is large are supplied with a message corresponding to the moving direction.

Figure 56:
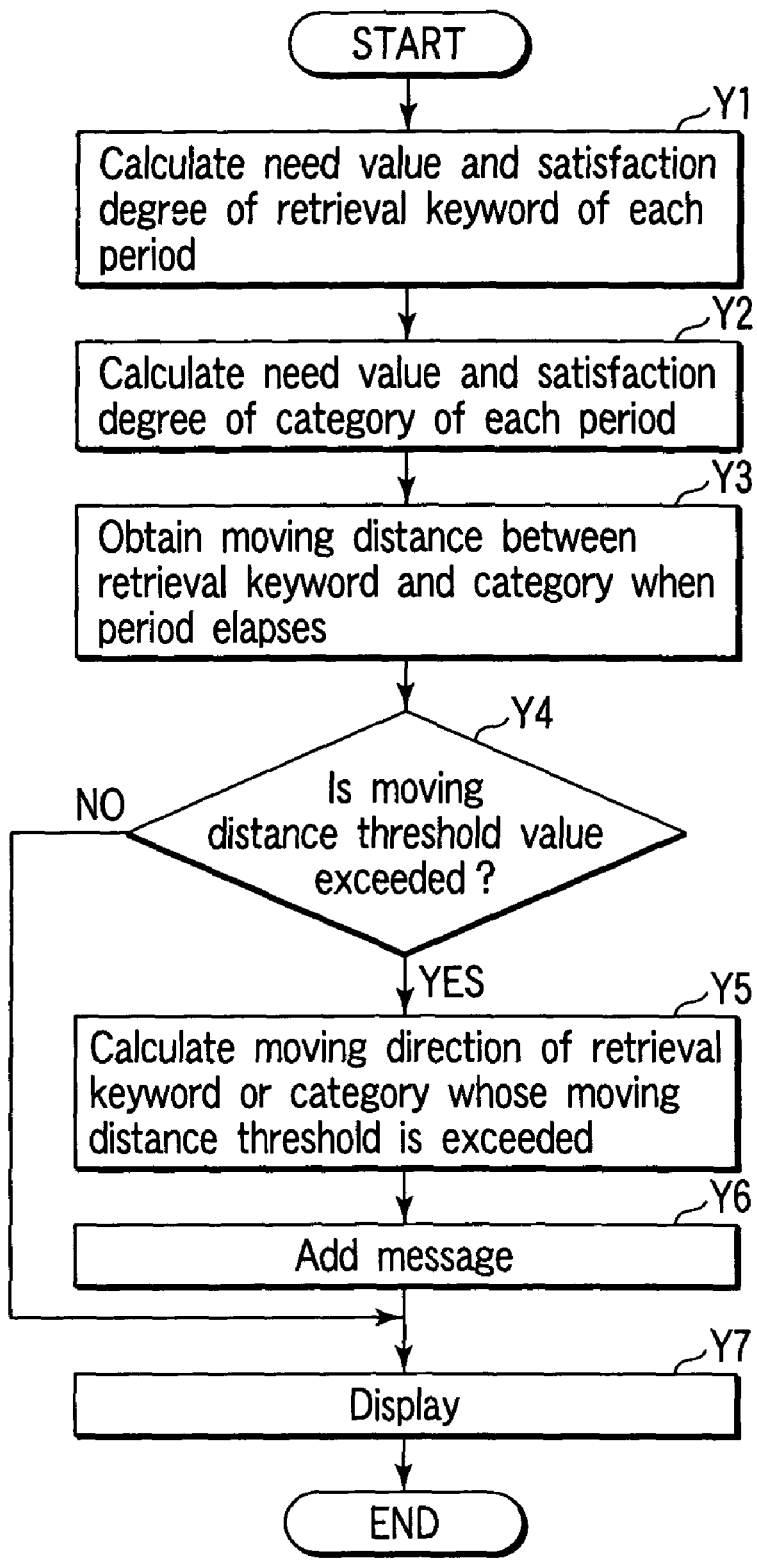
FIG. 56 is a flow chart showing an example of the operation of a retrieval keyword analyzing system according to the eighth embodiment.

FIG. 56 is a flow chart showing an example of the operation of the retrieval keyword analyzing system.

Because steps Y1 and Y2 are the same as steps V1 and V2 shown in FIG. 39, description thereof is omitted.

In step Y3, the moving distance calculation unit 79a of the trend analyzing unit 79 acquires a moving distance of the retrieval keyword and category with the lapse of a time period, incorporates its result in the trend data 81 and provides it to the moving distance determining unit 79b.

In step Y4, the moving distance determining unit 79b of the trend analyzing unit 79 determines whether or not the retrieval keyword and category exceeds the moving distance threshold 80 with the lapse of the time period, based on the moving distance threshold 80 stored in the storage device 60, incorporates its result in the trend data 81 and provides it to the moving direction calculation unit 79c.

In step Y5, the moving direction calculation unit 79c of the trend analyzing unit 79 calculates the moving direction of the retrieval keyword or category whose moving distance is determined to exceed the moving distance threshold, incorporates its result in the trend data 81 and provides it to the message adding unit 79d.

In step Y6, the message adding unit 79d of the trend analyzing unit 79 adds a retrieval keyword or category whose moving direction is calculated with a message corresponding to the moving direction, based on the message data 82 stored in the storage device 60 and incorporates its result in the trend data 81.

In step Y7, the output processing unit 54 displays a transition of the need value and satisfaction degree of the retrieval keyword or category and a message based on the trend data 81 corresponding to an operation of the analyzer.

Figure 57:
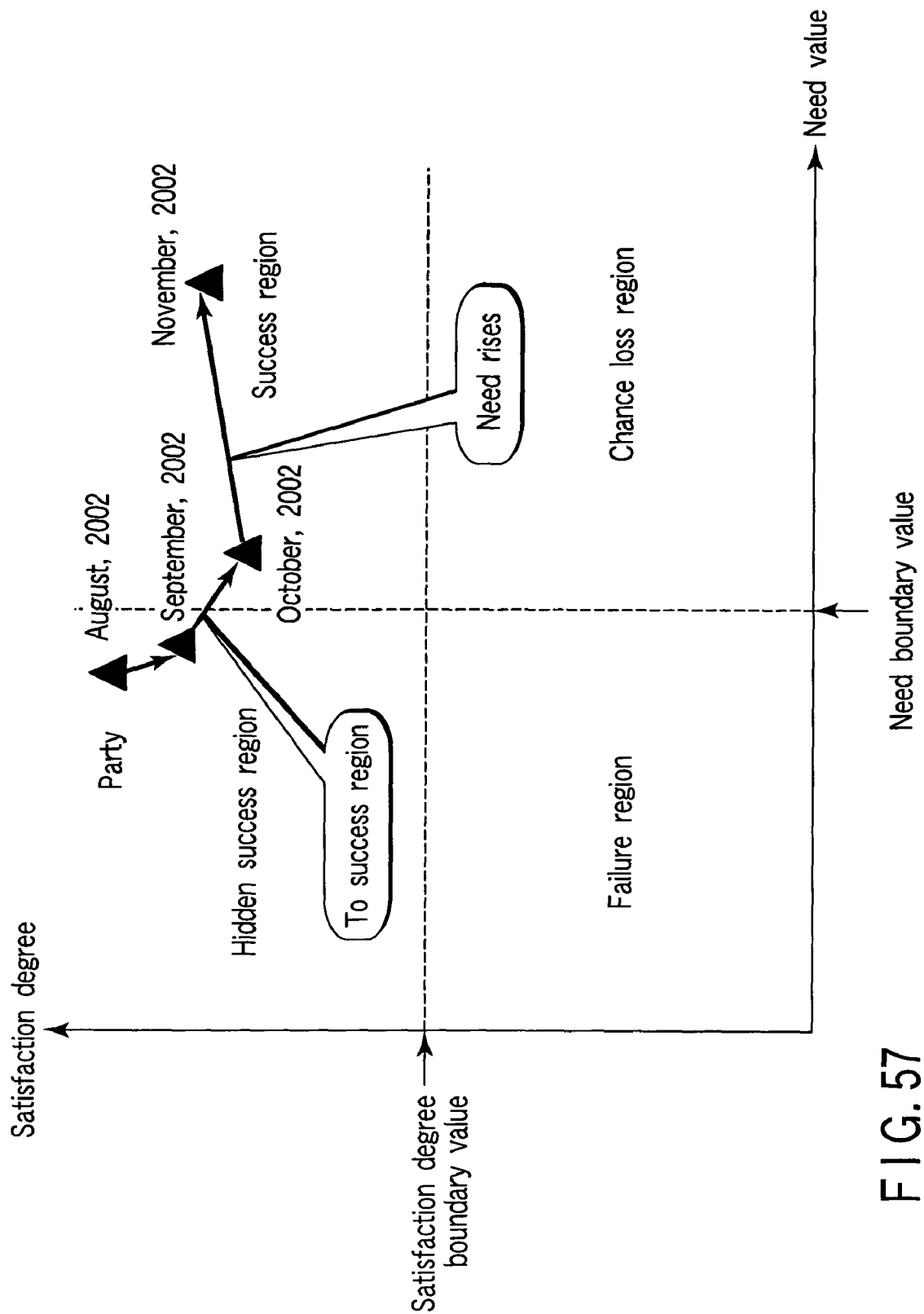
FIG. 57 is a diagram showing an example of trend data output by an output processing unit according to the eighth embodiment.

FIG. 57 is a diagram showing an example of the trend data 81 output by the output processing unit 54.

FIG. 57 shows the trend data 81 obtained as a result of the trend analysis over three time periods. The output processing unit 54 displays trend data 81 created by the trend analyzing unit 79 every continuous two time periods on the same plane. FIG. 57 shows a combination of the trend data 73 described in the first embodiment and the trend data 81 described in this embodiment.

A graph shown in FIG. 57 has coordinates indicating the need value and satisfaction degree and displays the need boundary value and satisfaction degree boundary value. Respective regions are supplied with region designations. An index indicating a retrieval keyword "party" of each time period is plotted according to its need value and satisfaction degree and plotted indexes are connected with lines. FIG. 57 indicates a trajectory indicating a transition each time when the time period elapses with arrows. In FIG. 57, any change, namely, a case where the region boundary is crossed or a case where the moving distance is large, is provided with a corresponding message.

According to this embodiment, a retrieval keyword input to access an analyzing object Web site is analyzed each time when the time period elapses and it is possible to provide its change amount as a moving distance and its change content as a moving direction to the analyzer.

According to the seventh embodiment and this embodiment, a case of analyzing a retrieval keyword to be input to access an analyzing object Web site is described.

However, the seventh embodiment and this embodiment may be applied to analysis on a reference Web site or domain having outside contents which are accessed before accessing an analyzing object Web site.

Additionally, it is possible to analyze a campaign mail in case where the analyzing object Web site is accessed based on the campaign mail and acquire an analysis result on ID indicating the type of the campaign.

Consequently, the analyzer analyzes the need level and satisfaction level about the retrieval keyword, reference Web site and campaign to grasp, for example, a result by expressing spatially.

In the seventh embodiment and this embodiment, the processing up to acquiring relation data of each time period may be exchanged with the above-described other processing. That is, by executing the above-described various methods of the respective embodiments for a predetermined time period as a processing for acquiring the relation data of each predetermined time period, the same effect is obtained.

Although according to the seventh embodiment and this embodiment, the need value and satisfaction degree of the category are acquired according to Equations 1 and 2, it is possible to acquire the need value and satisfaction degree according to another method using another definition.

Although according to this embodiment, the moving distance and moving direction of the retrieval keyword and category are acquired according to Equations 3 and 4, it is possible to acquire the moving distance and moving direction of the retrieval keyword and category according to another method using another definition.

According to the seventh embodiment and this embodiment, the analyzing object may be no Web site in terms of analysis unit and may be a Web page or a Web page group comprising multiple Web pages.

Although according to this embodiment, the moving direction is calculated only for a retrieval keyword or category whose moving distance exceeds its moving distance threshold, the moving distance and moving direction may be calculated for all retrieval keywords or categories or the moving distance and moving direction may be calculated for retrieval keywords or categories which satisfy another condition.

According to the seventh embodiment and this embodiment, as an analysis viewpoint about a viewing trend of the analysis object, the need value, which indicates an expectancy to the analyzing object Web site by the browsing person and the satisfaction degree, indicating the level of satisfaction which the analyzing object Web site gives to the browsing person are employed. However, the analysis viewpoint about the viewing trend is changed freely. For example, the number of chances in which the object of the analyzing object Web site is achieved and the degree of achievement expressing the quantity of object achievements may be adopted as the analysis viewpoint. For example, it is possible to regard the number of browsing persons in a Web site which aims at receiving orders as the number of chances for achieving an object and the quantity of received orders as the level of achievement and adopt the number of chances and the level of achievement as the analysis viewpoint.

Ninth Embodiment

According to this embodiment, a modification of the retrieval keyword analyzing system according to the first to eighth embodiments will be described.

According to the first to eighth embodiments, a case where a single retrieval keyword is input into an extracted access sequence is described.

The relation about an access sequence in which a single retrieval keyword is input to an extracted access sequence, the retrieval result page 2, the customer site 61, an access sequence in the customer site 61 and after-retrieval browsing time will be described with reference to FIGS. 58 to 60.

FIG. 58 is a diagram showing an example of an access sequence where a retrieval system is provided within the customer site 61. Such a case can be processed in the first to fourth embodiments and the sixth to eighth embodiments.

The browsing person browses Web page Pa1, Pa2, retrieval result page SPa, Web pages Pa3 to Pa5 in succession and finally Web page Pa6. The Web page Pa2, retrieval result page SPa, Web pages Pa3 to Pa5 belong to the customer site 61. The Web page Pa2 is a screen which allows a retrieval keyword to be input.

An access sequence within the customer site 61 is Pa2→SPa→Pa3→Pa4→Pa5. Because according to the definition of the first embodiment, the after-retrieval browsing time is a time interval obtained by subtracting an access time to a first keyword related page (that is, a page next to the retrieval result page SPa) from a last access time in an access sequence (that is, an access sequence in the customer site 61), this is equal to an interval of access time from the Web page Pa3 to the Web page Pa5.

FIG. 59 is a diagram showing an access sequence in case where a retrieval system exists outside the customer site 61. Such a case can be processed in the fifth embodiment.

The browsing person browses the Web page Pb1, the retrieval result page SPb, and the Web pages Pb2 to Pb6 successively and finally the Web page Pb7. The Web pages Pb2 to Pb6 are Web pages belonging to the customer site 61. When the browsing person inputs a retrieval keyword into the screen Pb1 which allows the retrieval keyword to be input in an off-site retrieval system $34_1$ the retrieval result page SPb is created. The retrieval result page SPb includes a link to the Web page Pb2 of the customer site 61.

The access sequence in the customer site 61 is Pb2→Pb3→Pb4→Pb5→Pb6. Because according to the definition of the fifth embodiment, the after-retrieval browsing time is a difference in time from an access having reference information using the retrieval system in an access represented by the same access sequence identifier to a last browsed access, it is an interval in access time from the Web page Pb2 to the Web page Pb6.

FIG. 60 is a diagram showing an example of an access sequence where the retrieval system exists outside the customer site 61 while a retrieval result page exists halfway of an access sequence within the customer site 61. Such a case can be processed in the fifth embodiment.

The browsing person browses the Web pages Pc1 to Pc3, the retrieval result page SPc, and the Web pages Pc4 to Pc6 successively and finally browses the Web page Pc7. The Web pages Pc2 to Pc6 are Web pages belonging to the customer site 61. The Web page Pc3 is a screen which allows a retrieval keyword to be input and corresponding to a result of its input, the off-site retrieval system $34_1$ outputs the retrieval result page SPc.

The access sequence within the customer site 61 is Pc2→Pc3→Pc4→Pc5→Pc6. Because according to the definition of the fifth embodiment, the after-retrieval browsing time is a difference in time from an access having reference information using the retrieval system in an access represented by the same access sequence identifier to a last browsed access, it is an interval in access time from the Web page Pb4 to the Web page Pb6.

In the first to third, and fifth to eighth embodiments, as shown in FIGS. 58 to 60, the retrieval keyword is input once in an extracted access sequence and the after-retrieval browsing time, which is a browsing time from the retrieval result page up to the latter Web page is treated as the satisfaction degree.

In the fourth embodiment, the retrieval keyword is input once in an extracted access sequence and a success degree to the retrieval result of this retrieval keyword is acquired.

This embodiment improves the first to eighth embodiments. The retrieval keyword is input multiple times in an extracted access sequence.

An example that an access sequence in the customer site of this embodiment is divided to further one or more access sequences (hereinafter referred to as "sub-access sequence") will be described. Depending on a situation, there may exit no sub-access sequence in the access sequence within the customer site.

The same processing method as the above-described respective embodiments is applied to the sub-access sequence.

The sub-access sequence is defined by extracting a starting end determined by an access to a retrieval result page and with a terminal end of continuous accesses by the same access person as the extracted starting end, after the starting end. An example of the sub-access sequence extraction rule for extracting the sub-access sequence from the access sequence within the customer site will be described below.

The starting end of the sub-access sequence is extracted according to the first rule if the retrieval system exists in the customer site and if it exists outside the customer site, according to the second rule.

According to the first rule, if the retrieval system in the customer site outputs a retrieval result page in the extracted access sequence, the starting end of the sub-access sequence is an access to the retrieval result page output by the retrieval system in the customer site.

According to the second rule, if the retrieval system outside the customer site outputs a retrieval result page in an extracted access sequence and an access just following an access to the retrieval result page is an access to a Web page within the customer site, the starting end of the sub-access sequence is an access to a Web page within the customer site having a retrieval result page output by the retrieval system outside the customer site as reference information.

That is, when retrieval is executed by a retrieval system outside the customer site, the starting end of a sub-access sequence is an access to a Web page within the customer site selected on a retrieval result page by a retrieval system outside the customer site.

The access just following an access to the Web page "A" refers to an access made after the access to the Web page "A" in continuous accesses made by the same access person, and further an access nearest the access to the Web page "A" in terms of time. Assuming that that Web page "A" is a retrieval result page SPb in FIG. 59, an access to a Web page Pb2 corresponds to the access made after the access to the Web page "A."

The terminal end of the sub-access sequence is extracted according to a third rule.

According to the third rule, the terminal end of the sub-access sequence is an access within the customer site just preceding the starting end of a next sub-access sequence. However, when there exists no starting end of a next sub-access sequence, the terminal end of the access sequence within the customer site is regarded as the terminal end of the sub-access sequence.

The access just preceding an access to the Web page "A" refers to an access made before the access to the Web page "A" in continuous accesses made by the same access person, and further an access nearest the access to the Web page "A" in terms of time. Further, the access within the customer site just preceding an access to the Web page "A" refers to an access made before the access to the Web page "A" in continuous accesses made by the same access person, and further an access within the customer site nearest the access to the Web page "A" in terms of time. Assuming that that Web page "A" is the Web page Pc4, the Web page Pc3 corresponds to the access within the customer site just preceding an access to the Web page "A."

When an access to a retrieval result page output by a retrieval system within the customer site falls on an access to a Web page having a retrieval result page output by the retrieval system outside the customer site as reference information, the fourth rule is adopted to obtain the starting end of the sub-access sequence.

According to the fourth rule, if an access to a retrieval result page output by a retrieval system within the customer site corresponds to an access to a Web page having a retrieval result page output by a retrieval system outside the customer site as reference information, an access to the retrieval result page output by the retrieval system within the customer site is the starting end of a sub-access sequence.

The relation about an access sequence in case where multiple retrieval keywords are input to an access sequence, a retrieval result page, a customer site, an access sequence within the customer site and the sub-access sequence will be described with reference to FIGS. 61 to 63.

FIG. 61 is a diagram showing an example in which multiple retrievals are carried out in an access sequence provided with a retrieval system within the customer site 61. FIG. 61 has a correspondence with FIG. 58 in which only a retrieval is performed by an on-site retrieval system within the customer site.

The browsing person browses the Web pages Pd1 and Pd2, retrieval result page SPd, Web pages Pd3 to Pd5, retrieval result pages SPe, SPf, Web pages Pd6 and Pd7 successively and finally browses the Web page Pd8. The Web pages Pd2 to Pd7 and the retrieval result pages SPd to SPf are pages belonging to the customer site 61. The Web pages Pd2, Pd5 and the respective retrieval result pages SPd to SPf are screens which allow the retrieval keyword to be input.

According to the sub-access sequence extraction rule, SPd→Pd3→Pd4→Pd5, from an access to the retrieval result page SPd up to an access to a page within the customer site just preceding an access to a next retrieval result page SPe (that is, access to the Web page Pd5) is a sub-access sequence 100.

Likewise, from an access to the retrieval result page SPe up to an access to a page within the customer site 61 just preceding a next retrieval result page SPf (that is, access to the retrieval result page SPe) is a sub-access sequence 101.

Likewise, SPf→Pd6→Pd7 from an access to the retrieval result page SPf to an access to the terminal end of an access sequence within the customer site 61 is a sub-access sequence 102.

Like this example, some retrieval result page may allow a retrieval keyword to be input therein or the keyword related page may be a retrieval result page. In these cases, a transition on the display screen is more or less different from that shown in FIG. 2.

Figure 62:
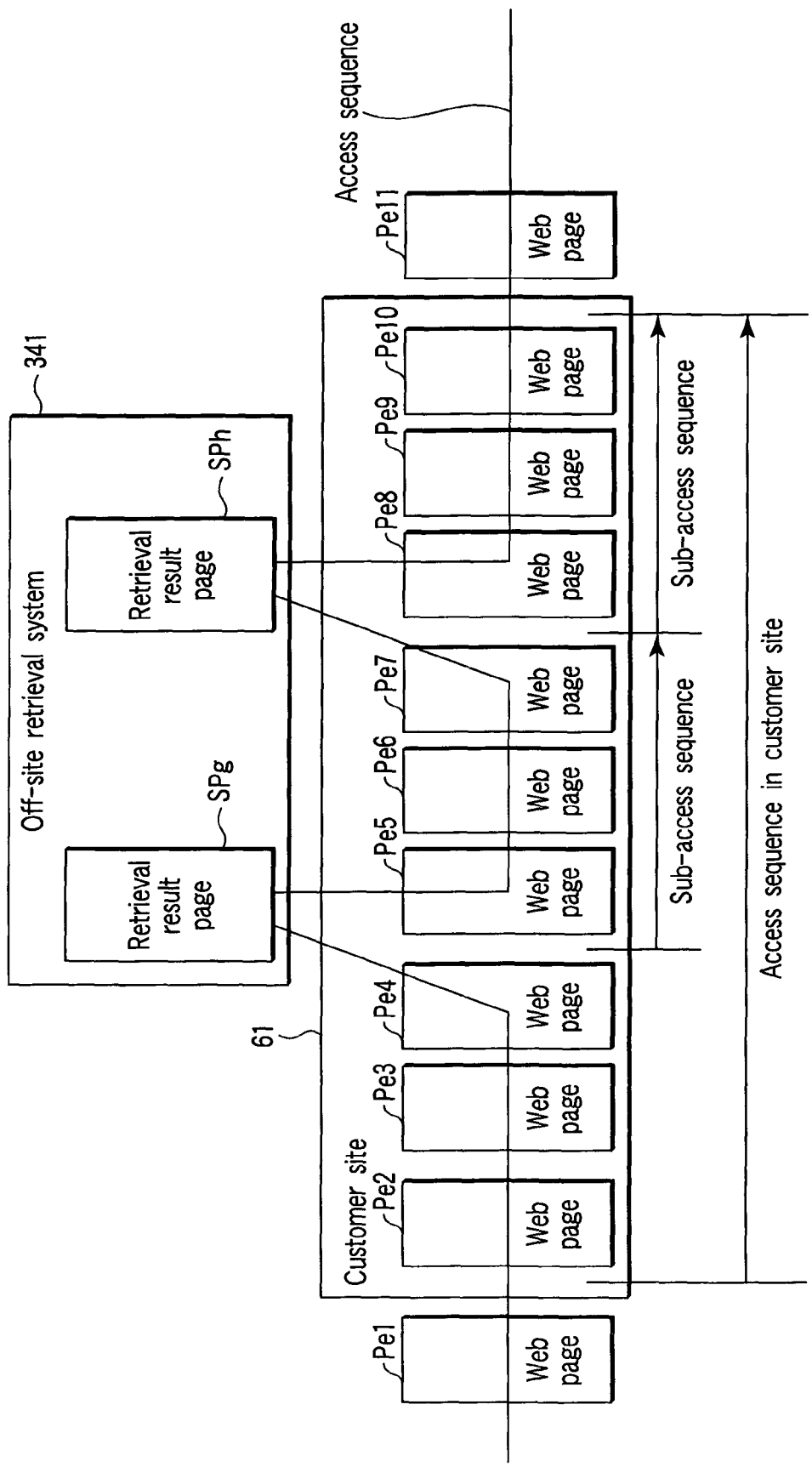
FIG. 62 is a diagram showing an example of a state in which multiple retrievals are carried out in an access sequence in case where the retrieval system exists out of the customer site.

FIG. 62 is a diagram showing an example in which multiple retrievals are carried out in an access sequence in case where the retrieval system exists outside the customer site. FIG. 62 has a correspondence with FIG. 60 in which the retrieval is carried out once through the retrieval system $34_1$ outside the customer site 61.

The browsing person accesses the Web pages Pe1 to Pe4, the retrieval result page SPg, the Web pages Pe5 to Pe7, the retrieval result page SPh, the Web pages Pe8 to Pe10 successively and finally browses the Web page Pe11. The Web pages Pe2 to Pe10 are pages belonging to the customer site 61. The Web pages Pe4 and Pe7 are screens which allows a retrieval keyword to be input therein and corresponding to a result of the input, the off-site retrieval system $34_1$ outputs retrieval result pages SPg and SPh.

According to the sub-access sequence extraction rule, Pe5→Pe6→Pe7 from an access to a page having the retrieval result page SPg as reference information (that is, an access to the Web page Pe5) up to an access to a page within the customer site 61 (that is, an access to the Web page Pe8) just preceding an access to a page having a next retrieval result page as reference information (that is, an access to the Web page Pe7) serves as a first sub-access sequence.

Likewise, Pe8→Pe9→Pe10 from an access to a page having the retrieval result page SPh as reference information (that is, an access to the Web page Pe8) up to an access to a terminal end of an access sequence within the customer site 61 (that is, an access to the Web page 10) serves as a second sub-access sequence.

Figure 63:
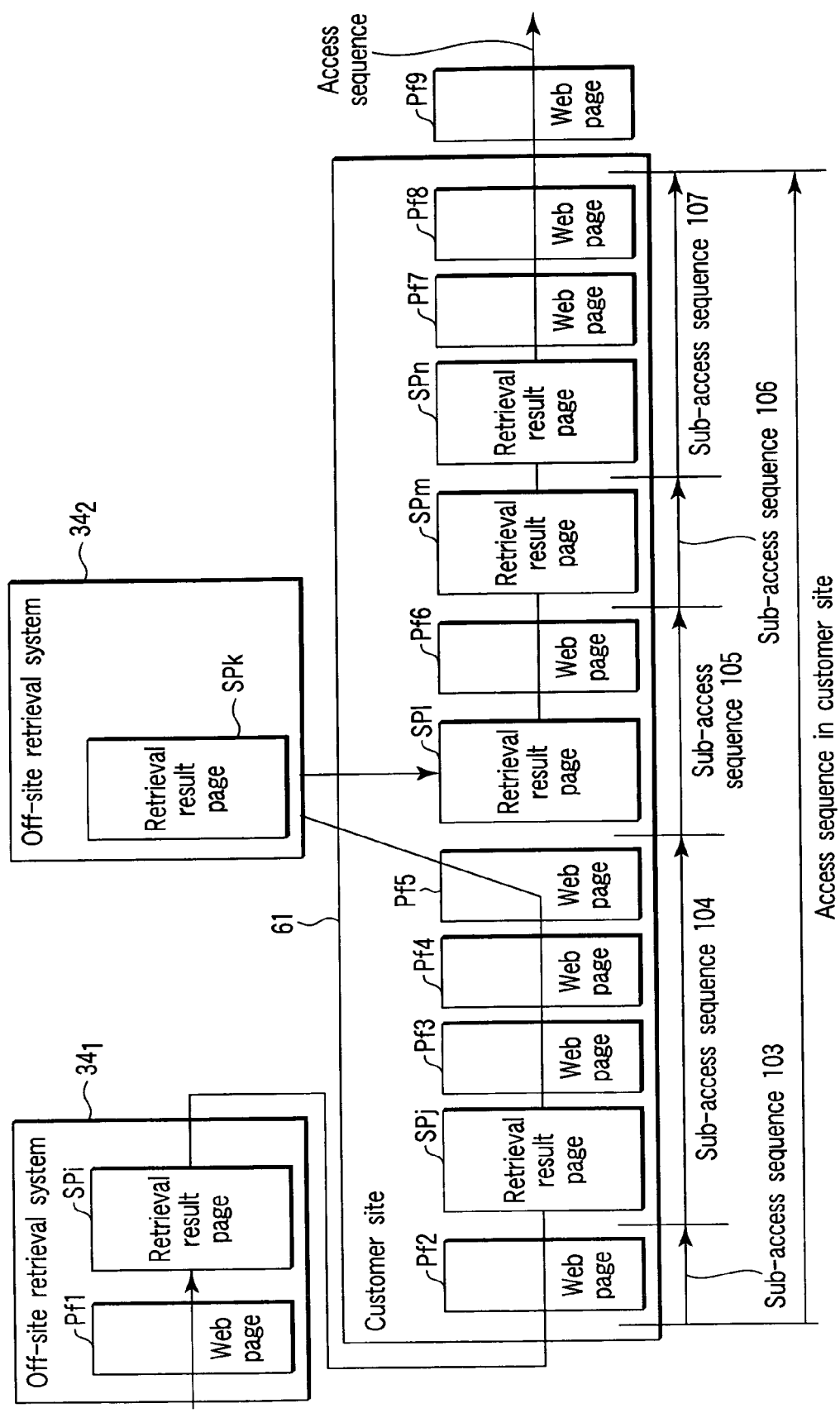
FIG. 63 is a diagram showing an example of a state in which the retrieval is carried out halfway of an access sequence using both the retrieval system within the customer site and the retrieval system out of the customer site.

FIG. 63 is a diagram showing an example in which the retrieval is carried out halfway of an access sequence using both a retrieval system within the customer site and a retrieval system outside the customer site. FIG. 63 has a correspondence with a combination of FIGS. 58 to 60.

The browsing person browses the Web page Pf1, the retrieval result page SPi, the Web page Pf2, the retrieval result page SPj, the Web pages Pf3 to Pf5, the retrieval result page SPk, the retrieval result page SP1, the Web page Pf6, the retrieval result pages SPm, SPn, and the Web pages Pf7, Pf8 successively and finally browses the Web page Pf9. The Web pages Pf2 to Pf8, and the retrieval result pages SPj, and SP1 to SPn are pages belonging to the customer site 61. The Web pages Pf1, Pf2, Pf5, Pf6 and the retrieval result pages SPi to SPn are screen which allow a retrieval keyword to be input therein. Corresponding to a result of input of the retrieval keyword in the Web page Pf1, the off-site retrieval system $34_1$ outputs a retrieval result page SPi and corresponding to an input in the Web page Pf5, the off-site retrieval system $34_2$ outputs the retrieval result page SPk.

According to the sub-access sequence extraction rule, from an access to a page having the retrieval result page SPi as reference information (that is, an access to the Web page Pf2) up to an access to a page within the customer site 61 just preceding an access to the retrieval result page SPj (that is, an access to the Web page Pf2) serves as a sub-access sequence 103.

Likewise, SPj→Pf3→Pf4→Pf5 from an access to the retrieval result page SPj to an access to a page within the customer site 61 just preceding an access to the retrieval result page SPk (that is, an access to the Web page Pf5) serves as a sub-access sequence 104. Because an access to the retrieval result page SP1 by a retrieval system within the customer site 61 corresponds to an access to a page having the retrieval result page SPk by the retrieval system $34_2$ outside the customer site 61 as reference information, according to the sub-access sequence extraction rule, the access to the retrieval result page SP1 by the retrieval system within the customer site 61 acts as a starting end of the sub-access sequence 105.

Likewise, SP1→Sf6 from an access to the retrieval result page SP1 up to an access to a page within the customer site 61 (that is, an access to the Web page Pf6) just preceding an access to the retrieval result page SPm serves as a sub-access sequence 105.

Likewise, the retrieval result page SPm serves as a sub-access sequence 106 and SPn→Pf7→Pf8 serve as a sub-access sequence 107.

The relation between a sub-access sequence extracted from an access sequence within the customer site 61 and the after-retrieval browsing time will be described based on the sub-access sequence described above.

If the retrieval system exists within the customer site 61, the after-retrieval browsing time in an access sequence within the customer site 61 refers to a time interval obtained by subtracting an access time to a first keyword related page (that is, a page next to the retrieval result page) from a last access time in the access sequence (that is, access sequence within the customer site 61). When the retrieval system exists outside the customer site 61, it refers to a difference in time from an access having reference information using the retrieval system to a last browsed access. If this is applied to the sub-access sequence, following is said.

Figure 64:
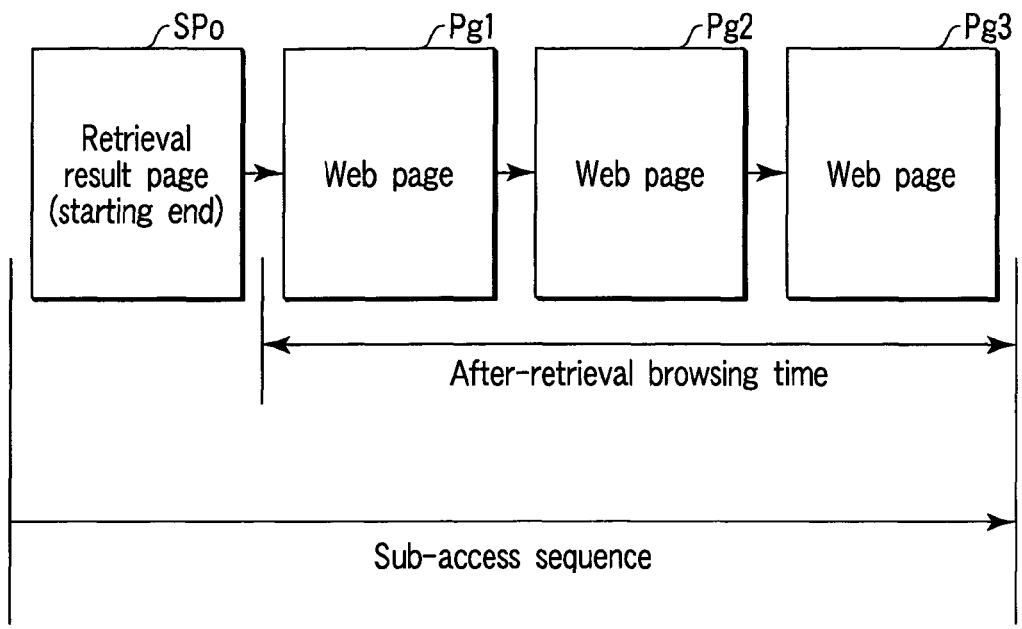
FIG. 64 is a diagram showing an example of the relation between a sub-access sequence extracted based on a retrieval result page by the retrieval system within the customer site and an after-retrieval browsing time.

FIG. 64 is a diagram showing an example of the relation between a sub-access sequence in which an access to the retrieval result page acts as a starting end and the after-retrieval browsing time where the retrieval system within the customer site 61 outputs a retrieval result page. In this sub-access sequence, the browsing person browses the retrieval result page SPo and the Web pages Pg1 to Pg3 successively. Such a case is processed by the first to fourth embodiments and the sixth to eighth embodiments.

In such a case, a time interval from an access to the Web page Pg1, which is a next access to an access to the retrieval result page Sp, to an access to the Web page Pg3, which is a last access in the sub-access sequence, is the after-retrieval browsing time. However, if the sub-access sequence is constituted of only the retrieval result page SPo, the after-retrieval browsing time is set to 0.

Figure 65:
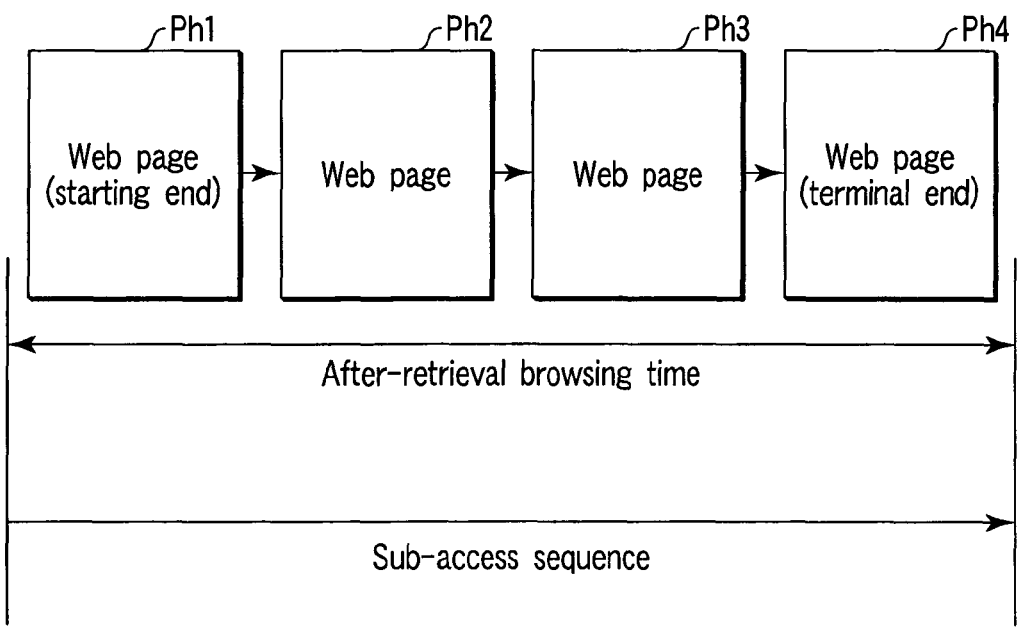
FIG. 65 is a diagram showing an example of the relation between a sub-access sequence extracted based on a retrieval result page by the retrieval system out of the customer site and an after-retrieval browsing time.

FIG. 65 is a diagram showing an example of the relation between a sub-access sequence in which an access to a page having a retrieval result page by the retrieval system outside the customer site 61 as reference information acts as a starting end and the after-retrieval browsing time where the retrieval system outside the customer site 61 outputs a retrieval result page. In the sub-access sequence, the browsing person browses the Web pages Ph1 to Ph4 successively. Such a case is processed by the fifth embodiment.

In such a case, a time interval from an access to the Web page Ph1, which is a next access of the retrieval result page (that is, access having the retrieval result page as reference information), to an access to the Web page Ph4, which is a last access in the sub-access sequence, acts as the after-retrieval browsing time.

If the starting end of the sub-access sequence is an access to the Web page having the retrieval result page output by the retrieval system outside the customer site 61 as reference information, a browsing time from an access at the starting end of the sub-access sequence to the terminal end of the sub-access sequence acts as the after-retrieval browsing time. However, if the starting end of the sub-access sequence is equal to the terminal end of the sub-access sequence, the after-retrieval browsing time refers to an access time at the starting end of the sub-access sequence.

Although the sub-access sequence extracted by using the retrieval system within the customer site 61 includes a retrieval result page, a sub-access sequence extracted by using the retrieval system outside the customer site 61 does not include any retrieval result page. However, even if the retrieval system is located inside or outside the customer site 61, by calculating the after-retrieval browsing time based on the relation shown in FIGS. 64 and 65, the qualitative evaluation value is calculated properly for an access condition in the customer site 61.

Hereinafter the concept of this embodiment will be described about a case where it is applied to the first embodiment. However, the concept of the present embodiment can be applied to the second to eighth embodiments also.

FIG. 66 is a block diagram showing an example of the configuration of the retrieval keyword analyzing system.

A retrieval keyword analyzing system 83 reads out a retrieval keyword analyzing program 85 recorded in a recording medium 84 and executes it.

When the retrieval keyword analyzing program 85 is read by the system 83 and executed, the log pre-processing unit 12, a sub-access sequence extracting unit 86, a keyword extracting unit 87 and an evaluation value calculation unit 88 are achieved.

The evaluation value calculation unit 88 includes a satisfaction degree calculation unit 89 and the satisfaction degree/keyword relating unit 16.

Data created by each of the units 12, and 86 to 88 are stored in the storage device 38. The units 12, and 86 to 88 are capable of reading data stored in the storage device 38. That is, exchange of various kinds of data among the units 12, and 86 to 88 may be carried out through the storage device 38. In this case, data providing side records the provided data in the storage device 38 and data receiving side reads out data from the storage device 38.

Figure 67:
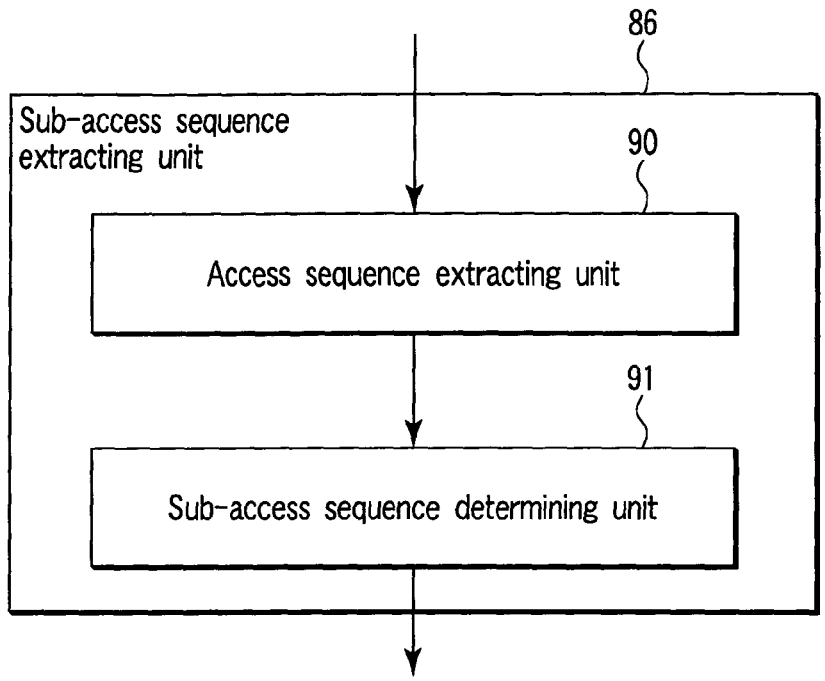
FIG. 67 is a block diagram showing a specific example of a sub-access sequence extraction unit 86 according to the ninth embodiment.

FIG. 67 is a block diagram showing a specific example of the sub-access sequence extracting unit 86.

The sub-access sequence extracting unit 86 includes an access sequence extracting unit 90 and a sub-access sequence determining unit 91.

The access sequence extracting unit 90 has the same function as the access sequence extracting unit 13 and a feature of adding information necessary for determining the sub-access sequence to the access sequence data which is an output result.

The access sequence extracting unit 90 extracts an access sequence from a series of page accesses according to a predetermined access sequence extracting rule and creates access sequence data expressing an access sequence extraction result.

For example, as the access sequence extracting rule, the rule mentioned in the first embodiment is used.

FIG. 68 shows an example of access sequence data created by the access sequence extracting unit 90.

As shown in FIG. 68, data in which reference information is added to the access sequence data shown in FIG. 6 turns to access sequence data created by the access sequence extracting unit 90. In FIG. 68, a case where no reference information exists is indicated with "-".

The sub-access sequence determining unit 91 has a function of cutting out a sub-access sequence from the extracted access sequence. The sub-access sequence determining unit 91 extracts a sub-access sequence based on the access sequence shown in FIG. 68.

Figure 69:
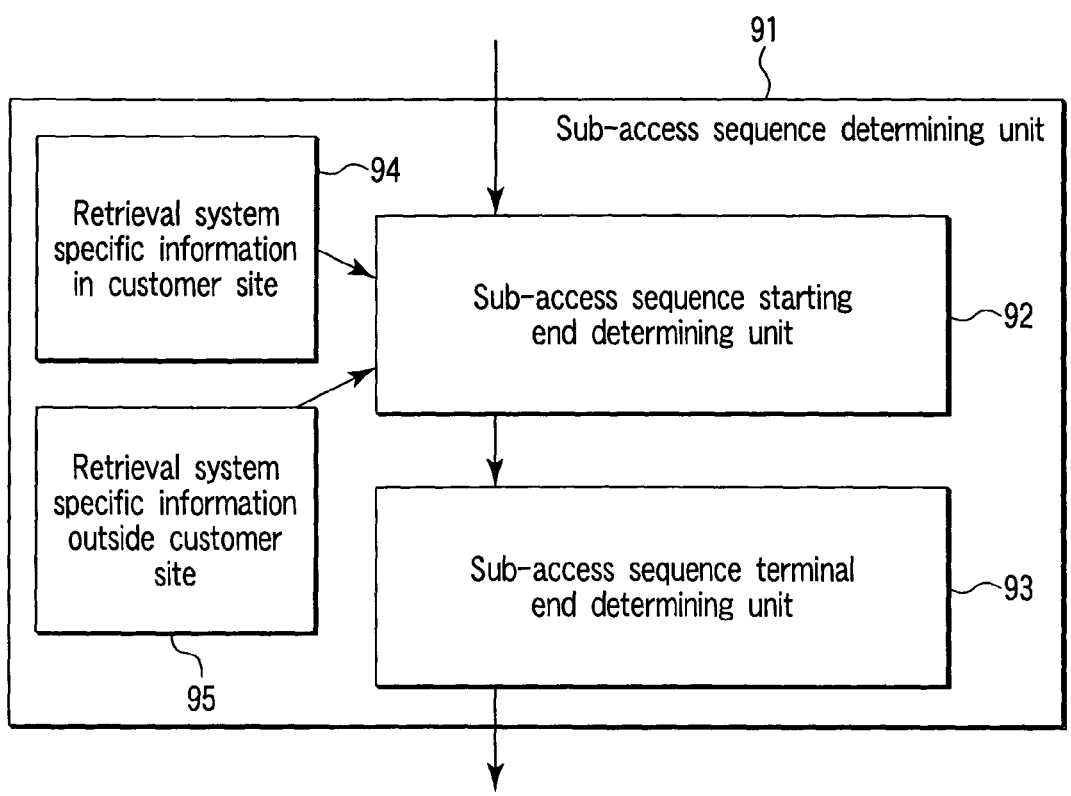
FIG. 69 is a block diagram showing a specific example of a sub-access sequence determining unit 91 according to the ninth embodiment.

FIG. 69 is a block diagram showing a specific example of the sub-access sequence determining unit 91.

The sub-access sequence determining unit 91 includes a sub-access sequence starting end determining unit 92 for determining the starting end and a sub-access sequence terminal end determining unit 93 for determining the terminal end.

The sub-access sequence starting end determining unit 92 determines the starting end of the sub-access sequence based on the sub-access sequence extracting rule and the access sequence data shown in FIG. 68.

In order to determine that some access is an access to the retrieval result page 2 output by a retrieval system within the customer site 61, the sub-access sequence starting end determining unit 92 acquires the starting end by using information 94 for specifying a retrieval system within the customer site 61 shown in FIG. 8.

In order to determine that some access is an access to a Web page having a retrieval result page output by a retrieval system outside the customer site 61 as the reference information, the sub-access sequence starting end determining unit 92 acquires the starting end by using information 95 for specifying a retrieval system outside the customer site 61 as shown in FIG. 31.

The sub-access sequence terminal end determining unit 93 determines the terminal end of the sub-access sequence based on the above-described sub-access sequence extracting rule, starting end data determined by the sub-access sequence starting end determining unit 92 and access sequence data shown in FIG. 28.

The sub-access sequence terminal end determining unit 93 provides sub-access sequence data indicating an extraction result of the sub-access sequence based on the determined starting end and terminal end to the satisfaction degree calculation unit 88.

More specifically, a following operation is performed. First, the sub-access sequence starting end determining unit 92 collects the access sequence data shown in FIG. 68 into those each having the same visit ID and rearranges them in the order of date and time from older one. FIG. 70 shows a temporary first table generated as a result of the processing.

Assume that the URL of the customer site 61 starts from "http://www.○○○.co.jp/." FIG. 71 shows a screen transition of access sequence visit1 in FIG. 70 expressed in the same form as FIGS. 58 to 67. In the access sequence visit1, accesses are made to a retrieval result page output by a retrieval system outside the customer site 61 http://www.□□□.ne.jp/search.cgi?kw=vegetable→Web page "AAA.html" within the customer site 61→ "CCC.html"→"EEE.html"→a retrieval result page "search.cgi?q=food" output by the retrieval system within the customer site 61→Web page "FFF.html" within the customer site→"GGG.html" in this order. According to the sub-access sequence extraction rule, "AAA.html"→"CCC.html"→ "EEE.html" is a first sub-access sequence 108 and "search.cgi?q=food"→"FFF.html"→"GGG.html" is a second sub-access sequence 109. How to extract these sub-access sequences will be described specifically.

After the above-described rearrangement is performed, which is an access which acts as the starting end is determined according to the sub-access sequence extracting rule. An access determined to be the starting end is supplied with a starting end flag. FIG. 72 shows a temporary second table generated as a result of the processing.

As for the starting end flag, "1" indicates the starting end of a sub-access sequence while "0" indicates the other. In-customer site retrieval system specifying information 94 and out-of-customer site retrieval system specifying information 95 are employed. FIG. 8 shows an example of the in-customer site retrieval system specifying information 94 and FIG. 73 shows an example of the out-of-customer site retrieval system specifying information 95.

For example, view1 in FIG. 72 has http://www.□□□. ne.jp/search.cgi?kw=vegetable coinciding with the "URL of the retrieval system" and "query pattern" shown in FIG. 73 as reference information. Thus, this turns to a starting end of an access to the Web page, namely the sub-access sequence within the customer site 61 having a retrieval result page output by the retrieval system outside the customer site as reference information and "1" is recorded in the starting end flag of view1 in FIG. 72. In FIG. 72, view6 has "/search.cgi?q=banana" coinciding with "location of the retrieval system" "query pattern" indicated in FIG. 8 as a request. Thus, this turns to an access to a retrieval result page output by the retrieval system within the customer site 61, namely, the starting end of the sub-access sequence. Then, "1" is recorded in the starting end flag of view6 in FIG. 72.

According to the sub-access sequence extracting rule, the sub-access sequence terminal end determining unit 93 determines an access which acts as the terminal end from FIG. 72. An access determined to be the terminal end is supplied with a terminal end flag. FIG. 74 shows a temporary third table generated as a result of the processing.

As for the starting end/terminal end flags, "2" indicates the terminal end of the sub-access sequence, "1" indicates the starting end of the sub-access sequence and "0" indicates the others. If the starting end and the terminal end of the sub-access sequence overlap each other, "3" is set. For example, in FIG. 72, view5 is an access within the customer site just preceding the starting end of a next sub-access sequence with respect to the starting end of a sub-access sequence. Thus, this turns to the terminal end of the sub-access sequence and "2" is set to the starting end/terminal end flag of FIG. 74. Further, in FIG. 72, view13 has no starting end of a next sub-access sequence with respect to the starting end of the sub-access sequence and is an access at the terminal end of an access sequence within the customer site 61. Thus, this turns to the terminal end of the sub-access sequence and "2" is set to the starting end/terminal end flag of FIG. 74.

A sub-access sequence is extracted based on the starting end and the terminal end. An interval whose starting end starts from "1" and terminal end terminates at "2" or starting end starts from "3" and terminal end terminates at "3" is supplied with no-overlapping access identifier (subvisit ID) (hereinafter referred to as sub-access sequence identifier). However, the same access identifier is given in the same interval. An interval starting from "2" and terminating at "1," namely, a case where the subVisit ID has no value is expressed with "-." Rearrangement is executed with viewID.

FIG. 75 shows an example of the extracted sub-access sequence data.

Here, refer to FIG. 71 again. The sub-access sequence 108 in FIG. 71 corresponds to SubVisit1 in FIG. 75 while the sub-access sequence 109 corresponds to SubVisit2 in FIG. 75. In FIG. 75, SubVisit1 is "AAA.html"→"CCC.html"→"EEE.html" while SubVisit2 is "search.cgi?q=food"→"FFF.html"→"GGG.html." This coincides with a screen transition in the sub-access sequence 108 and sub-access sequence 109 in FIG. 71. As a result, it is evident that the sub-access sequence determining unit 91 functions well as the sub-access sequence extraction rule specifies.

As shown in FIG. 75, an off-site retrieval system flag is set up in sub-access sequence data.

The off-site retrieval system flag is set to "1" in a sub-access sequence determined based on a retrieval result page by a retrieval system outside the customer site 61, "0" in a sub-access sequence determined based on a retrieval result page by the retrieval system within the customer site 61 and "-" in other cases. As described in FIGS. 63 and 65, the off-site retrieval system flag is used to switch the calculation method of the after-retrieval browsing time depending on which the retrieval system is located inside or outside the customer site 61.

The keyword extracting unit 87 decodes an encoded retrieval keyword to a readable character string so as to generate keyword data.

Although the keyword extracting unit 87 has the following first and second features, the other points are the same as the keyword extracting unit 14 described in FIG. 2.

First, the keyword extracting unit 87 also extracts a retrieval keyword for a retrieval system outside the customer site 61. Extraction of the retrieval keyword input to the retrieval system outside the customer site 61 is carried out in the same method as the keyword extracting method described in the fifth embodiment.

Second, if an access to the retrieval result page 2 output by the retrieval system within the customer site 61 corresponds to an access to a Web page having the retrieval result page 2 output by the retrieval system outside the customer site 61 as reference information, the keyword extracting unit 87 extracts a retrieval keyword to an access to the retrieval result page 2 output by the retrieval system within the customer site 61.

The output style of keyword data by the keyword extracting unit 87 is the same as FIG. 10.

The satisfaction degree calculation unit 89 calculates an after-retrieval browsing time based on sub-access sequence data generated by the sub-access sequence extracting unit 86 and calculates the satisfaction degree of the browsing person.

Although the satisfaction degree calculation unit 89 has the following first and second features, the other points are the same as the satisfaction degree calculation unit 15 described in FIG. 2.

First, the satisfaction degree calculation unit 89 acquires the after-retrieval browsing time based on the qualitative evaluation rule not for each access sequence but for each sub-access sequence so as to calculate the satisfaction degree.

Second, the satisfaction degree calculation unit 89, as described in FIGS. 63 and 65, switches the calculation method of the after-retrieval browsing time depending on which the retrieval system is located inside or outside the customer site 61 so as to acquire the after-retrieval browsing time. Which the sub-access sequence depends on retrieval system located inside or outside the customer site 61 is determined based on an off-site retrieval system flag in FIG. 75.

Figures 76, 77:
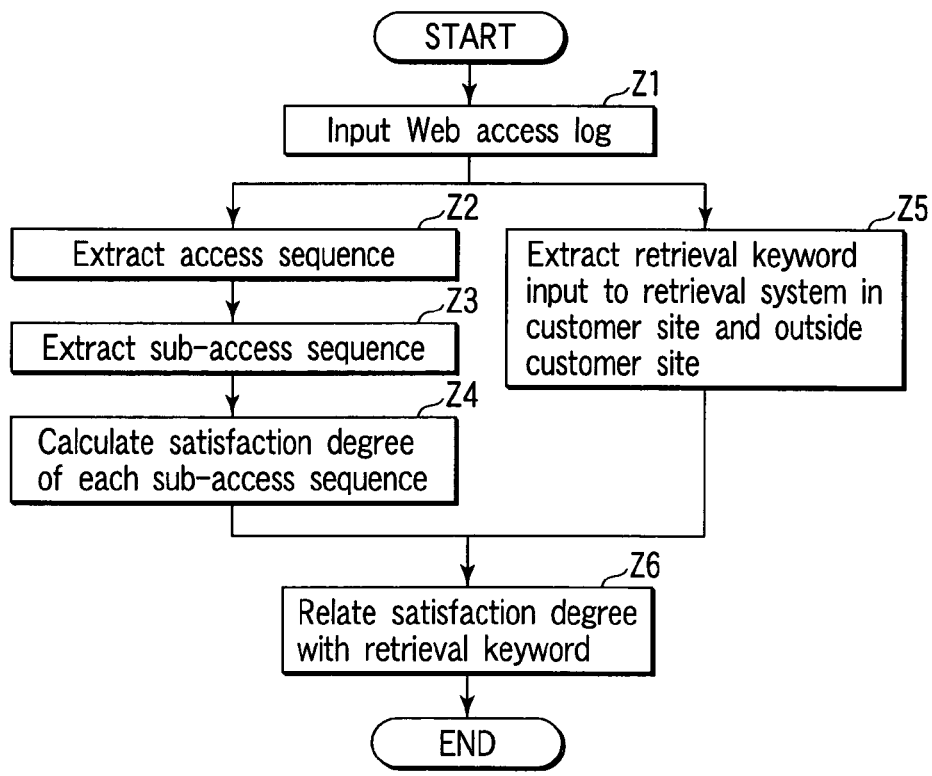
FIG. 76 is an example of extracted satisfaction degree data.
FIG. 77 is a flow chart showing an example of the operation of the retrieval keyword analyzing system according to the ninth embodiment.

FIG. 76 shows an example of extracted satisfaction degree data.

FIG. 76 contains a record which relates each access identifier, sub-access sequence identifier indicating the sub-access sequence which the access belongs to, and the satisfaction degree corresponding to the sub-access sequence identifier. As regards the item SubVisit ID, a portion having no sub-access sequence identifier has no satisfaction degree and therefore those portions are expressed with "-."

The satisfaction degree/keyword relating unit 16 relates the retrieval keyword to the satisfaction degree of a sub-access sequence corresponding to the retrieval keyword based on the keyword data generated by the keyword extracting unit 87 and the satisfaction degree data shown in FIG. 76 so as to calculate relation data of a form shown in FIG. 14.

FIG. 77 is a flow chart showing an example of the operation of the retrieval keyword analyzing system 83.

In step Z1, the log pre-processing unit 12 inputs necessary information from information contained in the Web access log 7 to create pre-processed data.

In step Z2, the sub-access sequence extracting unit 86 extracts an access sequence based on the pre-processed data and the access sequence extraction rule and creates access sequence data.

In step Z3, the sub-access sequence extracting unit 86 extracts a sub-access sequence based on the access sequence data and the sub-access sequence extraction rule and creates sub-access sequence data.

In step Z4, the satisfaction degree calculation unit 15 calculates the satisfaction degree of each sub-access sequence based on the sub-access sequence data and the satisfaction degree calculating rule and creates satisfaction degree data.

In step Z5, the keyword extracting unit 14 extracts a retrieval keyword input to the retrieval system within the customer site 6 and the retrieval system outside the customer site 6, based on the pre-processed data and creates keyword data.

In step Z6, the satisfaction degree/keyword relating unit 16 calculates the satisfaction degree of each retrieval keyword based on the satisfaction degree data and keyword data and creates relation data.

Step Z5 may be executed prior to steps Z2 to Z4 or after those steps or in parallel.

According to this embodiment, even if multiple retrieval keywords are input in a series of access sequences (if multiple retrieval actions are executed), the qualitative evaluation value of each of the multiple retrieval keywords is acquired and further the qualitative evaluation value and quantitative evaluation value of each retrieval keyword is calculated.

Generally, a site browsing person often uses the retrieval system and he may often input the retrieval keywords several times in a series of accesses. According to this embodiment, in this case also, the qualitative evaluation value of each retrieval keyword is obtained and the retrieval keyword and the retrieval system which executes a retrieval based on the retrieval keyword is analyzed sufficiently accurately.

Although according to this embodiment, a case where the satisfaction degree is adopted as an index indicating the quantitative evaluation value has been described, it is possible to employ other index such as the success degree as the qualitative evaluation value.

Other methods than the one defined in this embodiment are applied as the after-retrieval browsing time. For example, the after-retrieval browsing time may be determined in a relation with the content of the Web page.

Although according to this embodiment, the sub-access sequence extracting unit 86 extracts a sub-access sequence after an access sequence is extracted, the sub-access sequence may be extracted directly without extracting the access sequence.

Each component or unit of the retrieval keyword analyzing system of the above embodiments may be modified in their arrangement if the same operation is achieved and those components and units may be combined freely.

According to the above embodiments, the retrieval keyword analyzing system is constituted of multiple computers and the retrieval keyword analyzing program may be distributed in multiple computers so as to execute the processing under communication among those.

The retrieval keyword analyzing program of each embodiment may be written in for example, a magnetic disc (flexible disc, hard disc and the like), an optical disc (CD-ROM, DVD and the like), a semiconductor memory and other recording mediums and installed in the computer. Further, the retrieval keyword analyzing program may be distributed through a communication medium and installed in the computer. The computer reads the retrieval keyword analyzing program recorded in the recording medium and its operation is controlled by the retrieval keyword analyzing program so as to achieve the above function.

According to an embodiment of the invention, a retrieval keyword analyzing program makes a computer achieve an access sequence detecting unit which extracts an access sequence indicating continuous accesses by the same access person based on a Web access log which relates access person identification data in WWW with accessed person identification data and records the access sequence data indicating an extraction result of the access sequence in a recording medium; a keyword extracting unit which, when access destination identification data indicating a retrieval system in WWW is related to a retrieval keyword input to the retrieval system by an access person in the Web access log, extracts a retrieval and recording keyword data indicating an extraction result of the retrieval keyword; an evaluation value calculation unit which calculates a qualitative evaluation value corresponding to the access sequence indicated by access sequence data recorded in the recording medium, based on a qualitative evaluation rule for defining a standard for calculating the qualitative evaluation value corresponding to a retrieval result of the retrieval system in the WWW and records relation data indicating the relation between the retrieval keyword input in the access sequence of retrieval keywords indicated by keyword data recorded in the recording medium and the qualitative evaluation value.

Therefore, the qualitative evaluation value for a retrieval result by the retrieval system based on the input retrieval keyword is grasped easily. Both the access sequence extracting unit and the keyword extracting unit is operated in parallel.

The evaluation value calculation unit may calculate not only the qualitative evaluation value but also the quantitative evaluation value corresponding to an access sequence indicated by access sequence data recorded in the recording medium based on the quantitative evaluation rule which defines a standard for calculating a quantitative evaluation value on a retrieval result of the retrieval system and record relation data indicating the relation among a retrieval keyword input in an access sequence of retrieval keywords indicated by the keyword data recorded in the recording medium, the qualitative evaluation value and quantitative evaluation value.

Therefore, the qualitative evaluation value and quantitative evaluation value on the retrieval result by the retrieval system based on the input retrieval keyword and the relation between the qualitative evaluation value and the quantitative evaluation value is grasped easily.

According to another embodiment of the invention, a retrieval keyword analyzing program makes a computer achieve an access sequence extracting unit which extracts an access sequence indicating continuous accesses by the same access person based on a Web access log which relates access person identification data in WWW with access destination identification data and records access sequence data indicating an extraction result of the access sequence in a recording medium; a keyword extracting unit which, when a retrieval keyword is input in an access sequence indicated by access sequence data recorded by the recording medium while the access destination identification data indicating the retrieval system in the WWW is related to a retrieval keyword input to the retrieval system by the access person in the Web access log, extracts a retrieval keyword and records keyword data indicating an extraction result of the retrieval keyword in the recording medium; and an evaluation value calculation unit which calculates a qualitative evaluation value corresponding to an access sequence indicated by access sequence data recorded in the recording medium based on the qualitative evaluation rule which defines a standard for calculating the qualitative evaluation value on the retrieval result by the retrieval system when the WWW is accessed and records the relation data indicating the relation between the retrieval keyword indicated by keyword data recorded in the recording medium and the qualitative evaluation value.

The access sequence extracting unit and the keyword extracting unit are actuated in series.

The evaluation value calculation unit may calculate a qualitative evaluation value corresponding to an access sequence indicated by an access sequence data recorded in the recording medium based on the quantitative evaluation rule which defines a standard for calculating a quantitative evaluation value on a retrieval result by the retrieval system as well as the qualitative evaluation value and record relation data indicating the relation between the retrieval keyword indicated by keyword data recorded in the recording medium, the qualitative evaluation value and the quantitative evaluation value.

It is possible that the Web access log contains data which relates reference information with access destination identification data, the access sequence extracting unit, when the reference information indicates the retrieval system, extracts an access sequence containing an access to the access destination indicated by the access destination identification data related with the reference information, the keyword extracting unit, when the reference information indicates the retrieval system, extracts the retrieval keyword included in the reference information and the evaluation value calculation unit calculates a qualitative evaluation value after a retrieval keyword is input to the access sequence.

Therefore, using the reference information enables a retrieval keyword input to the retrieval system out of site to be analyzed even from a Web access log recorded at an access destination.

According to still another embodiment of the invention, there is provided a retrieval keyword analyzing program which makes a computer achieve a sub-access sequence extracting unit which, when reference information indicates a retrieval system for WWW based on a Web access log which relates access person identification data in the WWW, access destination identification data and the reference information, extracts an access sequence containing an access to an access destination indicated by access destination identification data related with the reference information and indicating continuous accesses by the same access person; a keyword extracting unit which, when the reference information indicates a retrieval system, extracts a retrieval keyword contained in the reference information and records keyword data indicating an extraction result of the retrieval keyword in the recording medium; an evaluation value calculation unit which calculates a qualitative evaluation value after a retrieval keyword is input to an access sequence indicated by access sequence data recorded in the recording medium based on the qualitative evaluation rule which defines a standard for calculating the qualitative evaluation value on a retrieval result by the retrieval system when the WWW is accessed, and records relation data indicating the relation between a retrieval keyword corresponding to the access sequence of retrieval keywords recorded in the recording medium and a qualitative evaluation value corresponding to the access sequence in the recording medium.

The evaluation value calculation unit may calculate not only the qualitative evaluation value but also the quantitative evaluation value after a retrieval keyword corresponding to an access sequence indicated by the access sequence data recorded in the recording medium based on the qualitative evaluation rule which defines a standard for calculating the qualitative evaluation value recorded in the recording medium and record relation data indicating the relation between the retrieval keyword indicated by keyword data recorded in the recording medium and the quantitative evaluation value.

When relation data indicating the relation among the retrieval keyword, the qualitative evaluation value and quantitative evaluation value is obtained, it is possible to add a program which makes a computer achieves a graphing unit for drawing a graph based on the qualitative evaluation value and the quantitative evaluation value. Therefore, the analysis result is grasped more easily.

The qualitative evaluation value may be a need value of a retrieval result whose value increases as the number of inputs of the retrieval keyword increases and the quantitative evaluation rule may be a rule under which the need value increases as the number of inputs of the retrieval keywords increases.

The qualitative evaluation rule may be a rule which increases the success degree to an access sequence when an analysis object retrieval keyword is input to the access sequence based on data which relates an analysis object retrieval keyword with access destination identification data which increases the success degree when an access is made after the retrieval keyword is input and keyword data recorded in the recording medium and the access destination indicated by the access destination identification data related with the analysis object retrieval keyword is accessed after the input and the qualitative evaluation value may be the success degree.

In this case, the qualitative evaluation rule may increase the success degree as the number of accesses until an access destination indicated by access destination identification data related with the analysis object retrieval keyword after the analysis object retrieval keyword is input decreases.

The Web access log relates access person identification data, access destination identification data and data indicating access time each time when the WWW is accessed and the qualitative evaluation rule is a rule which increases the satisfaction degree of an access person as time interval from an access after a retrieval keyword is input to the access sequence to a last access increases and the qualitative evaluation value may be the satisfaction degree.

According to still another embodiment of the invention, a retrieval keyword analyzing program makes a computer achieve a sub-access sequence extracting unit which extracts a sub-access sequence based on a starting end determined by an access to a retrieval result page of continuous accesses made by the same access person and a terminal end determined by an access subsequent to the starting end of continuous accesses made by the same access person as for the starting end, according to a Web access log which relates access person identification data in the WWW with access destination identification data indicating an access destination made by the access person and records sub-access sequence data indicating an extraction result of the sub-access sequence in the recording medium; a keyword extracting unit which, when access destination identification data indicating a retrieval system in the WWW is related with retrieval keyword input to the retrieval system by the access person in the Web access log, extracts a retrieval keyword and records keyword data indicating an extraction result of the retrieval keyword in the recording medium; and an evaluation value calculation unit which calculates a qualitative evaluation value corresponding to sub-access sequence indicating sub-access sequence data recorded in the recording medium based on the qualitative evaluation rule which defines a standard for calculating qualitative evaluation value on a retrieval result of the retrieval system when the WWW is accessed and records relation data indicating the relation between a retrieval keyword corresponding to the sub-access sequence of the retrieval keywords indicated by keyword data recorded in the recording medium and the qualitative evaluation value in the recording medium.

According to still another embodiment of the invention, a retrieval keyword analyzing program makes a computer achieve a sub-access sequence extracting unit which extracts a sub-access sequence by acquiring a starting end determined by an access to a retrieval result page and a next starting end and then acquiring a terminal end corresponding to the starting end based on an access just before the next starting end according to a Web access log which relates access person identification data in the WWW with access destination identification data indicating an access destination made by the access person and records sub-access sequence data indicating an extraction result of the sub-access sequence in the recording medium; a keyword extracting unit which, when access destination identification data indicating a retrieval system in the WWW is related with retrieval keyword input to the retrieval system by the access person in the Web access log, extracts a retrieval keyword and records keyword data indicating an extraction result of the retrieval keyword in the recording medium; and an evaluation value calculation unit which calculates a qualitative evaluation value corresponding to sub-access sequence indicating sub-access sequence data recorded in the recording medium based on the qualitative evaluation rule which defines a standard for calculating qualitative evaluation value on a retrieval result of the retrieval system when the WWW is accessed and records relation data indicating the relation between a retrieval keyword corresponding to the sub-access sequence of the retrieval keywords indicated by keyword data recorded in the recording medium and the qualitative evaluation value in the recording medium.

According to still another embodiment of the invention, a retrieval keyword analyzing program makes a computer achieve a sub-access sequence extracting unit which extracts a sub-access sequence based on a starting end and a terminal end by, when the starting end determined by an access to a retrieval result page of continuous accesses made by the same access person and a next starting end are acquired, regarding an access just before the next starting end as the terminal end and when the starting end is acquired but no next starting end is acquired, regards the terminal end of continuous accesses as a terminal end corresponding to the starting end, according to a Web access log which relates access person identification data in the WWW with access destination identification data indicating an access destination made by the access person, and records sub-access sequence data indicating an extraction result of the sub-access sequence in the recording medium; a keyword extracting unit which, when access destination identification data indicating a retrieval system in the WWW is related with retrieval keyword input to the retrieval system by the access person in the Web access log, extracts a retrieval keyword and records keyword data indicating an extraction result of the retrieval keyword in the recording medium; and an evaluation value calculation unit which calculates a qualitative evaluation value corresponding to sub-access sequence indicating sub-access sequence data recorded in the recording medium based on the qualitative evaluation rule which defines a standard for calculating qualitative evaluation value on a retrieval result of the retrieval system when the WWW is accessed and records relation data indicating the relation between a retrieval keyword corresponding to the sub-access sequence of the retrieval keywords indicated by keyword data recorded in the recording medium and the qualitative evaluation value in the recording medium.

When relation data indicating the relation among the retrieval keyword, the qualitative evaluation value and the quantitative evaluation value is acquired, the Web access log is data which relates access person identification data, access destination identification data and time data indicating access time, and the evaluation value calculation unit acquires relation data of each of said multiple time periods based on the time data and makes the computer achieve trend analyzing unit which acquires trend data indicating a transition condition of the qualitative evaluation value and quantitative evaluation value on the retrieval keyword based on the relation data of each of multiple time periods and records in the recording medium.

Therefore, changes in the qualitative evaluation value and quantitative evaluation value of the retrieval keyword to be input to the retrieval system in order to access a portion of analyzing object in the WWW is acquired in time series.

When relation data indicating the relation among the retrieval keyword, the qualitative evaluation value and quantitative evaluation value is acquired, the Web access log is data which relates the access person identification data, access destination identification data and time data indicating an access time and the evaluation value calculation unit obtains the relation data of each of the multiple time periods based on the time data and makes the computer achieve the category forming unit for calculating the qualitative evaluation value and quantitative evaluation value on the category for each of the multiple time periods based on the category data which relates the retrieval keyword with a category which that retrieval keyword belongs to and the relation data of each of the multiple time periods and records in the recording medium and the trend analyzing unit for obtaining trend data indicating a transition condition of the qualitative evaluation value and quantitative evaluation value of the category and recording in the recording medium.

Therefore, the retrieval keywords is related so as to analyze the category which an analyzer wants.

The above-mentioned retrieval keyword analyzing program is capable of adding these functions to computer, computer system, server and client not having the respective functions easily by using a recording medium in which a program is recorded.

By providing the retrieval keyword analyzing system with means for achieving the same operation as the function achieved by the invention, the same operation and effect is acquired.

By applying the above-mentioned retrieval keyword analyzing program or a recording medium in which the program is recorded to a computer, the retrieval keyword analyzing method for grasping the quantitative evaluation value on a retrieval result of the retrieval system based on the input retrieval keyword easily is executed on the computer.

What is claimed is:

1. An article of manufacture comprising a computer usable medium having computer readable program code embodied therein, the computer readable program code comprising: computer readable program code for causing a computer to extract an access sequence indicating a continuous access by a same requester based on a Web access log which relates first identification data indicating an access requester to second identification data indicating contents to be accessed; computer readable program code for causing a computer to extract, when the Web access log relates second identification data indicating a retrieval system to a retrieval keyword which is input to the retrieval system by the requester, the retrieval keyword from the Web access log; and computer readable program code for causing a computer to calculate a qualitative evaluation value of the access sequence based on a qualitative evaluation rule for defining the qualitative evaluation value of a retrieval result of the retrieval system, and create first relation data indicating a relation between the qualitative evaluation value and a retrieval keyword which is input in the access sequence.

2. An article of manufacture according to claim 1, further comprising: computer readable program code for causing a computer to calculate a quantitative evaluation value of the access sequence based on a quantitative evaluation rule for defining the quantitative evaluation value of a retrieval result of the retrieval system, and create second relation data indicating a relation of the retrieval keyword which is input in the access sequence, the qualitative evaluation value and the quantitative evaluation value.

3. An article of manufacture according to claim 2, further comprising: computer readable program code for causing a computer to create a graph indicating a relation of the qualitative evaluation value and the quantitative evaluation value based on the second relation data.

4. An article of manufacture according to claim 2, wherein the quantitative evaluation value comprises a need value for a retrieval result which increases as the number of inputs of the retrieval keyword increases; and the quantitative evaluation rule comprises a rule under which the need value increases as the number of inputs of the retrieval keyword increases.

5. An article of manufacture according to claim 2, wherein the Web access log further relates access time data to the first identification data and the second identification data; and the quantitative evaluation value calculating program code creates the second relation data for each time period based on the access time data, and which further comprises: computer readable program code for causing a computer to create trend data for the retrieval keyword, the trend data indicating a transition of the qualitative evaluation value and the quantitative evaluation value based on the second relation data for each time period.

6. An article of manufacture according to claim 5, wherein the Web access log further relates an access time data to the first identification data and the second identification data; and the quantitative evaluation value calculating program code creates the second relation data for each time period based on the access time data, and which further comprises: computer readable program code for causing a computer to calculate the qualitative evaluation value and the quantitative evaluation value for each category and for each time period based on the second relation data and category data which relates the retrieval keyword to a category to which the keyword belongs; and computer readable program code for causing a computer to create trend data for the retrieval keyword, the trend data indicating a transition of the qualitative evaluation value and the quantitative evaluation value for each time period and each category.

7. An article of manufacture according to claim 6, wherein the trend data obtaining program code comprises: computer readable program code for causing a computer to detect a region to which the retrieval keyword belongs of regions determined by the boundaries at each time period; computer readable program code for causing a computer to determine whether the retrieval keyword belonging region changes; and computer readable program code for causing a computer to add a message corresponding to a change in the region to a retrieval keyword in which the region is changed, and the trend data includes data indicating a result produced by adding the message to the retrieval keyword in which the region is changed.

8. An article of manufacture according to claim 5, wherein the trend data obtaining program code calculates a moving distance and a moving direction of the retrieval keyword at each switching of the time period based on the qualitative evaluation value and the quantitative evaluation value of each time period, and the trend data includes data indicating the moving distance and the moving direction of the retrieval keyword at each switching of the time period.

9. An article of manufacture according to claim 5, wherein the trend data obtaining program code comprises: computer readable program code for causing a computer to calculate a moving distance of the retrieval keyword at each switching of each time period based on the qualitative evaluation value and the quantitative evaluation value of the retrieval keyword at each time period; computer readable program code for causing a computer to determine whether or not the moving distance exceeds a threshold; computer readable program code for causing a computer to acquire the moving direction of the retrieval keyword when the moving distance exceeds the threshold; and computer readable program code for causing a computer to add a message corresponding to the moving direction to a retrieval keyword in which the moving distance exceeds the threshold, and the trend data includes data produced by adding the message to the retrieval keyword in which the moving distance exceeds the threshold.

10. An article of manufacture according to claim 5, further comprising: computer readable program code for causing a computer to arrange indexes indicating the retrieval keyword of each time period corresponding to the qualitative evaluation value and the quantitative evaluation value on a space which adopts the qualitative evaluation value and the quantitative evaluation value as multiple axes, based on the trend data and display a graph by connecting the indexes with lines corresponding to an elapse order of the time period.

11. An article of manufacture according to claim 2, wherein the Web access log relates the first identification data and the second identification data to access time data, and the quantitative evaluation value calculating program code creates the second relation data for each time period based on the access time data, and which further comprises: computer readable program code for causing a computer to calculate the qualitative evaluation value and the quantitative evaluation value on the category of each time period based on category data which relates the retrieval keyword to a category to which the retrieval keyword belongs and relation data of each time period; and computer readable program code for causing a computer to create trend data indicating a transition of the qualitative evaluation value and the quantitative evaluation value on the category.

12. An article of manufacture according to claim 11, further comprising: computer readable program code for causing a computer to arrange indexes indicating the category of each time period corresponding to the qualitative evaluation value and the quantitative evaluation value on a space which adopts the qualitative evaluation value and the quantitative evaluation value as multiple axes, based on the trend data and display a graph by connecting the indexes with lines corresponding to an elapse order of the time period.

13. An article of manufacture according to claim 1, wherein the Web access log further relates the second identification data to reference information including a retrieval keyword, the access sequence extracting program code comprises a program code for causing a computer to extract, when the reference information indicates the retrieval system, an access sequence including an access to contents related to the reference information, the retrieval keywords extracting program code comprises a program code for causing a computer to extract the retrieval keyword included in the reference information; and the qualitative evaluation value calculating program code comprises a program code for causing a computer to calculate a qualitative evaluation value of the access sequence after the retrieval keyword included in the reference information is input.

14. An article of manufacture according to claim 1, wherein a retrieval keyword to be analyzed is input in the access sequence and contents indicated by second identification data related to the retrieval keyword to be analyzed are accessed after the retrieval keyword to be analyzed is input, the qualitative evaluation rule comprises a rule which, based on the extracted keyword and relation data between the retrieval keyword to be analyzed and second identification data indicating contents which increases a success degree when the contents are accessed after the retrieval keyword to be analyzed is input, increases the success degree of the access sequence, and the qualitative evaluation value comprises the success degree.

15. An article of manufacture according to claim 14, wherein the qualitative evaluation rule increases the success degree as the number of accesses until the contents to be accessed indicated by the second identification data related with the retrieval keyword to be analyzed is accessed after the retrieval keyword to be analyzed is input, decreases.

16. An article of manufacture according to claim 1, wherein the Web access log relates the first identification data and the second identification data to access time data for each access, the qualitative evaluation rule comprises a rule which increases the satisfaction degree of the access requester as a time interval from an access after the retrieval keyword is input to a last access increases, and the qualitative evaluation value comprises the satisfaction degree.

17. An article of manufacture comprising a computer usable medium having computer readable program code embodied therein, the computer readable program code comprising: computer readable program code for causing a computer to extract an access sequence indicating a continuous access by a same requester based on a Web access log which relates first identification data indicating an access requester to second identification data indicating contents to be accessed; computer readable program code for causing a computer to extract, when the Web access log relates second identification data indicating a retrieval system to a retrieval keyword which is input to the retrieval system by the requester and the retrieval keyword is input in the access sequence, the retrieval keyword which is input in the access sequence from the Web access log; and computer readable program code for causing a computer to calculate a qualitative evaluation value of the access sequence based on a qualitative evaluation rule for defining the qualitative evaluation value of a retrieval result of the retrieval system, and create first relation data indicating a relation between the extracted retrieval keyword and the qualitative evaluation value.

18. An article of manufacture comprising a computer usable medium having computer readable program code embodied therein, the computer readable program code comprising: computer readable program code for causing a computer to extract, based on a Web access log which relates first identification data indicating an access requester, second identification data indicating contents to be accessed, and reference information, an access sequence indicating a continuous access including an access to the contents to be accessed indicated by the second identification data by a same requester when the reference information indicates a retrieval system; computer readable program code for causing a computer to extract a retrieval keyword included in the reference information when the reference information indicates the retrieval system; and computer readable program code for causing a computer to calculate a qualitative evaluation value of the access sequence after inputting the extracted retrieval keyword based on a qualitative evaluation rule for defining the qualitative evaluation value of a retrieval result of the retrieval system, and create first relation data indicating a relation between the qualitative evaluation value and the retrieval keyword corresponding to the access sequence.

19. An article of manufacture comprising a computer usable medium having computer readable program code embodied therein, the computer readable program code comprising: computer readable program code for causing a computer to extract, based on a Web access log which relates first identification data indicating an access requester to second identification data indicating contents to be accessed, a sub-access sequence indicating a continuous access by a same requester; computer readable program code for causing a computer to extract the retrieval keyword when the Web access log relates second identification data indicating a retrieval system to a retrieval keyword input to the retrieval system by the requester; and computer readable program code for causing a computer to calculate a qualitative evaluation value of the sub-access sequence based on a qualitative evaluation rule for defining the qualitative evaluation value of a retrieval result of the retrieval system, and create relation data indicating a relation between the extracted retrieval keyword and the qualitative evaluation value.

20. An article of manufacture according to claim 19, wherein the sub-access sequence has a starting end at which retrieval result contents are accessed and a terminal end at which a next continuous access starts.

21. An article of manufacture according to claim 19, wherein the sub-access sequence has a starting end at which retrieval result contents are accessed and a terminal end which is a last access preceding to a next starting end.

22. An article of manufacture according to claim 19, wherein the sub-access sequence has a starting end at which retrieval result contents are accessed and a terminal end which is a last access preceding to a next starting end when the next starting end is found, and having the starting end and a terminal end at which the continuous access ends when the next starting end is not found.

23. A retrieval keyword analyzing system comprising: an access sequence extracting unit configured to extract an access sequence indicating a continuous access by a same requester based on a Web access log which relates first identification data indicating an access requester to second identification data indicating contents to be accessed; a keyword extracting unit configured to extract, when the Web access log relates second identification data indicating a retrieval system to a retrieval keyword input to the retrieval system by the requester, the retrieval keyword from the Web access log; and a satisfaction degree calculation unit configured to calculate a qualitative evaluation value of the access sequence based on a qualitative evaluation rule for defining the qualitative evaluation value of a retrieval result of the retrieval system, and creating first relation data indicating a relation between the qualitative evaluation value and a retrieval keyword which is input in the access sequence.

24. The retrieval keyword analyzing system according to claim 23, further comprising: a need valued calculation unit configured to calculate a quantitative evaluation value of the access sequence based on a quantitative evaluation rule for defining the quantitative evaluation value of a retrieval result of the retrieval system, and to create second relation data indicating a relation of the retrieval keyword which is input in the access sequence, the qualitative evaluation value and the quantitative evaluation value.

25. A retrieval keyword analyzing system comprising: an access sequence extracting unit configured to extract an access sequence indicating a continuous access by a same requester based on a Web access log which relates first identification data indicating an access requester to second identification data indicating contents to be accessed; a keyword extracting unit configured to extract, when the Web access log relates second identification data indicating a retrieval system to a retrieval keyword which is input to the retrieval system by the requester and the retrieval keyword is input in the access sequence, the retrieval keyword which is input in the access sequence from the Web access log; and a satisfaction degree calculation unit configured to calculate a qualitative evaluation value of the access sequence based on a qualitative evaluation rule for defining the qualitative evaluation value of a retrieval result of the retrieval system, and to create first relation data indicating a relation between the extracted retrieval keyword and the qualitative evaluation value.

26. A retrieval keyword analyzing system comprising: an access sequence extracting unit configured to extract, based on a Web access log which relates first identification data indicating an access requester, second identification data indicating contents to be accessed, and reference information, an access sequence indicating a continuous access including an access to the contents to be accessed indicated by the second identification data by a same requester when the reference information indicates a retrieval system; a keyword extracting unit configured to extract a retrieval keyword included in the reference information when the reference information indicates the retrieval system; and a satisfaction degree calculation unit configured to calculate a qualitative evaluation value of the access sequence after inputting the extracted retrieval keyword based on a qualitative evaluation rule for defining the qualitative evaluation value of a retrieval result of the retrieval system, and to create first relation data indicating a relation between the qualitative evaluation value and the retrieval keyword corresponding to the access sequence.

27. A retrieval keyword analyzing system comprising: a sub-access sequence extracting unit configured to extract, based on a Web access log which relates first identification data indicating an access requester to second identification data indicating contents to be accessed, a sub-access sequence indicating a continuous access by a same requester and having a starting end at which retrieval result contents are accessed and a terminal end at which a next continuous access starts; a keyword extracting unite configured to extract the retrieval keyword when the Web access log relates second identification data indicating a retrieval system to a retrieval keyword input to the retrieval system by the requester; and a satisfaction degree calculation unit configured to calculate a qualitative evaluation value of the sub-access sequence based on a qualitative evaluation rule for defining the qualitative evaluation value of a retrieval result of the retrieval system, and to create relation data indicating a relation between the extracted retrieval keyword and the qualitative evaluation value.

28. A retrieval keyword analyzing method comprising the steps of: extracting an access sequence indicating a continuous access by a same requester based on a Web access log which relates first identification data indicating an access requester to second identification data indicating contents to be accessed; extracting, when the Web access log relates second identification data indicating a retrieval system to a retrieval keyword which is input to the retrieval system by the requester, the retrieval keyword from the Web access log; and calculating a qualitative evaluation value of the access sequence based on a qualitative evaluation rule for defining the qualitative evaluation value of a retrieval result of the retrieval system, and creating first relation data indicating a relation between the qualitative evaluation value and a retrieval keyword which is input in the access sequence.

29. The retrieval keyword analyzing method according to claim 28, further comprising the step of: calculating a quantitative evaluation value of the access sequence based on a quantitative evaluation rule for defining the quantitative evaluation value of a retrieval result of the retrieval system, and creating second relation data indicating a relation of the retrieval keyword which is input in the access sequence, the qualitative evaluation value and the quantitative evaluation value.

30. The retrieval keyword analyzing method according to claim 29, wherein the Web access log further relates access time data to the first identification data and the second identification data; and the quantitative evaluation value creates the second relation data for each time period based on the access time data, and which further comprises the step of: creating trend data for the retrieval keyword, the trend data indicating a transition of the qualitative evaluation value and the quantitative evaluation value based on the second relation data for each time period.

31. The retrieval keyword analyzing method according to claim 29, wherein the Web access log further relates an access time data to the first identification data and the second identification data; and the quantitative evaluation value creates the second relation data for each time period based on the access time data, and which further comprises the steps of: calculating the qualitative evaluation value and the quantitative evaluation value for each category and for each time period based on the second relation data and category data which relates the retrieval keyword to a category to which the keyword belongs; and creating trend data for the retrieval keyword, the trend data indicating a transition of the qualitative evaluation value and the quantitative evaluation value for each time period and each category.

32. A retrieval keyword analyzing method comprising the steps of: extracting an access sequence indicating a continuous access by a same requester based on a Web access log which relates first identification data indicating an access requester to second identification data indicating contents to be accessed; extracting, when the Web access log relates second identification data indicating a retrieval system to a retrieval keyword which is input to the retrieval system by the requester and the retrieval keyword is input in the access sequence, the retrieval keyword which is input in the access sequence from the Web access log; and calculating a qualitative evaluation value of the access sequence based on a qualitative evaluation rule for defining the qualitative evaluation value of a retrieval result of the retrieval system, and creating first relation data indicating a relation between the extracted retrieval keyword and the qualitative evaluation value.

33. A retrieval keyword analyzing method comprising the steps of: extracting, based on a Web access log which relates first identification data indicating an access requester, second identification data indicating contents to be accessed, and reference information, an access sequence indicating a continuous access including an access to the contents to be accessed indicated by the second identification data by a same requester when the reference information indicates a retrieval system; extracting a retrieval keyword included in the reference information when the reference information indicates the retrieval system; and calculating a qualitative evaluation value of the access sequence after inputting the extracted retrieval keyword based on a qualitative evaluation rule for defining the qualitative evaluation value of a retrieval result of the retrieval system, and creating first relation data indicating a relation between the qualitative evaluation value and the retrieval keyword corresponding to the access sequence.

34. A retrieval keyword analyzing method comprising the steps of: extracting, based on a Web access log which relates first identification data indicating an access requester to second identification data indicating contents to be accessed, a sub-access sequence indicating a continuous access by a same requester and having a starting end at which retrieval result contents are accessed and a terminal end at which a next continuous access starts; extracting the retrieval keyword when the Web access log relates second identification data indicating a retrieval system to a retrieval keyword input to the retrieval system by the requester; and calculating a qualitative evaluation value of the sub-access sequence based on a qualitative evaluation rule for defining the qualitative evaluation value of a retrieval result of the retrieval system, and creating relation data indicating a relation between the extracted retrieval keyword and the qualitative evaluation value.

* * * * *